United States Patent
Kanbara et al.

(10) Patent No.: US 7,022,204 B2
(45) Date of Patent: Apr. 4, 2006

(54) METHOD AND APPARATUS FOR BONDING POLARIZING PLATE

(75) Inventors: Takayuki Kanbara, Kanagawa (JP); Naoki Sakai, Kanagawa (JP); Ryoichi Sugihara, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 75 days.

(21) Appl. No.: 10/608,778

(22) Filed: Jun. 30, 2003

(65) Prior Publication Data

US 2005/0016670 A1    Jan. 27, 2005

(30) Foreign Application Priority Data

| Jun. 28, 2002 | (JP) | ............................. 2002-189044 |
| Jul. 4, 2002 | (JP) | ............................. 2002-195467 |
| Jul. 4, 2002 | (JP) | ............................. 2002-195468 |
| May 16, 2003 | (JP) | ............................. 2003-139325 |

(51) Int. Cl.
*G02F 1/01* (2006.01)

(52) U.S. Cl. ..................... 156/257; 156/235; 156/238; 156/247; 156/264; 156/268; 156/270; 156/521; 156/522; 156/541; 156/542

(58) Field of Classification Search ................ 156/248, 156/249, 257, 264, 268, 270, 269, 521, 522, 156/235, 238, 541, 542

See application file for complete search history.

(56) References Cited

FOREIGN PATENT DOCUMENTS

| JP | 55-117110 | * | 9/1980 |
| JP | 1-260417 | * | 10/1989 |
| JP | 8-50290 | * | 2/1996 |
| JP | 8-87007 | * | 2/1996 |
| JP | 11-95028 A | | 4/1999 |
| JP | 2000-284269 | * | 10/2000 |
| JP | 2001-42315 | * | 2/2001 |
| JP | 2002-23151 A | | 1/2002 |
| JP | 2002-86554 A | | 3/2002 |
| JP | 2003-161935 | * | 6/2003 |

* cited by examiner

*Primary Examiner*—Linda Gray
(74) *Attorney, Agent, or Firm*—Sughrue Mion, PLLC

(57) ABSTRACT

Method and apparatus for bonding a polarizing plate high in operating efficiency and yield. The apparatus includes a cutting unit for cutting at least a polarizing plate of a strip-shaped film, composed of the polarizing plate and a release film bonded to the polarizing plate, leaving the release film uncut, when a forward end side pre-severed end face of the strip-shaped film perpendicular to the longitudinal direction of the strip-shaped film has traveled up to a length corresponding to a length of a substrate, to form a film piece, a release film separating unit for separating the release film from the film piece thus severed, and a bonding unit for bonding the tacky surface of the film piece freed of the release film to a mating position of the substrate so that the forward end side end face of the transported substrate is parallel to the pre-severed end face of the film piece.

13 Claims, 39 Drawing Sheets

X-X'

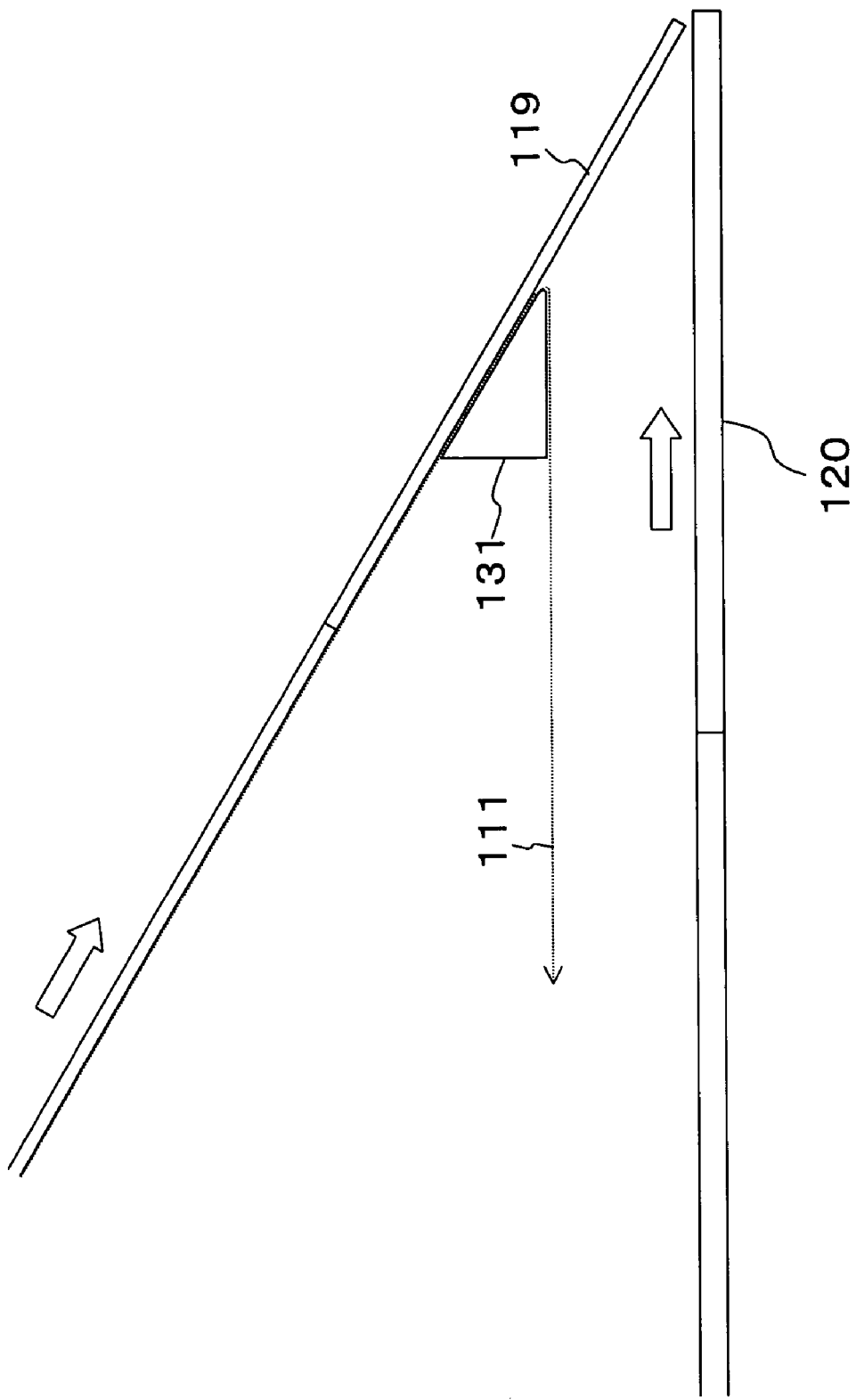

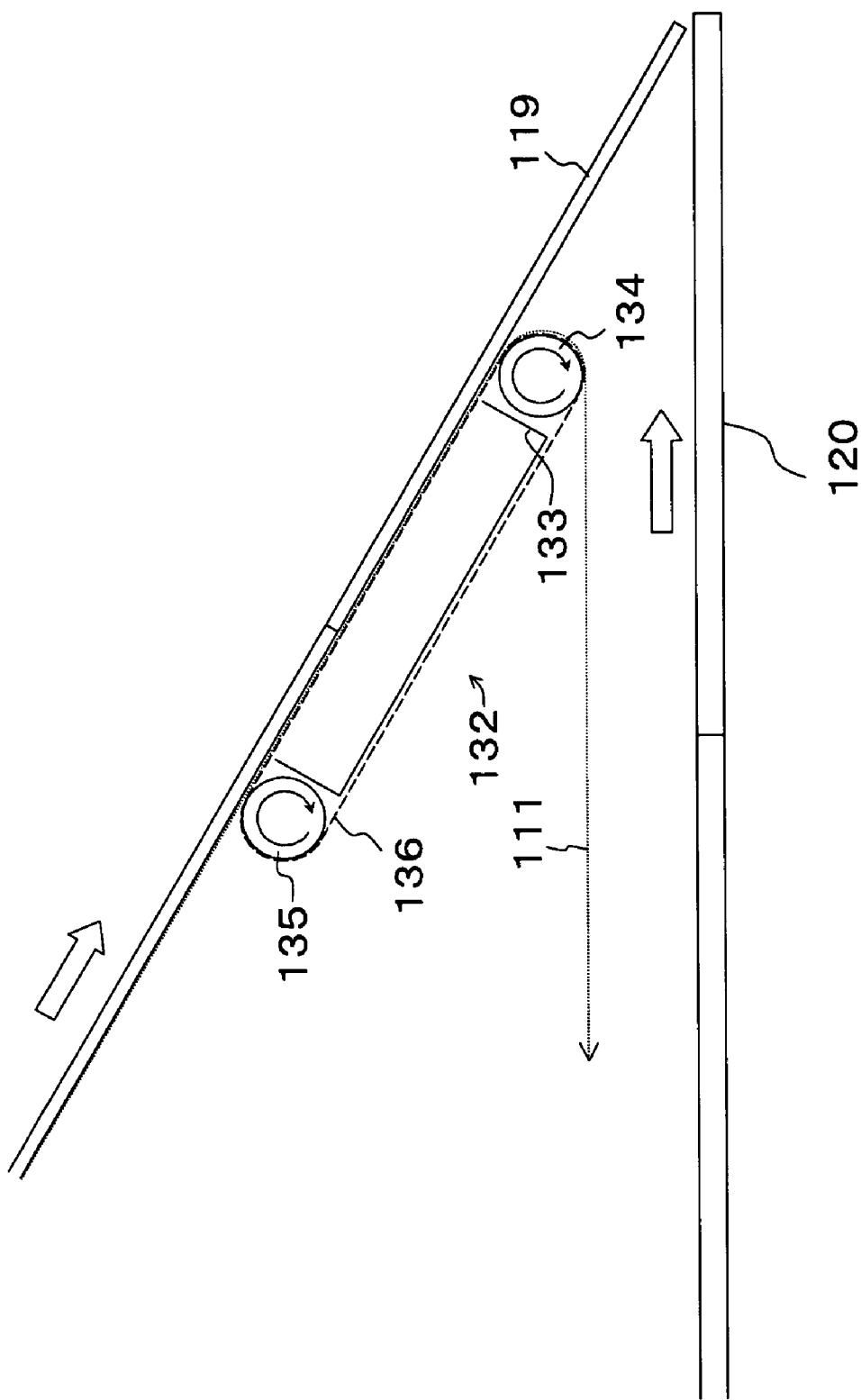

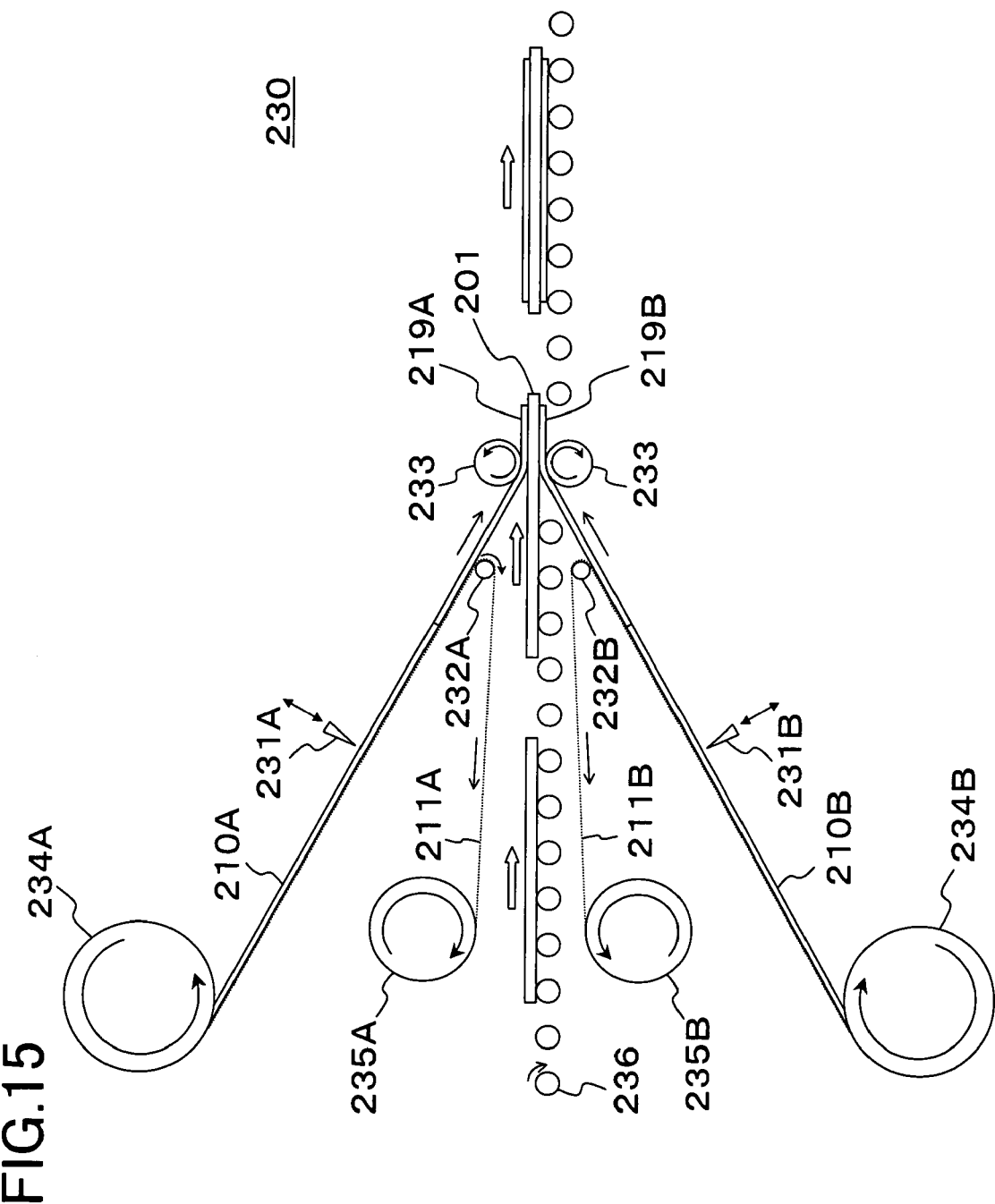

X–X'

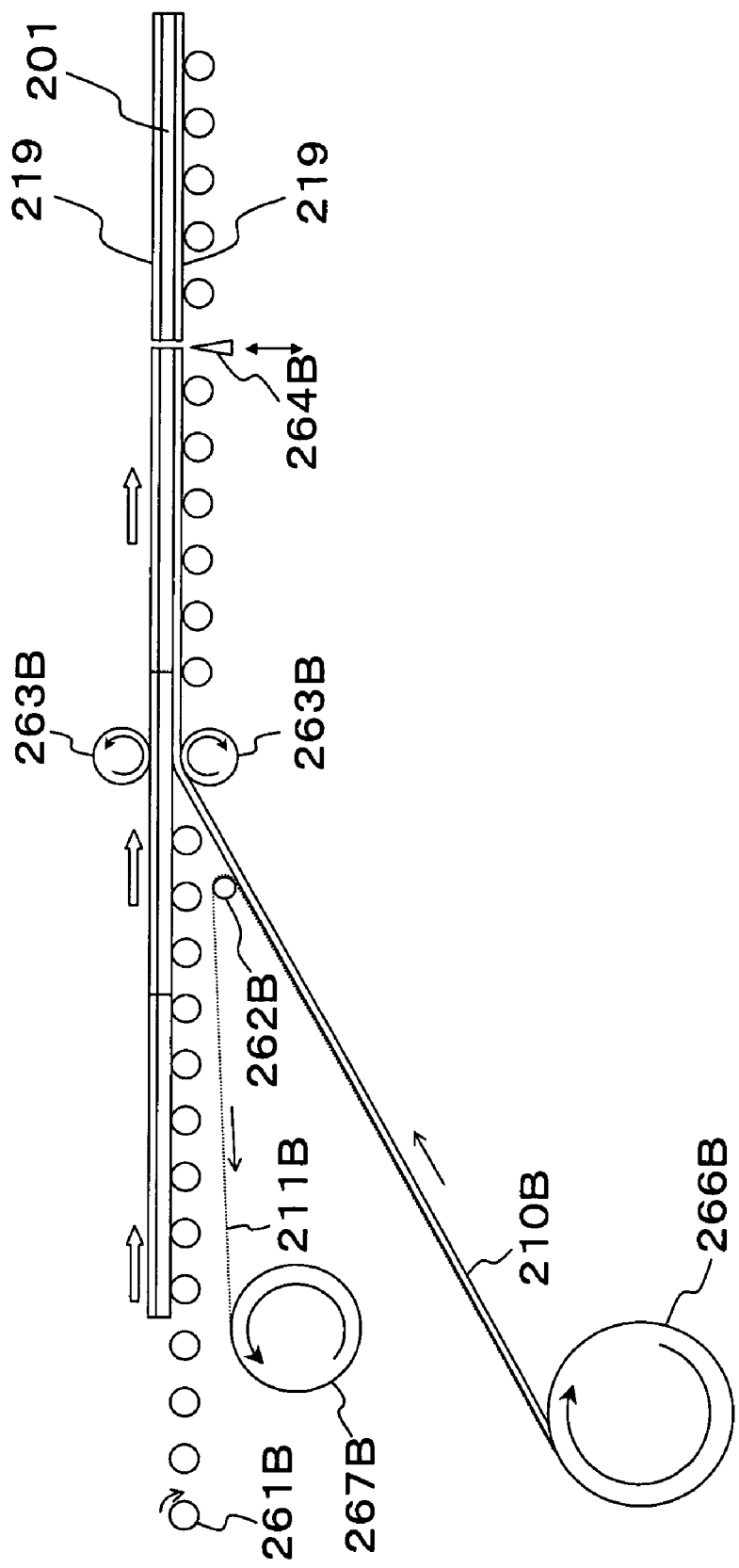

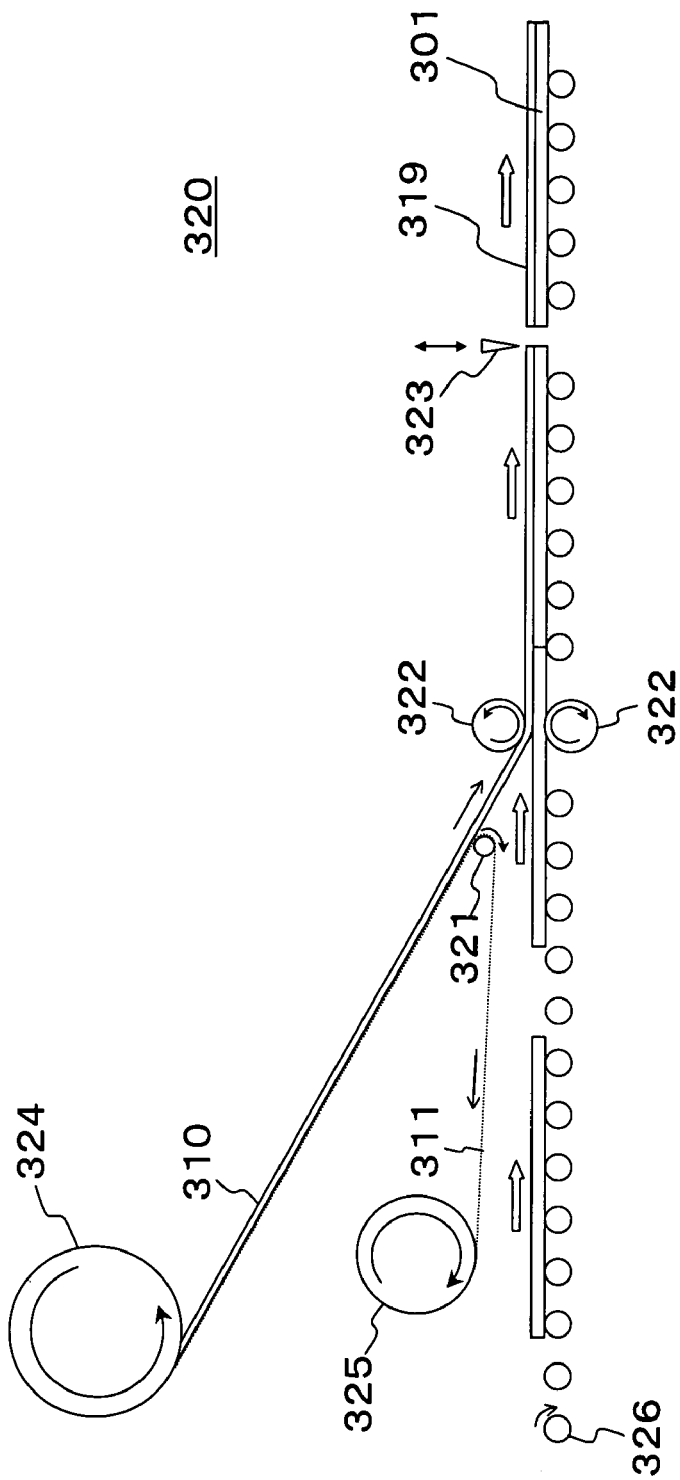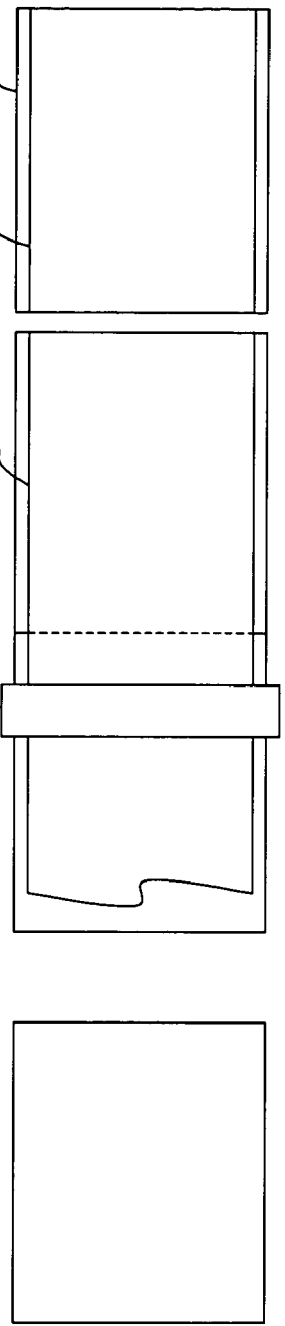

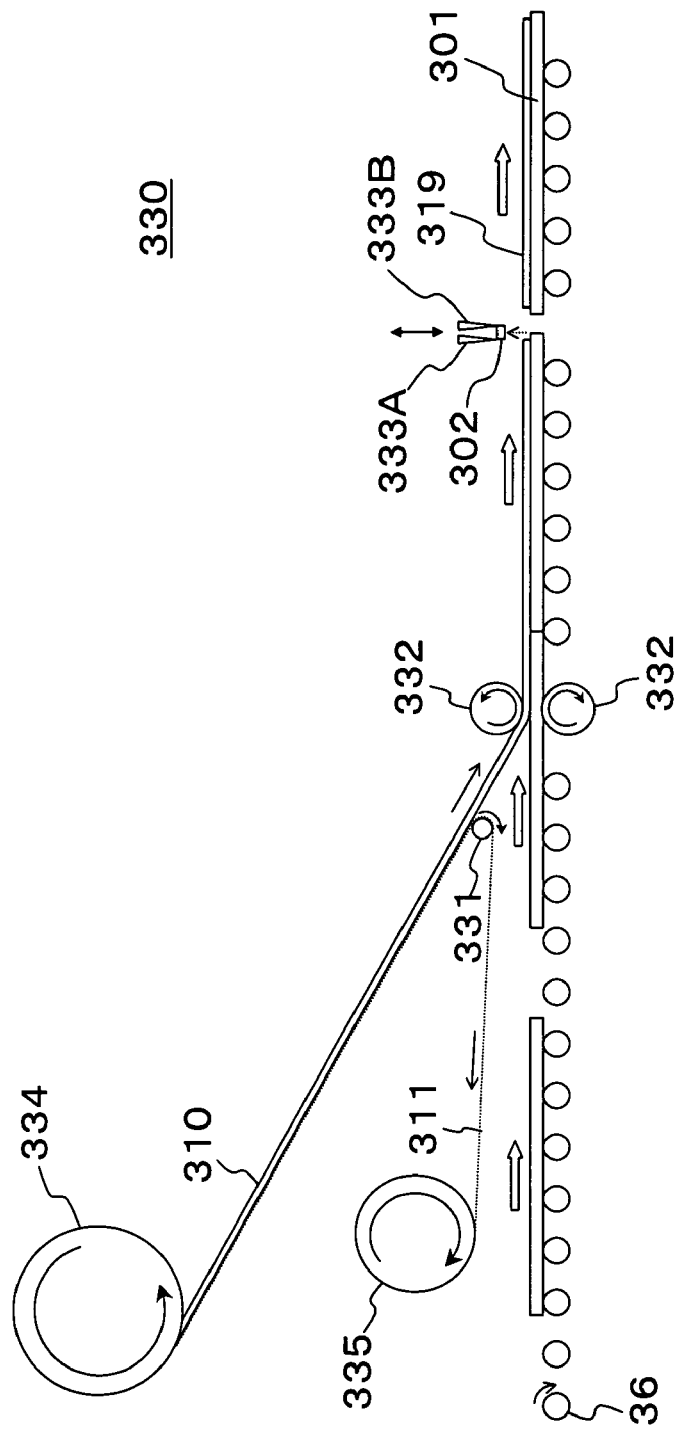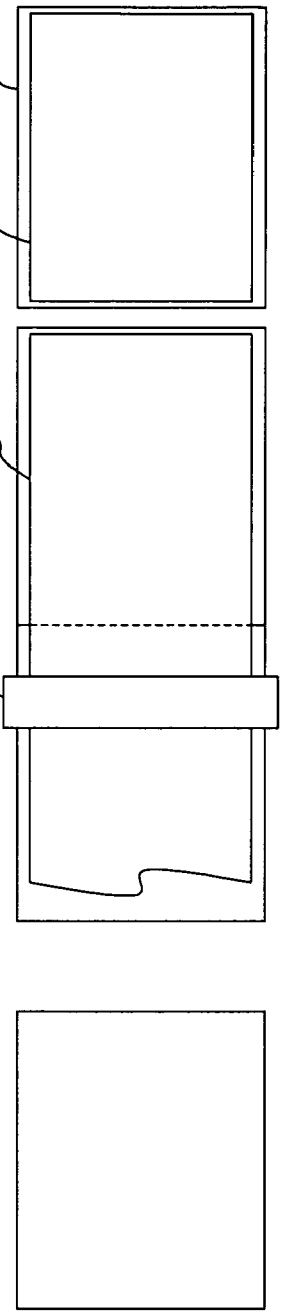
FIG.29(A)
FIG.29(B)

X-X'

METHOD AND APPARATUS FOR BONDING POLARIZING PLATE

FIELD OF THE INVENTION

This invention relates to a method and an apparatus for bonding a polarizing plate to a substrate. This invention also relates specifically to a method and an apparatus for bonding a polarizing plate to each of both surfaces of the substrate and, more specifically, to a method and an apparatus for continuously bonding the polarizing plates.

BACKGROUND

As a liquid crystal display apparatus, referred to below as LCD, is coming into widespread use, the demand for a polarizing plate is increasing rapidly. In general, a polarizing plate film includes a polarizing layer, exhibiting a light polarizing capability, and a protective film(s) bonded to one or both surfaces thereof (see FIG. 14(B)). As the material for the polarizing layer, polyvinyl alcohol, referred to below as PVA, is predominantly used. A polarizing film for a polarizing layer is formed by uniaxially stretching a PVA film, dyeing the resulting polarizing film with iodine or a dichroic dye and cross-linking with a boron compound. The sequence of the uniaxial stretching and the dyeing may be inverted, if so desired. As the protective film, mainly cellulose triacetate, referred to below as TAC, optically transparent and exhibiting only low birefringence, is predominantly used. The polarizing plate is usually stretched in the longitudinal direction, so that the axis of light absorption of the polarizing film is approximately parallel to the longitudinal direction (see FIG. 14(A)). The polarizing plate film is provided with an adhesive layer for bonding to the substrate. To the adhesive layer is bonded a release film for protecting the adhesive layer from contaminants, such as dust and dirt. The polarizing plate film, having the release film bonded thereto, is furnished to the market, with a strip-shaped film, stretched in the longitudinal direction, in a roll form.

In a conventional LCD employing the TN (twisted nematic) liquid crystal, the polarizing plate is arranged with its axis of light transmission inclined 45° relative to the longitudinal or transverse direction of an image frame. Thus, such a method consisting in bonding pieces of the polarizing plate, obtained on pre-punching a roll of a polarizing plate in a direction of 45° relative to the longitudinal direction of the roll, one by one to an LCD (see for example JP Patent Kokai JP-A-2002-23151) or such a method consisting in bonding a polarizing plate of a roll form to an LCD image surface as the longitudinal or transverse direction of the LCD image surface is inclined at an angle of 45° relatove to the longitudinal direction of the roll and subsequently severing the polarizing plate (see for example JP Patent Kokai JP-A-11-95028, FIG. 14(A)), have been devised. In an LCD employing a VA (vertical alignment) liquid crystal an LCD employing an IPS (in-plane switching) liquid crystal, the axis of light transmission of the polarizing plate is arranged in the longitudinal or transverse direction of the image frame and pieces of the polarizing plate are bonded one by one on the LCD.

In a conventional LCD, employing the TN (twisted nematic) crystal, such a substrate on both sides of which have been bonded polarizing plates is used. Specifically, a first polarizing plate, having the axis of light transmission inclined 45° relative to the longitudinal or transverse direction of the image frame, is arranged on one surface of the substrate, whilst a second polarizing plate, having the axis of light transmission inclined 90° relative to the axis of transmission of the first polarizing plate, is arranged on the opposite surface thereof.

SUMMARY OF THE DISCLOSURE

However, with the method of bonding the pieces of the polarizing plate one-by-one on the LCD, these pieces of the polarizing plate need to be re-loaded, or the release film needs to be peeled off, directly before bonding these pieces of the polarizing plates to the substrate, so that the process time cannot be shorter beyond a certain limit value. On the other hand, the piece of the polarizing plate is usually punched from the polarizing plate film in the roll form and hence tends to roll on itself with the consequence that it cannot be re-loaded or transported with an acceptable operating convenience.

With the method of bonding the polarizing plate to the LCD as the longitudinal or transverse direction of the LCD image frame is inclined 45° relative to the longitudinal direction of the roll, many unusable portions are produced near the roll end. In particular, there is raised a problem that, if a large size polarizing plate is used in keeping up with the increasing LCD image format, the yield is concomitantly lowered. The cut ends of the polarizing plate, not used for bonding, are hardly re-usable because plural sorts of the material are used in combination, as a result of which the amount of waste materials is increased. This problem is presented common in case the pieces of the polarizing plate are bonded one-by-one to the LCD.

Meanwhile, in the phase difference film, bonded in use to e.g., a polarizing plate forming the LCD with a view to optical compensation, such as prevention of coloration or enlarging the field of view, it is required to set the axis of orientation at various angles relative to the axis of light transmission of the polarizing plate. Up to now, such a system is used which consists in punching off the rim of a film, such as a PET film, obtained on longitudinal or transverse uniaxial stretching, so that the axis of orientation is at a preset inclination relative to the sides of the polarized plate, thus lowering the yield, as in the case of the polarizing plate.

In the case of a composite film of an increased thickness, such as a film obtained on bonding the phase difference film and the polarizing plate, cutting chips tend to be produced on severing. Moreover, if the composite film is severed directly before the bonding of the substrate and the composite film, the cutting chips tend to be introduced into the space between the substrate and the composite film.

In the roll type polarizing plate film, the roll is increased in width and weight, with the increasing size of the display image, with the result that difficulties are met in exchanging the rolls.

Moreover, since it is difficult to visually recognize the axis of transmission of the polarizing plate, it is difficult to exercise control over the direction of transmission of the polarizing plate, so that an error in the bonding direction is likely to be produced. Additionally, when bonding the pieces of the polarizing plate one by one to the LCD, it is difficult to bond the chips of the polarizing plate simultaneously on both sides of the LCD, as the directions of the axes of light transmission of the chips of the polarizing plate are set to design directions, because one lateral side of the LCD is supported by suction in many cases.

It is noted that, when bonding the polarizing plates as the longitudinal or transverse direction of the LCD image surface is inclined 45° relative to the longitudinal direction of the roll, it is difficult to bond the polarizing plates simultaneously continuously to both substrate surfaces, as the axes of light transmission of the polarizing plates are set to the design directions, as described above, because a carrier is needed to keep the angle of the LCD at a constant magnitude. Moreover, when bonding a polarizing plate to one substrate surface and subsequently bonding another polarizing plate to the opposite substrate surface, angular adjustment is needed in re-loading the substrate from the first carrier to the second carrier, so that a complex mechanism is needed for automation.

In addition, in the conventional polarizing plate bonding apparatus, there are occasions where the tacky surface in a roll portion responsible for changing the film supply direction in the apparatus becomes roughed when the film supply is halted in conjunction with cessation of the substrate transport, with the film thickness of the adhesive material becoming thicker or thinner to produce a so-called stop mark, thus possibly deteriorating the display quality.

Thus there is much desired in the art.

It is a first object of the present invention to provide a method and an apparatus for bonding a polarizing plate which are superior in the operating efficiency and in the yield of the polarizing plate.

It is a second object of the present invention to provide a method and an apparatus for bonding a polarizing plate in which a composite film composed of the phase difference film and the polarizing plate bonded together may be produced at a high yield.

It is a third object of the present invention to provide a method and an apparatus for bonding a polarizing plate in which cutting chips are not liable to be intruded into a spacing between the substrate and the film even when the film is cut directly before bonding.

It is a fourth object of the present invention to provide a method and an apparatus for bonding a polarizing plate in which roll exchange operations may be carried out easily.

It is a fifth object of the present invention to provide a method and an apparatus for bonding a polarizing plate in which the polarizing plate can be bonded simultaneously to each substrate surface.

It is a sixth object of the present invention to provide a method and an apparatus for bonding a polarizing plate in which, when bonding the polarizing plate to each substrate surface, control on the direction of the axis of light transmission of the polarizing plate can be exercised easily.

It is a seventh object of the present invention to provide a method and an apparatus for bonding a polarizing plate in which it is possible to prohibit stop marks on the adhesive film surface from being produced.

(First Solution)

In a first aspect, the present invention (first solution) provides a polarizing plate bonding apparatus comprising cutting means for cutting at least a polarizing plate and an adhesive layer of a strip-shaped film, composed of a polarizing plate and a release film bonded to the polarizing plate with interposition of the adhesive layer, so as to leave the release film uncut, when a forward end side pre-severed end face of the strip-shaped film perpendicular to a longitudinal direction of the strip-shaped film has traveled a length corresponding to a length of a substrate, to form a film piece, release film separating means for separating the release film from the film piece severed by the cutting, and bonding means for bonding a tacky surface of the film piece freed of the release film to a mating position of the substrate so that a forward end side end face of the transported substrate is parallel to the severed end face of the film piece.

In a second aspect, the present invention (first solution) provides a polarizing plate bonding method comprising a cutting step of cutting at least a polarizing plate and an adhesive layer of a strip-shaped film, composed of the polarizing plate and a release film bonded to the polarizing plate, with interposition of the adhesive layer, when a forward end side severed end face of the strip-shaped film perpendicular to a longitudinal direction of the strip-shaped film has traveled a length corresponding to a length of a substrate, to form a film piece so as to leave the release film uncut, a release film separating step of separating the release film from the film piece severed by the cutting, and a bonding step of bonding a tacky surface of the film piece freed of the release film to a mating position of the substrate so that a forward end side end face of the transported substrate is parallel to the severed end face of the film piece.

In a third aspect, the present invention (first solution) provides a polarizing plate bonding method comprising a step of reeling out a strip-shaped film from a roll of the strip-shaped film of a preset width, composed of a polarizing plate and a release film bonded to the polarizing plate, with interposition of the adhesive layer, and sending the film along a longitudinal direction thereof, a step of cutting at least the polarizing plate and the adhesive layer of the strip-shaped film, each time a forward end side severed end face of the strip-shaped film perpendicular to a longitudinal direction of the strip-shaped film has traveled up to a length corresponding to a length of a substrate, in a direction perpendicular to the longitudinal direction of the strip-shaped film, to form a film piece so as to leave the release film uncut, a release film separating step of separating the release film from the film piece severed by the cutting, a step of supplying the film piece, freed of the release film, in meeting with the position of the substrate transported, and a step of bonding the tacky surface of the supplied film piece to a mating position of the substrate so that the forward end side end face of the transported substrate is parallel to the severed end face of the film piece.

(Second Solution)

In one aspect, the present invention (second solution) provides a polarizing plate bonding apparatus comprising cutting means for cutting a first strip-shaped film which is composed of a polarizing plate and a release film bonded to the polarizing plate with interposition of an adhesive layer, and which is supplied from a front plate surface of a substrate being transported, and a second strip-shaped film which is composed of a polarizing plate and a release film bonded to the polarizing plate with interposition of an adhesive layer, and which is supplied from a reverse plate surface of the substrate being transported, when forward side pre-severed end faces along a proceeding direction of the first and second strip-shaped films extending in a direction perpendicular to a longitudinal direction of the first and second strip-shaped films have traveled a distance corresponding to a length of the substrate, in such a manner that at least the polarizing plates and the adhesive layers of the first and second strip-shaped films are severed along a direction perpendicular to the longitudinal direction, with the release film remaining uncut, a direction of an axis of light transmission of the polarizing plate of the second strip-shaped film being perpendicular to a direction of an axis of light transmission of the polarizing plate of the first strip-shaped film when the first and second strip-shaped films are bonded together on the release film sides thereof, release film separating means for separating the release films from a first film piece severed by the cutting of the first strip-shaped film and a second film piece severed by the cutting of the first strip-shaped film, and bonding means for bonding a tacky surface of the first film piece, freed of the release film, to a mating front side plate surface of the substrate so that the severed end face of the first film piece is parallel to the forward side end face along a transporting direction of the substrate, and for bonding a tacky surface of the second film piece, freed of the release film, to a mating reverse side plate surface of the substrate so that the severed end face of the second film piece is parallel to the forward side end face along the transporting direction of the substrate.

In a second aspect, the present invention (second solution) provides a polarizing plate bonding apparatus comprising release film separating means for separating a release film from a first strip-shaped film, comprised of a polarizing plate and a release film bonded to the polarizing plate with interposition of an adhesive layer, the first strip-shaped film being supplied from a front plate surface side of a substrate being transported, and from a second strip-shaped film, comprised of a polarizing plate and a release film bonded to the polarizing plate with interposition of an adhesive layer, the second strip-shaped film being supplied from a reverse plate surface side of the substrate being transported, with a direction of an axis of light transmission of the polarizing plate of the second strip-shaped film being perpendicular to a direction of an axis of light transmission of the polarizing plate of the first strip-shaped film when the release film of the second strip-shaped film is bonded to the release film of the first strip-shaped film, bonding means for bonding a tacky surface of the first strip-shaped film, freed of the release film, to a mating front plate surface of the substrate so that a proceeding direction of the first strip-shaped film coincides with the transport direction of the substrate, and for bonding a tacky surface of the second strip-shaped film, freed of the release film, to a mating reverse plate surface of the substrate so that the proceeding direction of the second strip-shaped film coincides with the transport direction of the substrate, and cutting means for cutting the first and second strip-shaped films, bonded to both surfaces of the substrate by the bonding means, in a direction parallel to the forward end face or the rear end face along the transport direction of the substrate.

In a third aspect, the present invention (second solution) provides a polarizing plate bonding apparatus comprising first transport means for transporting the substrate with one end surface thereof perpendicular to the proceeding direction, first bonding means for bonding a tacky surface of a first film piece, having a polarizing plate, to a mating plate surface piece of the substrate so that the pre-severed end face of the first film piece is parallel to an end face along the proceeding direction of the substrate transported by the first transporting means, second transporting means for transporting the substrate transported by the first transporting means along a direction perpendicular to the transport direction by the first transport means, and second bonding means for bonding a tacky surface of a second film piece to a mating plate surface of the substrate opposite to the surface thereof to which has been bonded the first film piece, so that the pre-severed end face of the second film piece is parallel to the end face along the proceeding direction of the substrate transported by the second transport means. The second film piece has a polarizing plate, and is supplied from a plate surface opposite to the surface bonded to the first film piece of the substrate transported by the second transport means.

The direction of the axis of light transmission of the polarizing plate of the second film piece is perpendicular to the direction of the axis of light transmission of the polarizing plate of the first film piece when the tacky surface of the polarizing plate of the second film piece is bonded to the tacky surface of the polarizing plate of the first film piece.

In a fourth aspect, the present invention (second solution) provides a polarizing plate bonding apparatus comprising first transport means for transporting a substrate with an end face thereof perpendicular to the proceeding direction, first cutting means for cutting a tacky surface of a first strip-shaped film having a polarizing plate, along a direction parallel to the forward or rear end face along the transport direction of the substrate so that the proceeding direction of the first strip-shaped film is parallel to the end face along the proceeding direction of the substrate transported by the first transport means, second transport means for transporting the substrate transported by the first transport means along a direction perpendicular to the transport direction by the first transport means, and second cutting means for cutting along a direction parallel to the forward or rear end face along the transport direction of the substrate. To a surface of this substrate opposite to the surface thereof bonded to the film piece of the first strip-shaped film is bonded a tacky surface of a second strip-shaped film, so that the severed end face of the second strip-shaped film is parallel to the end face along the proceeding direction of the substrate transported by the second transport means. The second strip-shaped film has a polarizing plate and being supplied from a plate surface side of the substrate transported by the second transport means which is opposite to the substrate surface bonded to the first film piece. The axis of light transmission of the polarizing plate of the second strip-shaped film is perpendicular to the axis of light transmission of the polarizing plate of the first strip-shaped film when the release film side of the second strip-shaped film is bonded to the release film side of the first strip-shaped film.

In a fifth aspect, the present invention (second solution) provides a method for bonding a polarizing plate comprising a step of cutting a first strip-shaped film including a polarizing plate and a release film bonded thereto with interposition of an adhesive layer, and a second strip-shaped film including a polarizing plate and a release film bonded thereto with interposition of an adhesive layer, when the pre-severed end faces of the first and second strip-shaped films along the proceeding direction thereof perpendicular to the longitudinal direction have traveled a distance corresponding to the length of a substrate, so that at least the polarizing plates and the adhesive layers of the first and second strip-shaped films are severed along a direction perpendicular to the longitudinal direction, with the exception of the release layer which remains uncut, a step of separating the release films of the first and second strip-shaped films, severed by the cutting of the first and second strip-shaped films, and a step of bonding the tacky surface of the first film piece, freed of the release film, to a mating front side surface of the first strip-shaped film, so that the severed end face of the first film piece is parallel to the forward end face along the transport direction of the substrate, and bonding the tacky surface of the second film piece, freed of the release film, to a mating reverse side surface of the second strip-shaped film, so that the severed end face of the second film piece is parallel to the forward end face along the transport direction of the substrate. The first strip-shaped film is supplied from the front plate surface side of substrate being transported, while the second strip-shaped film is supplied from the reverse plate surface side of a substrate being transported. The direction of the axis of light transmission of the polarizing plate of the second strip-shaped film is perpendicular to the direction of the axis of light transmission of the polarizing plate of the first strip-shaped film when the release film of the second strip-shaped film is bonded to the release film of the first strip-shaped film, a step of separating the release films of the first and second strip-shaped films, severed by the cutting of the first and second strip-shaped films, and a step of bonding the tacky surface of the first film piece, freed of the release film, to a mating front side surface of the first strip-shaped film, so that the severed end face of the first film piece is parallel to the forward end face along the transport direction of the substrate, and bonding the tacky surface of the second film piece, freed of the release film, to a mating reverse side surface of the second strip-shaped film, so that the severed end face of the second film piece is parallel to the forward end face along the transport direction of the substrate.

In a sixth aspect, the present invention (second solution) provides a method for bonding a polarizing plate comprising a step of separating a release film from each of a first strip-shaped film and a second strip-shaped film, the first strip-shaped film including a polarizing plate and the release film bonded thereto with interposition of an adhesive layer, the first strip-shaped film being supplied from the front plate surface side of a substrate being transported; the second strip-shaped film including a polarizing plate and the release film bonded thereto with interposition of an adhesive layer, the second strip-shaped film being supplied from the reverse plate surface side of a substrate being transported; the direction of the axis of light transmission of the polarizing plate of the second strip-shaped film being perpendicular to the direction of the axis of light transmission of the polarizing plate of the first strip-shaped film when the release film of the second strip-shaped film is bonded to the release film of the first strip-shaped film, a bonding step of bonding the tacky surface of the first strip-shaped film, freed of the release film, to a mating front plate surface of the substrate so that the proceeding direction of the first strip-shaped film coincides with the transport direction of the substrate, and bonding the tacky surface of the second strip-shaped film, freed of the release film, to a mating reverse plate surface of the substrate so that the proceeding direction of the second strip-shaped film coincides with the transport direction of the substrate, and a cutting step of severing the first strip-shaped film and the second strip-shaped film, bonded to both surfaces of the substrate by the bonding means, along the direction parallel to the forward or rear end faces along the transport direction of the substrate.

In a seventh aspect, the present invention (second solution) provides a method for bonding a polarizing plate comprising a step of transporting a substrate with one end face of the substrate perpendicular to the proceeding direction, a step of bonding a tacky surface of a first film piece, having a polarizing plate, to a mating plate surface piece of the substrate so that the severed end face of the first film piece is parallel to the forward side end face along the transport direction of the substrate, a step of changing the direction of transport of the transported substrate and transporting the substrate along the so changed direction, and a step of bonding a tacky surface of the second film piece to a plate surface of the substrate opposite to the substrate surface to which the first film piece has been bonded, so that the severed end face of the second film piece is parallel to a forward end face along the transport direction of the substrate; the second film piece including a polarizing plate and being supplied from the plate surface of the substrate opposite to the substrate surface to which the first film piece has been bonded; the direction of the axis of light transmission of the polarizing plate of the second strip-shaped film being perpendicular to the direction of the axis of light transmission of the polarizing plate of the first strip-shaped film when the tacky surface of the polarizing plate is bonded to the tacky surface of the first strip-shaped film In an eighth aspect, the present invention (second solution) provides a method for bonding a polarizing plate comprising a step of transporting a substrate with one end face of the substrate perpendicular to the proceeding direction, a step of cutting a tacky surface of a first strip-shaped film, having a polarizing plate, along a direction parallel to the forward or rear side end face along the transport direction of the substrate, bonded to one mating plate surface, so that the proceeding direction of the first strip-shaped film is parallel to the forward side end face along the transport direction of the substrate, a second transport step of changing the direction of transport of the transported substrate and transporting the substrate along the so changed direction, and a step of cutting along a direction parallel to the forward or rear end face along the transport direction of the substrate, to a plate surface of which opposite to the plate surface carrying the film piece of the first strip-shaped film has been bonded a tacky surface of the second strip-shaped film, so that the severed end face of the second strip-shaped film is parallel to the end face along the proceeding direction of the substrate. The second strip-shaped film has a polarizing plate and is supplied from a plate surface side of the substrate transported by the second transport means which is opposite to the substrate surface bonded to the first film piece. The axis of light transmission of the polarizing plate of the second strip-shaped film is perpendicular to the axis of light transmission of the polarizing plate of said first strip-shaped film when the release film side of the second strip-shaped film is bonded to the release film side of the first strip-shaped film.

(Third Solution)

In a first aspect, the present invention (third solution) provides a polarizing plate bonding apparatus comprising release film separating means for separating a release film from a strip-shaped film comprised of a polarizing plate and the release film bonded thereto with interposition of an adhesive layer, the strip-shaped film being supplied from one plate surface of a substrate being transported, bonding means for bonding a tacky surface of the strip-shaped film, freed of the release film, so that the proceeding direction of the strip-shaped film coincides with the transport direction of the substrate, and cutting means for cutting the strip-shaped film, bonded to one surface of the substrate by the bonding means, along a direction parallel to a forward or rear end face along the transport direction of the substrate.

In a second aspect, the present invention (third solution) provides a method for bonding a polarizing plate comprising a step of separating a release film from a strip-shaped film comprised of a polarizing plate and the release film bonded thereto with interposition of an adhesive layer, the strip-shaped film being supplied from one plate surface of a substrate being transported;

a step of bonding a tacky surface of the strip-shaped film, freed of the release film, to a mating plate surface of the substrate, so that the proceeding direction of the strip-shaped film coincides with the transport direction of the substrate; and a step of severing the strip-shaped film, bonded to one surface of the substrate by the bonding, along a direction parallel to the forward or rear end face along the transport direction of the substrate.

(Fourth Solution)

In a first aspect, the present invention (fourth solution) provides a polarizing plate bonding apparatus comprising release film separating means for separating a release film from a strip-shaped film comprised of a polarizing plate and the release film bonded thereto with interposition of an adhesive layer, the strip-shaped film being supplied from one plate surface of the substrate transported, in a state such that at least the polarizing plate and the adhesive film are severed so that at least one side of a rectangle of the strip-shaped film in a film surface area registering with the substrate is perpendicular to the longitudinal direction of the film, with the release film remaining uncut, bonding means for bonding at least a tacky surface within the rectangle of the strip-shaped film to a mating plate surface of the substrate, so that the proceeding direction of the strip-shaped film coincides with the transport direction of the substrate, and selvedge separating means for separating selvedges of the strip-shaped film other than the inner area of the rectangle from the substrate.

In a second aspect, the present invention (fourth solution) provides a polarizing plate bonding apparatus comprising cutting means for cutting at least a polarizing plate and an adhesive layer of a strip-shaped film, comprised of the polarizing plate and a release layer bonded thereto with interposition of an adhesive layer, so as to leave the release film uncut, the strip-shaped film being supplied from one plate surface side of a substrate being transported, so that at least one side of a rectangle in a film surface area mating with the substrate is perpendicular to the longitudinal direction of the film, release film separating means for separating the release film from the strip-shaped film cut by the cutting means, bonding means for bonding a tacky surface of an inner area of the rectangle of the strip-shaped film, freed of the release film, to a mating plate surface of the substrate, so that the proceeding direction of the strip-shaped film coincides with the transport direction of the substrate, and selvedge separating means for separating a selvedge of the strip-shaped film other than the inner area of the rectangle from the substrate.

In a third aspect, the present invention (fourth solution) provides a polarizing plate bonding apparatus comprising release film separating means for separating a release film from a strip-shaped film, comprised of a polarizing plate and the release layer bonded thereto with interposition of an adhesive layer, the strip-shaped film being supplied from one plate surface of a substrate being transported, bonding means for bonding at least a tacky surface of the strip-shaped film, freed of the release film, to a mating plate surface of the substrate, so that the proceeding direction of the strip-shaped film coincides with the transport direction of the substrate, cutting means for cutting the strip-shaped film within an area in which the strip-shaped film has been bonded to the substrate, within a rectangle corresponding to the substrate, so that at least one side of the rectangle is perpendicular to the longitudinal direction, and selvedge separating means for separating selvedges of the strip-shaped film other than the inner area of the rectangle from the substrate.

In a fourth aspect, the present invention (fourth solution) provides a method for bonding a polarizing plate comprising a step of separating a release film from a strip-shaped film comprised of a polarizing plate and the release film bonded thereto with interposition of an adhesive layer and supplied from one plate surface of a substrate being transported, in a state in which at least the polarizing plate and the release film are pre-severed, with the release film remaining uncut, so that at least one side of a rectangle corresponding in profile to the substrate in an area of a film surface is perpendicular to the longitudinal direction of the film, a step of bonding a tacky surface of an inner portion of the rectangle of the strip-shaped film, freed of the release film, to a mating plate surface of the substrate, so that the proceeding direction of the strip-shaped film coincides with the transport direction of the substrate, and a step of separating a selvedge of the strip-shaped film other than the inner portion of the rectangle, from the substrate.

In a fifth aspect, the present invention (fourth solution) provides a method for bonding a polarizing plate comprising a step of severing at least a polarizing plate and an adhesive layer from a strip-shaped film, comprised of a polarizing plate and the release film bonded thereto with interposition of an adhesive film, and supplied from one plate surface of a substrate being transported, with the release film remaining uncut, so that at least one side of a rectangle corresponding in profile to the substrate in an area of a film surface is perpendicular to the longitudinal direction of the film, a step of separating the release film from the strip-shaped film severed in the cutting step, a step of bonding at least a tacky surface in an inner portion of the rectangle of the strip-shaped film, freed of the release film, to a mating plate surface of the substrate, so that the proceeding direction of the strip-shaped film coincides with the transport direction of the substrate, and a step of separating a selvedge of the strip-shaped film other than the inner portion of the rectangle, from the substrate.

In a sixth aspect, the present invention (fourth solution) provides a method for bonding a polarizing plate comprising a step of separating a release film from a strip-shaped film comprised of a polarizing plate and the release film bonded thereto with interposition of an adhesive film, the strip-shaped film being supplied from one plate surface of a substrate transported, a step of bonding at least a tacky surface of the strip-shaped film, freed of the release film, to a mating plate surface of the substrate, so that the proceeding direction of the strip-shaped film coincides with the transport direction of the substrate, a step of cutting the strip-shaped film within an area in which the strip-shaped film is bonded to the substrate, within a rectangle mating in profile to the substrate, so that at least one side of the rectangle is perpendicular to the longitudinal direction of the film, and a step of separating a selvedge of the strip-shaped film other than the inner portion of the rectangle from the substrate.

BRIEF DESCRIPTION OF THE DRAWINGS

FIG. 3 is a schematic side view showing the structure of a first release film separating means in the polarizing plate bonding apparatus of the present invention (first solution).

FIG. 4 is a schematic side view showing the structure of a second release film separating means in the polarizing plate bonding apparatus of the present invention (first solution).

FIG. 15 is a side view schematically showing the structure of a polarizing plate bonding apparatus according to an embodiment 1 of the present invention (second solution).

FIG. 25 is a side view schematically showing the structure of a second transport unit of the polarizing plate bonding apparatus according to the embodiment 4 of the present invention (second solution).

FIG. 26 is a side view and a plan view schematically showing the structure of a polarizing plate bonding apparatus according to the embodiment 1 of the present invention (third solution).

FIG. 29 is a side view and a plan view schematically showing the structure of a polarizing plate bonding apparatus according to the embodiment 2 of the present invention (third solution).

PREFERRED EMBODIMENTS OF THE INVENTION

[Embodiment of the First Solution]

Figure 1:
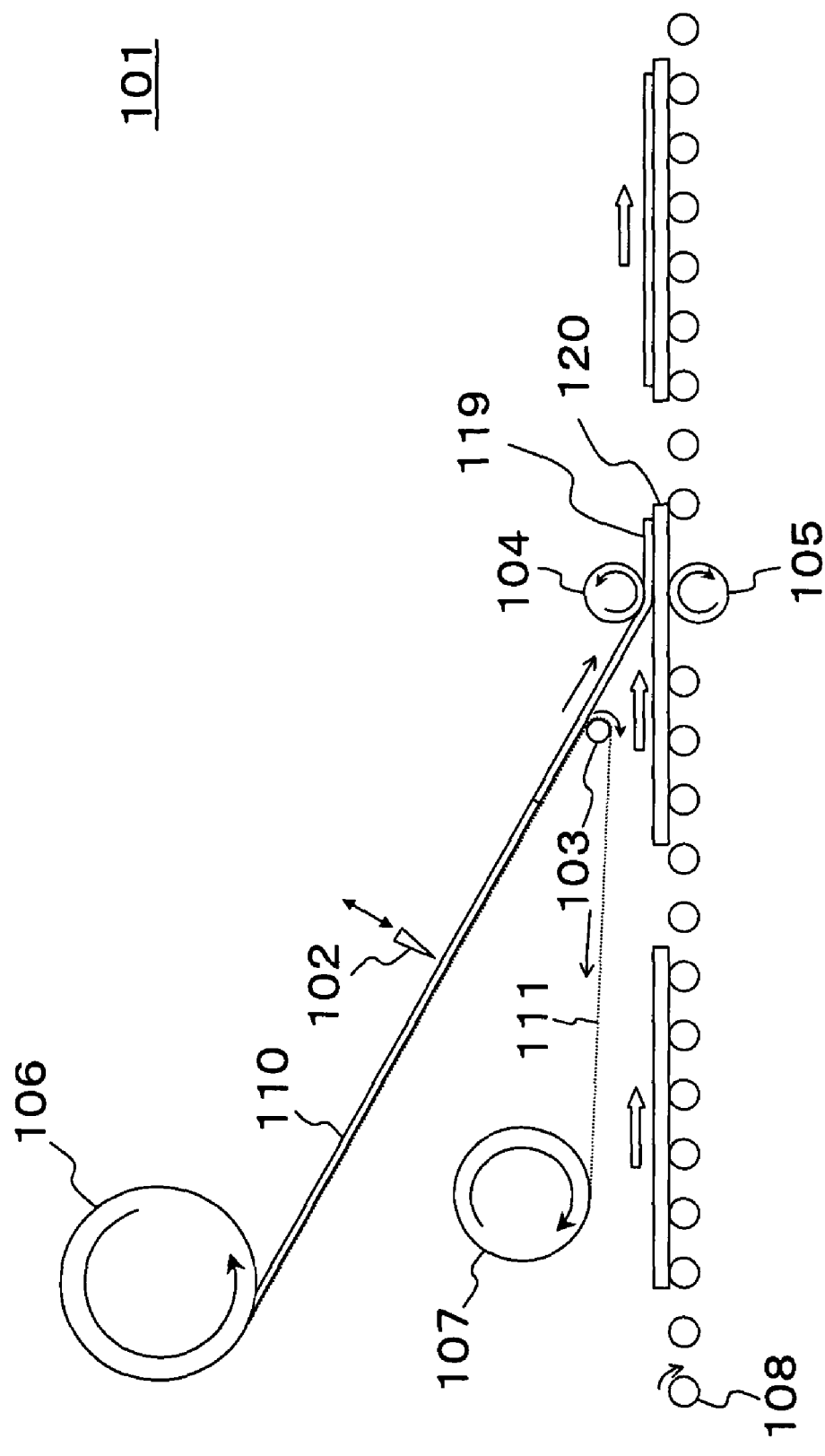
FIG. 1 is a schematic side view showing the structure of a strip-shaped film used in an embodiment of a polarizing plate bonding apparatus of the present invention (first solution).

Referring to the drawings, certain preferred embodiments of the present invention (first solution) are explained in detail. FIG. 1 is a side view schematically showing the structure of a polarizing plate bonding apparatus according to an embodiment of the present invention (first solution). FIG. 2 is a plan view and a cross-sectional view showing a band-shaped film used in a polarizing plate bonding device according to an embodiment of the present invention (first solution).

FIG. 1 shows a polarizing plate bonding apparatus 101 for bonding a polarizing plate to a substrate. The polarizing plate bonding apparatus 101 includes a cutting means 102 for cutting at least a polarizing plate and an adhesive layer of a strip-shaped film 110, composed of the polarizing plate to which a release film 111 is bonded with the adhesive layer therebetween, in the direction orthogonal to the longitudinal direction of the strip-shaped film 110, and a release film 111 bonded to the polarizing plate with interposition of the adhesive layer, so as to leave the release film 111 uncut, when a forward-facing severed end of the strip-shaped film perpendicular to the longitudinal direction of the strip-shaped film has traveled a length corresponding to the length of a substrate 120, a release film separating means 103 for separating the release film 111 from a film piece 119 severed by the cutting, and bonding means 104, 105 for bonding the tacky surface of the film piece 119 freed of the release film 111 to a corresponding position of the substrate 120 so that the forward-facing end of the substrate 120 is parallel to the severed end of the film piece 119, such that the film pieces of the polarizing plate can be bonded to the substrate continuously automatically to raise the yield of the polarizing plate to 100%.

Figure 2A:
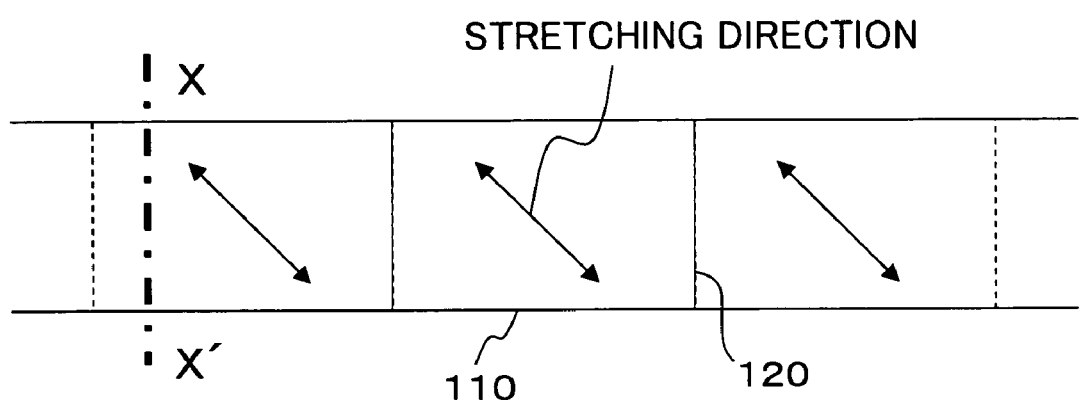
FIGS. 2(A) and (B) are a plan view and a cross-sectional view, respectively, showing the structure of a strip-shaped film used in the polarizing plate bonding apparatus of the present invention (first solution).
Figure 2B:
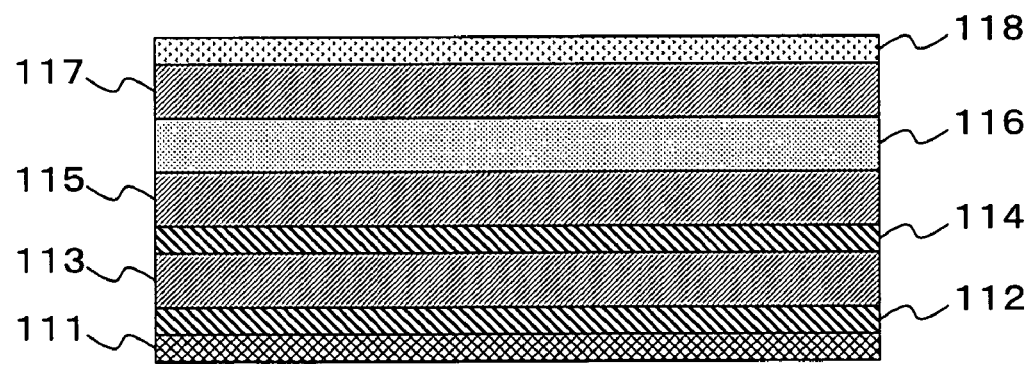

A strip-shaped film 110 according to the present invention (first solution) is a film comprised of a polarizing plate and a release film 111 bonded thereto via an adhesive layer, and may, for example, a circular polarizing film comprised of a polarizing plate 116 and a phase difference film 113 bonded together as shown in FIG. 2(B). In cases where it is used for an LCD for TN liquid crystal, the polarizing plate 116 has its direction of the axis of transmission oriented obliquely with respect to the longitudinal direction of the film. The angle of inclination between the longitudinal direction of the film and the axis of transmission is preferably not less than 20° and not more than 70° and more preferably not less than 40° and not more than 50°. It is usually 45° (see FIG. 2(A)). As to the method for producing this sort of the polarizing plate, the JP Patent Kokai JP-A-2002-86554 should be referred. Preferably, protective films 115, 117 are bonded to both surfaces of the polarizing plate 116. This polarizing plate 116 is such a polarizing plate stretched obliquely with respect to the longitudinal direction of the film and hence is termed below an "obliquely stretched polarizing plate". With use of the obliquely stretched polarizing plate 116, continuous film supply becomes possible. In the case of a circular polarizing film, composed of the obliquely stretched polarizing plate 116 (protective film 115) and a phase difference film 113, bonded thereto via an adhesive layer 114, the phase difference film 113 as used preferably has an axis of orientation perpendicular or parallel to the longitudinal direction of the film. By so doing, the circular polarizing film can be continuously supplied. The polarizing plate 116 is of a thickness on the order of for example 5 through 100 μm. The width of the polarizing plate 116 is suitably selected depending on the size of the substrate to which it is bonded. It is sufficient that the adhesives 112, 114 are ordinary adhesives used for bonding the substrate and an optical film to each other, such as an acrylic-, polyurethane-, epoxy- or rubber-based adhesive. The release film 111 is of a release material which may be a routine release material used for an optical film, such as a polyethylene terephthalate film or a polyester film. On the surface of the polarizing plate 116 opposite to the surface thereof bonded to the release film 111, an inserting paper sheet 118 may be bonded for protecting the film surface from possible grazing. The strip-shaped film 110 is preferably reeled out from a payout (real-out) roll 106 (see FIG. 1). Meanwhile, in cases where the polarizing plate 116 is used for an LCD for VA liquid crystal or a liquid crystal for an IPS system, the polarizing plate 116 may be used, the direction of the axis of light transmission of which is oriented parallel or at right angles to the longitudinal direction of the film.

A substrate 120 is a flat plate shaped member, such as a glass substrate or a plastic substrate, used for a display apparatus, such as an LCD or a plasma display apparatus. The substrate 120 may be a substrate on which component parts, such as liquid crystal cell or electrode, are previously formed. The substrate 120 may be substantially quadrilateral, such as a square or a rectangle (see FIGS. 1 and 2(A)).

The cutting means 102 may be exemplified by a push-cut or a dicing type cutter, used for ordinary cutting of an optical film, provided with, for example, a cutter edge, a cylinder driving the cutter edge, and with a lower dead point adjustment member for adjusting the lower dead point of the cutter edge. By adjusting the lower dead point to not more than 0.5 times as thick as the release film 111, the other layers of the strip-shaped film 110, such as the polarizing plate or the adhesive layer, may be cut in a direction perpendicular to the longitudinal direction of the film (see FIG. 1). In cases where the lower dead point is more than 0.5 times, the other layers of the strip-shaped film 110, such as the polarizing plate or the adhesive layer, may remain uncut, whereas, in cases where the lower dead point is less than 0 times, even the release film 111 may be cut.

The release film separating means 103 is a means (roll in FIG. 1) for separating the release film from the strip-shaped film (film piece), and may, for example, be configured as follows:

FIG. 3 is a side view schematically showing the structure of a first release film separating means in a polarizing plate bonding apparatus according to an embodiment of the present invention (first solution). As this first release film separating means, an edge member 131 having a rounded edge at the foremost part thereof is used (see FIG. 3). With an edge end of the edge member 131 directed in the direction of travel the film piece 119, one blade surface of the edge member 131 is abutted against the surface of the release film 111 to cause the edge end to fold only the release film 111 towards the other blade surface of the edge member 131. The film piece 119, now freed of the release film 111, is allowed to proceed in the forward direction, in order to take up only the release film 111.

FIG. 4 depicts a side view schematically showing the structure of a second release film separating means in the polarizing plate bonding apparatus according to one embodiment of the present invention (first solution). As the second release film separating means, a suction conveyor 132 is used, in which an endless belt 136, provided with air vent holes, is placed on pulleys 134, 135 provided on both ends of a frame, not shown, and air is sucked from an inner side of the belt 136 by a suction table 133 in a flattened area of the belt 136 to suck the film piece 119 on the belt 136 to transport the so sucked film piece (see FIG. 4). The suction area on the belt 136 of the suction conveyor 132 is abutted against the surface of the release film 111 of the film piece 119. The transport side pulley 134 causes only the release film 111 to be folded back towards the return path of the belt 136 to take up only the release film 111 as the film piece 119 freed of the release film 111 is allowed to travel in the forward direction. The transport side pulley 134 operates as a separating roll.

Figure 5:
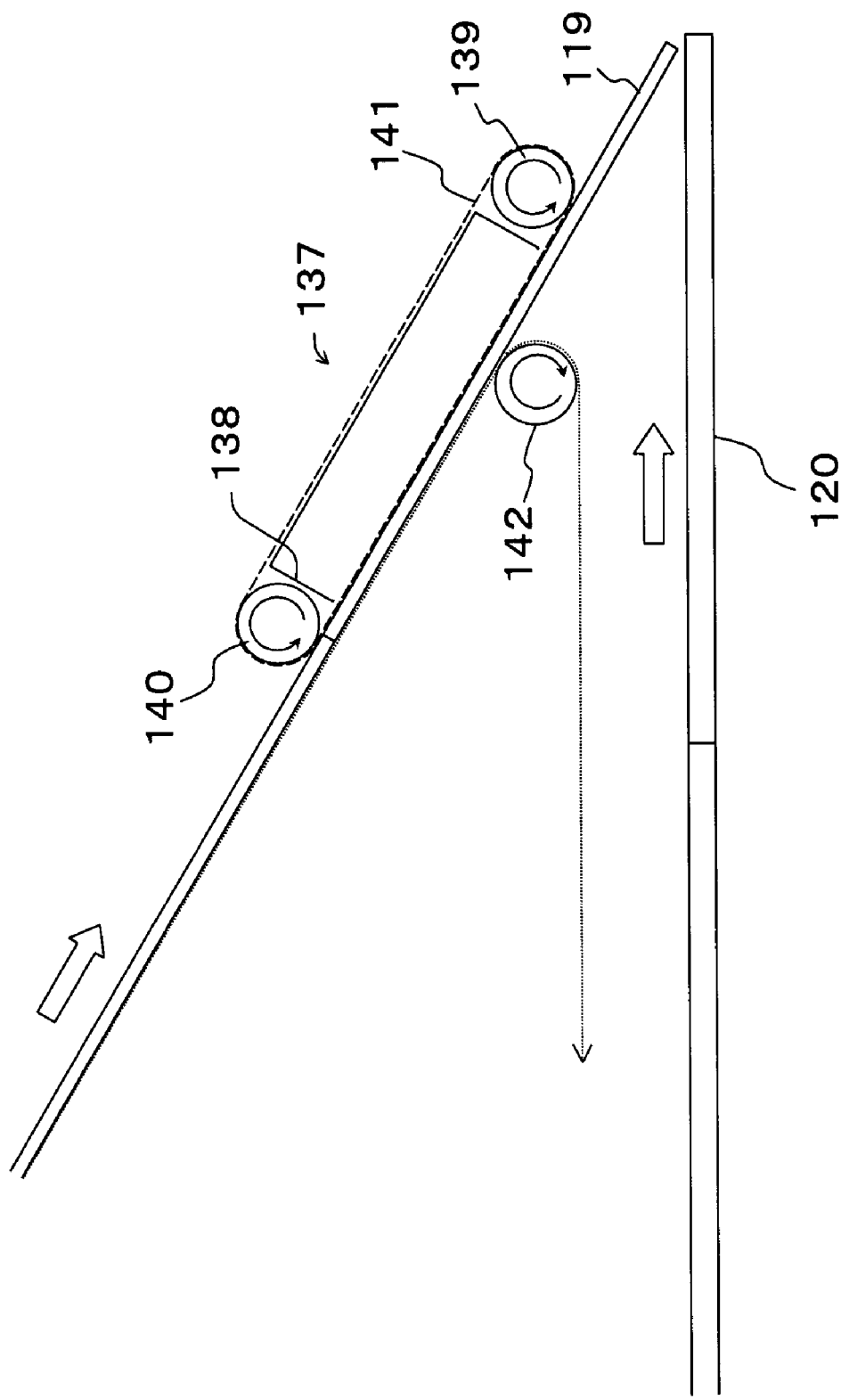
FIG. 5 is a schematic side view showing the structure of a third release film separating means in the polarizing plate bonding apparatus of the present invention (first solution).
Figure 6:
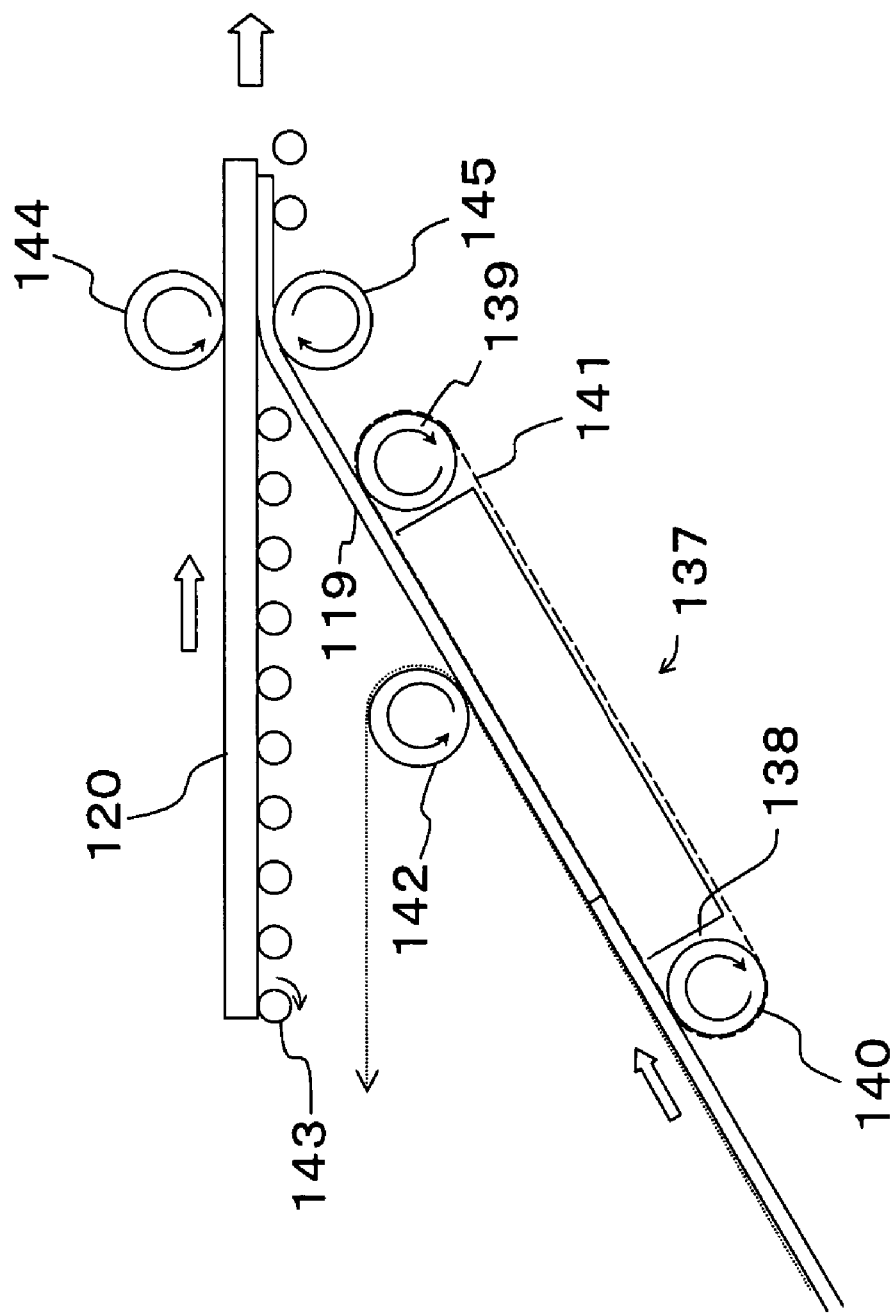
FIG. 6 is a schematic side view showing the structure of an improved modification of the third release film separating means in the polarizing plate bonding apparatus of the present invention (first solution).
Figure 7:
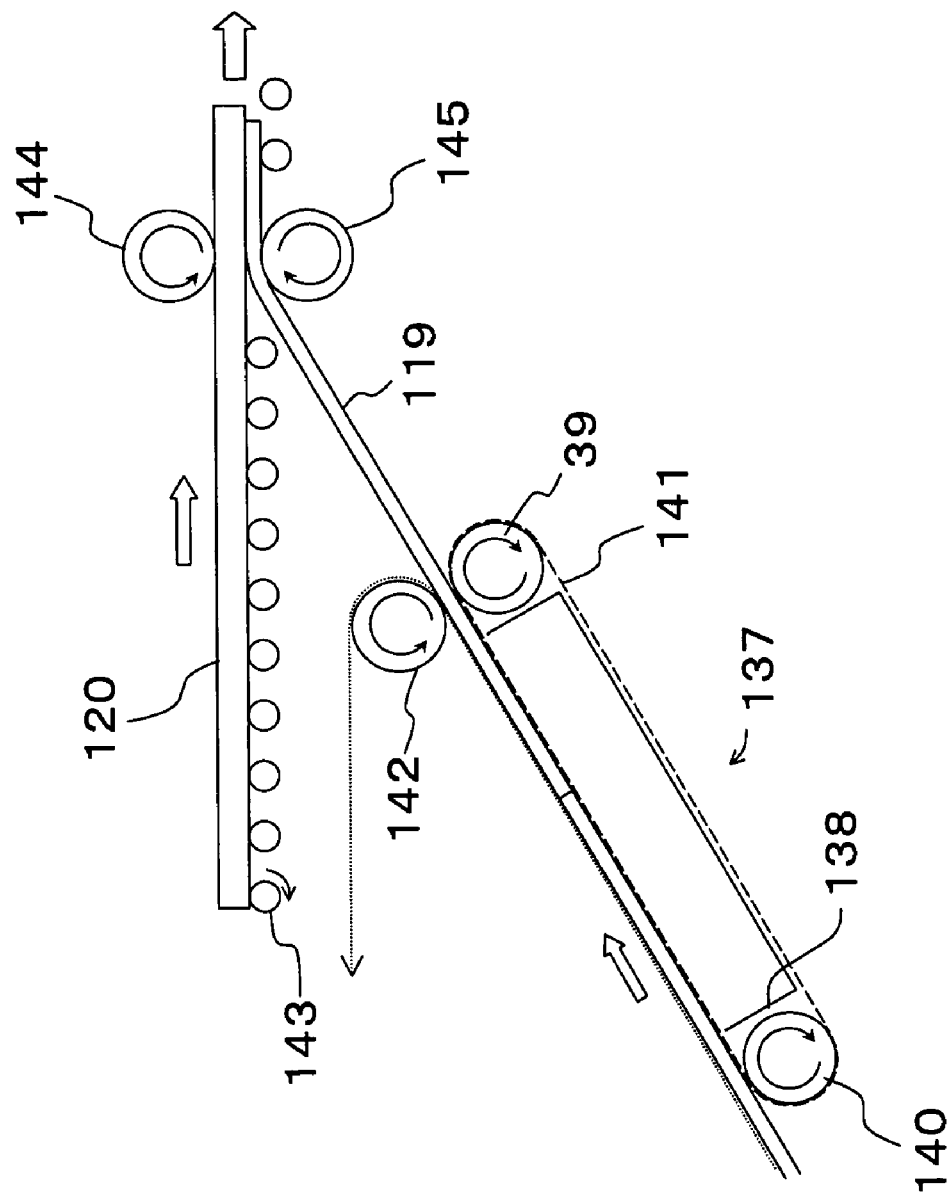
FIG. 7 is a schematic side view showing the structure of an improved modification of the third release film separating means in the polarizing plate bonding apparatus of the present invention (first solution).

FIG. 5 is a side view schematically showing the structure of a third release film separating means in the polarizing plate bonding apparatus in an embodiment of the present invention (first solution). FIG. 6 depicts a side view showing the structure of an improved third release film separating means in the polarizing plate bonding apparatus embodying the present invention (first solution). FIG. 7 depicts a side view showing the structure of a further improved third release film separating means in the polarizing plate bonding apparatus embodying the present invention (first solution). As the third release film separating means, a suction conveyor 137 again is used. However, the suction area on the belt of the suction conveyor 137 is abutted on the surface of a film piece 119 opposite to a release film 111, and a separating roll 142 is abutted on the surface of the release film 111 of the film piece 119 in an abutment area to the belt 141. Then the film piece 119 is sucked and transported by the suction conveyor 137, only the release film 111 is folded back by the separating roll 142, and the film piece 119, now freed of the release film 111, continues its travel in the forward direction to take up only the release film 111 (see FIG. 5). In the present embodiments, the suction conveyor 137 operates as a film piece supplying means for supplying the film piece 119. Meanwhile, the film piece 119, the separating roll 142 and the suction conveyor 137 may be provided not on the upper surface but on the lower surface of the substrate 120 (see FIG. 6). The separating roll 142 may be provided with a nip function for thrusting against the belt 141. In cases where the separating roll 142 is abutted against the transport side pulley 139 of the suction conveyor 137, no suction operation is needed (see FIG. 7).

Figure 8:
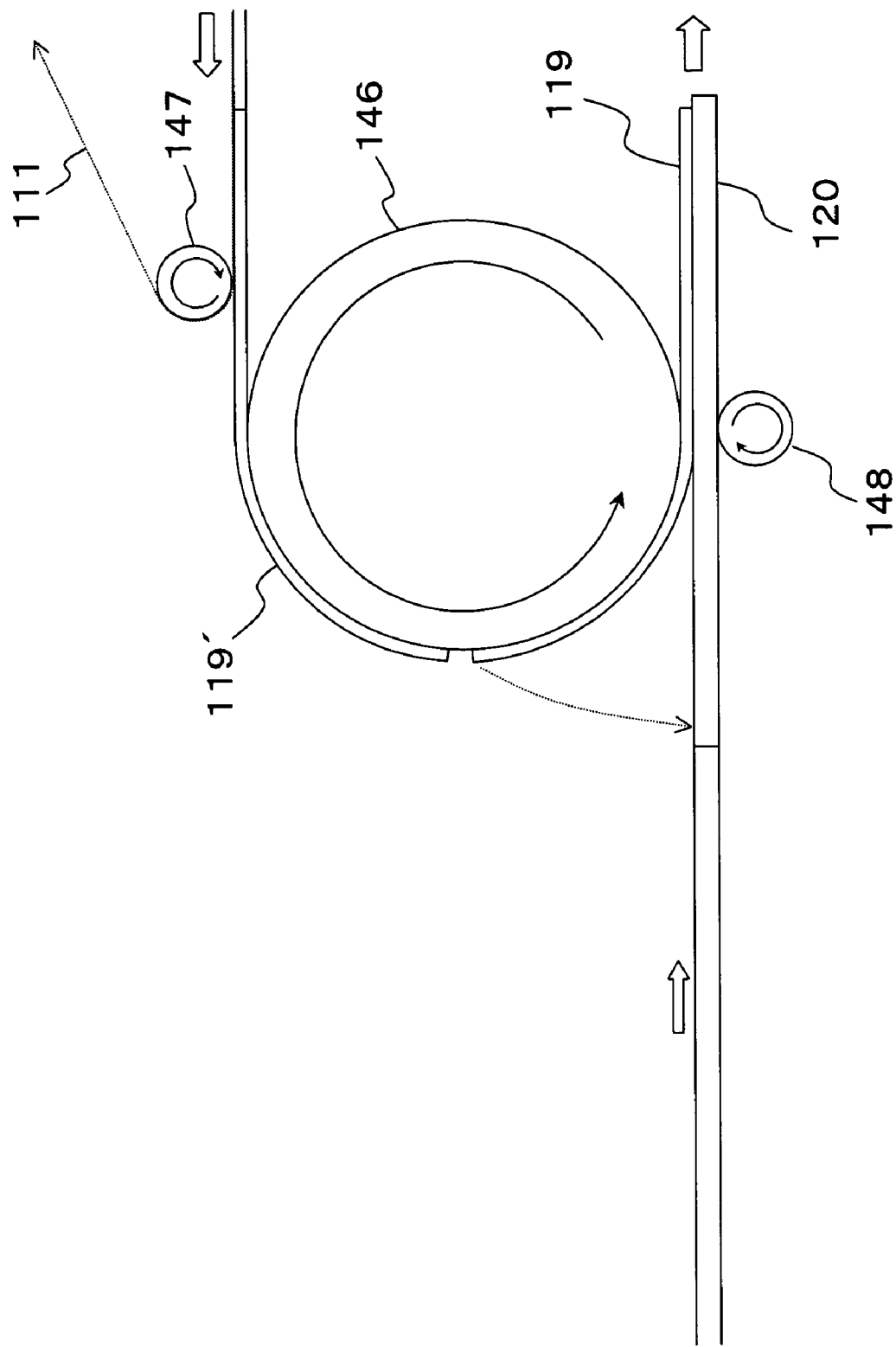
FIG. 8 is a schematic side view showing the structure of a fourth release film separating means in the polarizing plate bonding apparatus of the present invention (first solution).

FIG. 8 is a side view schematically showing the structure of a fourth release film separating means in the polarizing plate bonding apparatus in an embodiment of the present invention (first solution). As the fourth release film separating means, a suction drum 146 evacuating a drum member having air vent holes from its inner side by suction for sucking the film piece 119 onto the cylindrical surface of the drum member and for transporting the so sucked film piece, is used (see FIG. 8). A drive of a separating roll 147, including a drive for supplying the film piece 119, and a drive of a suction drum 146 are controlled to cause rotation of the suction drum as the surface opposite to the tacky surface of the film piece 119, freed of the release film 111 by the separating roll 147, is attracted to the surface of the suction drum 146 to transport the film piece 119. The supply of the film piece 119 is halted for a preset time as the suction drum 146 continues its rotation. After a preset time, the next film piece 119' is supplied. This sequence of operations is repeated (see FIG. 8). The suction drum 146 is a pressure roll as well and, if used with a receiving roll 148, operates as a bonding means. This operation is convenient in cases where the film piece with a surface area smaller than the plate surface area of the substrate is bonded to the substrate at a preset spacing from the substrate edge (so-called bonding with a margin). Meanwhile, in cases where the length in the forward direction of the film piece 119 is coincident with the length in the forward direction of the substrate, plural film pieces 119 may be supplied to the suction drum 146 in succession, without providing a gap between the film pieces, as the driving of the separating roll 147 is synchronized with the driving of the suction drum 146 (that is, without halting the driving of the separating roll 147).

Meanwhile, the release film 111 separated from the strip-shaped film 110 (film piece 119) may be taken up on the take-up roll 107 for recovery (see FIG. 1).

The bonding means 104, 105 represent means for bonding the tacky surface of the film piece 119, freed of the release film 111, to a mating position on the substrate, so that the severed side of the film piece 119 is parallel to the end face in the forward direction of the substrate (see FIG. 1). The following means may, for example, be used.

Figure 9:
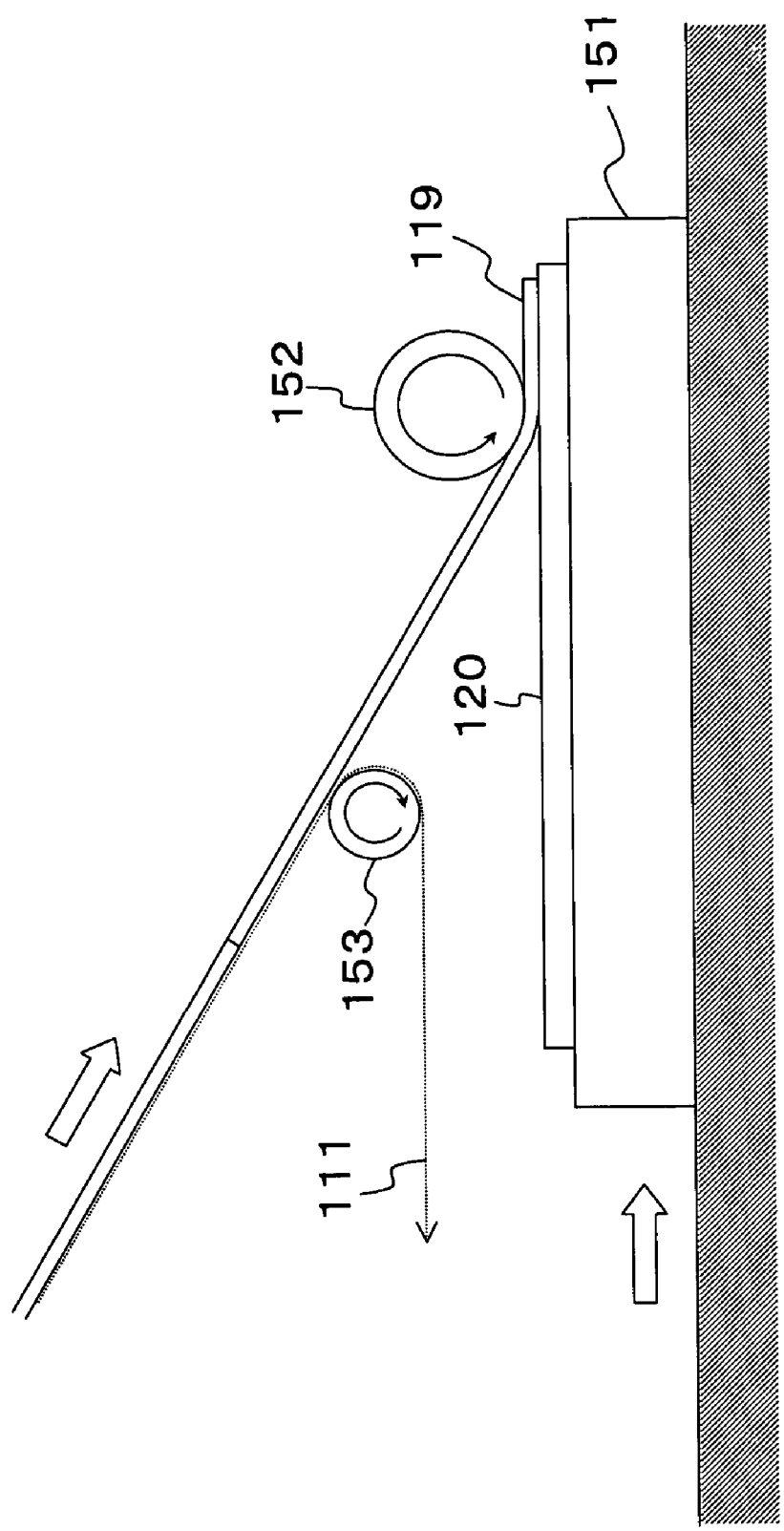
FIG. 9 is a schematic side view showing the structure of a first bonding means in the polarizing plate bonding apparatus of the present invention (first solution).

FIG. 9 is a side view schematically showing the structure of a first bonding means in a polarizing plate bonding apparatus according to an embodiment of the present invention (first solution). As the first bonding means, an oscillating type suction table 151 for sucking and holding the substrate on the upper table surface by sucking and evacuating from the inner side of the table for transporting the so sucked and held substrate, and a pressure bonding roll 152 for bonding the film piece 119 on the substrate by pressuring towards the oscillating type suction table 151 (see FIG. 9), are used. As the oscillating type suction table 151, which has sucked and held the substrate 120, is moved, the film piece 119, freed of the release film 111, is pressed by the pressure bonding roll 152 from the upper surface side of the substrate 120 for bonding the film piece 119 to a preset location of the substrate 120.

Figure 10:
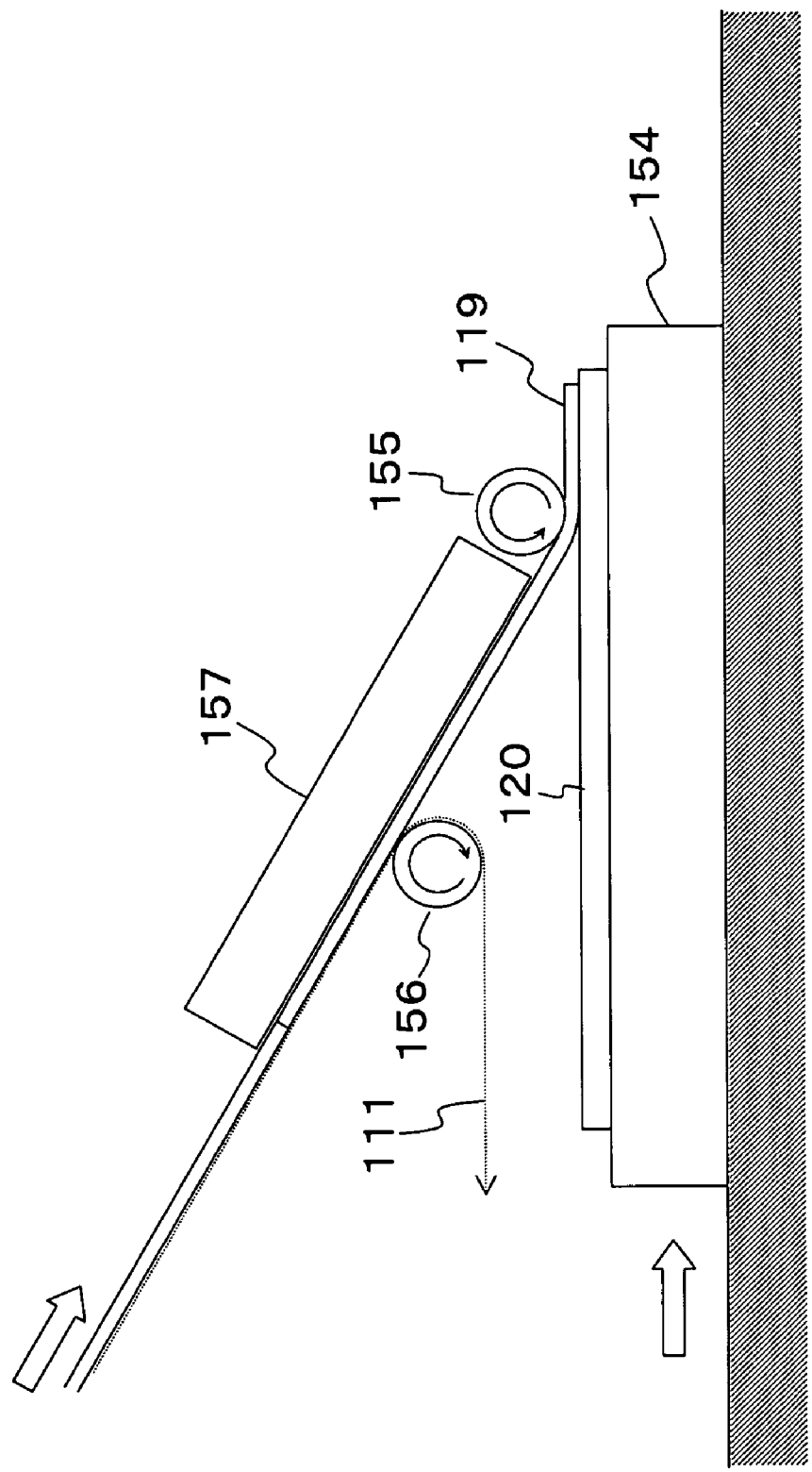
FIG. 10 is a schematic side view showing the structure of a second bonding means in the polarizing plate bonding apparatus of the present invention (first solution).

FIG. 10 is a side view schematically showing the structure of a second bonding means in a polarizing plate bonding apparatus according to an embodiment of the present invention (first solution). As the second bonding means, an oscillating type suction table 154 similar to the oscillating type suction table used in the first bonding means, a pressure bonding table 155 similar to the pressure bonding table used in the first bonding means, and a stationary type suction table 157 for sucking the film piece 119, are used (see FIG. 10). As the oscillating type suction table 154, which has sucked and held the substrate 120, is moved, the surface opposite to the tacky surface of the film piece 119, freed of the release film 111, is sucked by the stationary type suction table 157, and slid. The film piece 119, thus slid, is pressed by the pressure bonding table 155 from the upper side of the substrate 120 for bonding the film piece 119 onto a preset location on the substrate 120.

Figure 11:
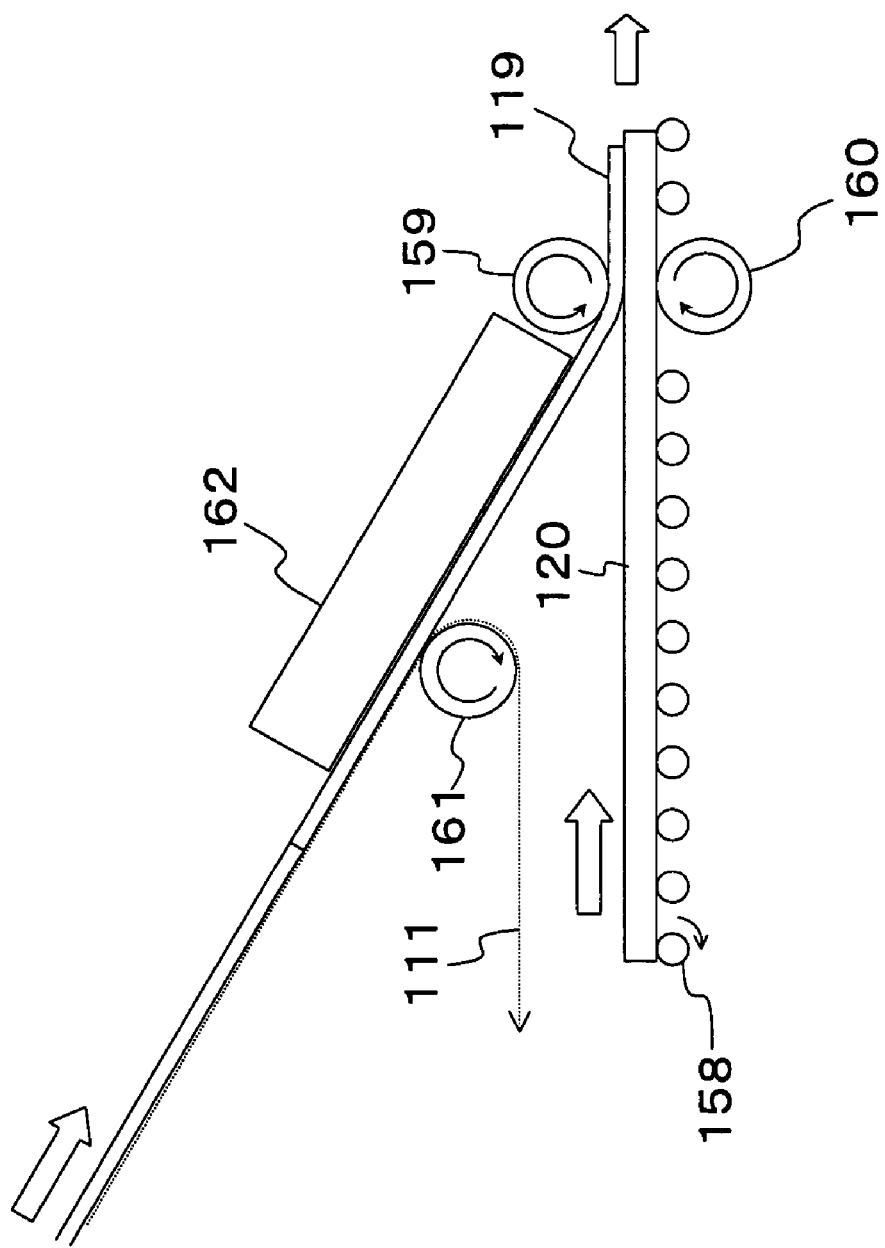
FIG. 11 is a schematic side view showing the structure of a second bonding means in the polarizing plate bonding apparatus of the present invention (first solution).

FIG. 11 is a side view schematically showing the structure of a third bonding means in a polarizing plate bonding apparatus according to an embodiment of the present invention (first solution). As the third bonding means, a roller conveyor 158 for horizontally transporting the substrate 120 on an array of plural rolls, a pressure bonding roll 159 similar to the pressure bonding roll used in the first bonding means, a receiving roll 160 for transporting the substrate 120, transported thereto, and for sustaining the pressure from the pressure bonding roll 159 from the under the roll 159, and a stationary type suction table 162 similar to that used in the second bonding means, are used (see FIG. 11). The substrate 120 is transported by the roller conveyor 158 to a spacing between the pressure bonding roll 159 and the receiving roll 160, the film piece 119, freed of the release film 111, is slid as the surface of the film piece opposite to its tacky surface is sucked by the stationary type suction table 162, and the so slid film piece 119 is pressed by the pressure bonding roll 159 from the upper surface of the substrate 120 to bond the film piece 119 to a preset location on the substrate 120.

Meanwhile, the pressure bonding rolls (152 of FIG. 9, 155 of FIG. 10 and 159 of FIG. 11) and the receiving rolls (148 of FIG. 8 and 160 of FIG. 11) are rubber rolls or metal rolls. The rubber roll is preferably formed of rubber with a hardness of 60 to 80°. One of the pressure bonding rolls or the receiving rolls is preferably a rubber roll. In cases where two rolls are used, as shown in FIG. 11, a set of two rubber rolls of hardness of 60 to 80° or a set of a rubber roll of hardness of 60 to 80° and a metal roll is preferably used. The nip pressure of the two rolls at the time of bonding is preferably a linear pressure not more than 1 kg/cm. In cases where the hardness is less than 60°, pressure variations and hence pressure bonding variations are produced. With the hardness exceeding 80°, the substrate or the film tends to be damaged. Moreover, regarding the nip pressure, the linear pressure exceeding 1 kg/cm tends to damage the substrate or the film.

Figure 12:
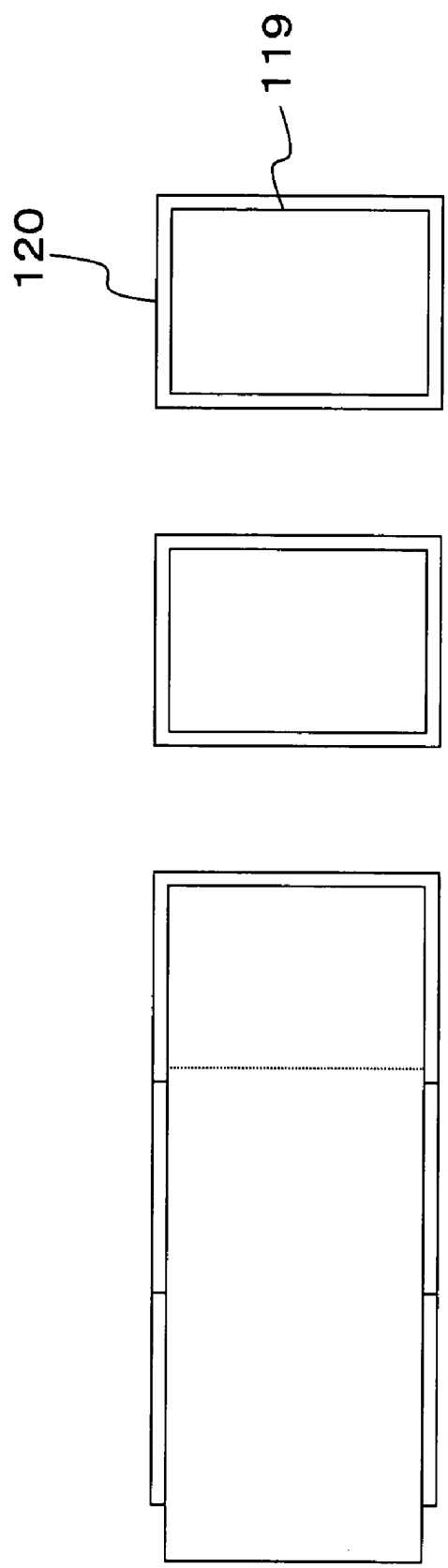
FIG. 12 is a schematic view showing a first processing instance of a substrate bonded by the polarizing plate bonding apparatus of the present invention (first solution).

Next, a processing instance is explained. A film piece 119 may be bonded to each substrate 120 delivered to directly give a bonded substrate (see FIG. 12).

[Embodiment of the Second Solution]

Figure 16A:
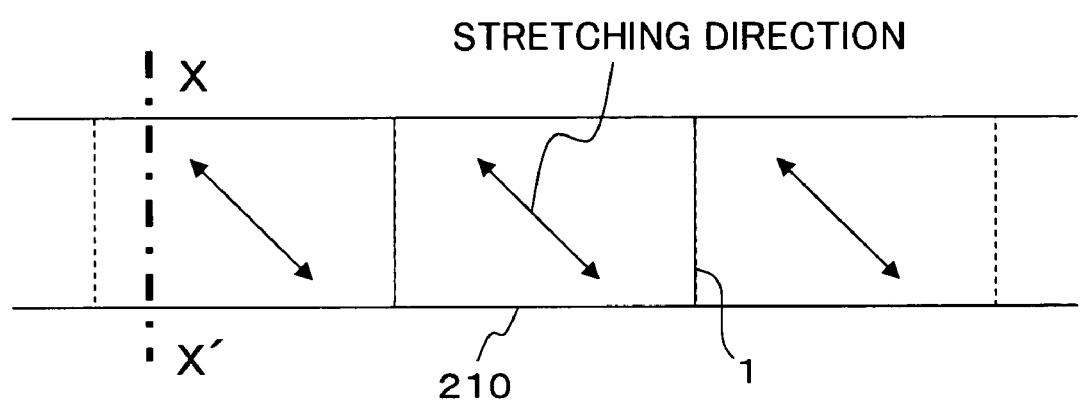
FIGS. 16(A) and (B) are a plan view and a cross-sectional view, respectively, showing the structure of a strip-shaped film used in a polarizing plate bonding apparatus according to the embodiment 1 of the present invention (second solution).

A first embodiment of the present invention (second solution) is now explained with reference to the drawings. FIG. 15 is a side view schematically showing the structure of a polarizing plate bonding apparatus of an embodiment 1 of the present invention (second solution). FIG. 16 is a plan view (A) and a cross-sectional view (B) showing the structure of a strip-shaped film used in the polarizing plate bonding apparatus of the embodiment 1 of the present invention (second solution). FIG. 17 is a developed perspective view schematically showing the relationship between the substrate and the stretching direction of the polarizing plate bonded to each substrate surface by the polarizing plate bonding apparatus of the embodiment 1 of the present invention (second solution).

A polarizing plate bonding apparatus 230 according to the embodiment 1 of the second solution, shown in FIG. 15, includes a first cutting means 231A, a second cutting means 231B, a first release film separating means 232A, a second release film separating means 232B, and a bonding means 233. The first cutting means 231A severs at least a polarizing plate and an adhesive layer of a first strip-shaped film 210A, which is comprised of the polarizing plate having a release film 211A bonded thereto with interposition of the adhesive layer and is supplied from the front side plate surface of a substrate 201 to be transported, when a forward-facing pre-severed end perpendicular to the longitudinal direction of the film 210A has traveled a length corresponding to the length of the substrate, with the first cutting means thus cutting the film 210A in a direction perpendicular to the longitudinal direction of the film so as to leave the release film 211A uncut. The second cutting means 231B severs at least a polarizing plate and an adhesive layer of a second strip-shaped film 210B, which is comprised of the polarizing plate having a release film 211B bonded thereto with interposition of the adhesive layer and is supplied from the reverse plate surface side of the substrate 201 to be transported, when a forward-facing pre-severed end face perpendicular to the longitudinal direction of the film 210B has traveled a length corresponding to the length of the substrate, with the second cutting means thus cutting in a direction perpendicular to the longitudinal direction so as to leave the release film 211B uncut, with the direction of an axis of light transmission of the polarizing plate of the second strip-shaped film being at right angles to the direction of light transmission of the polarizing plate of the first strip-shaped film 210A when in the release film 211B is combined with the release film 211A of the first strip-shaped film 210A. The first release film separating means 232A separates the release film 211A from a first film piece 219A severed from the first strip-shaped film 210A by the first cutting means 231A. The second release film separating means 232B separates the release film 211B from a second film piece 219B severed from the second strip-shaped film 210B by the second cutting means 231B. The bonding means 233 bonds the tacky surface of the first film piece 219A, separated from the release film 211A, to the corresponding front side plate surface of the substrate 201 so that the severed end face of the first film piece 219A is parallel to the front side end face in the transporting direction of the substrate 201, while also bonding the tacky surface of the second film piece 219B, separated from the release film 211B, to the corresponding reverse side plate surface of the substrate 201 so that the severed end face of the second film piece 219B is parallel to the front side end face in the transporting direction of the substrate 201. In this manner, the polarizing plate may be bonded to each substrate surface simultaneously, continuously and automatically, while the yield of the polarizing plate may be raised to 100%. Moreover, by using two reel-out rolls of the same kind, the two polarizing plates may be bonded to the substrate surfaces to intersect the directions of the axes of light transmission of the polarizing plates bonded with each other.

Figure 16B:
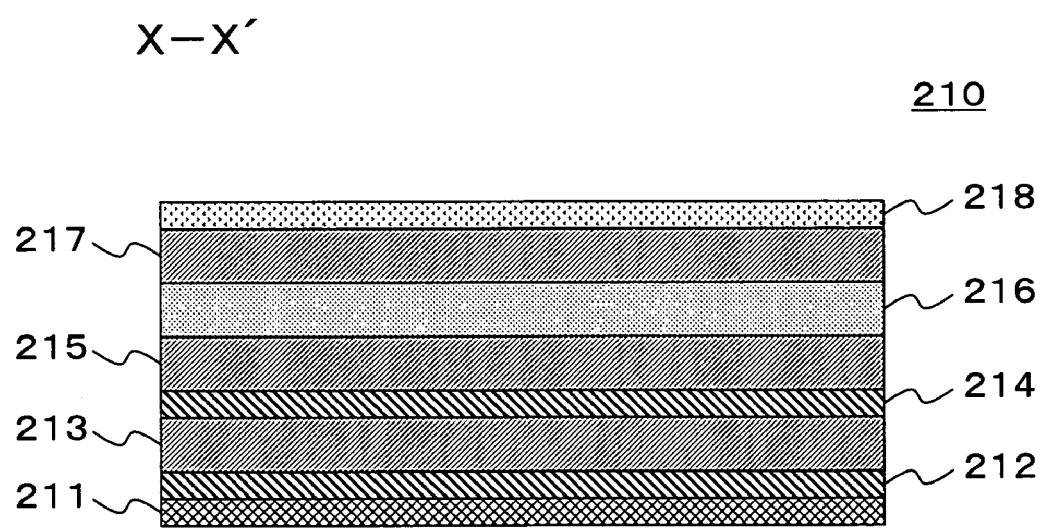
Figure 17:
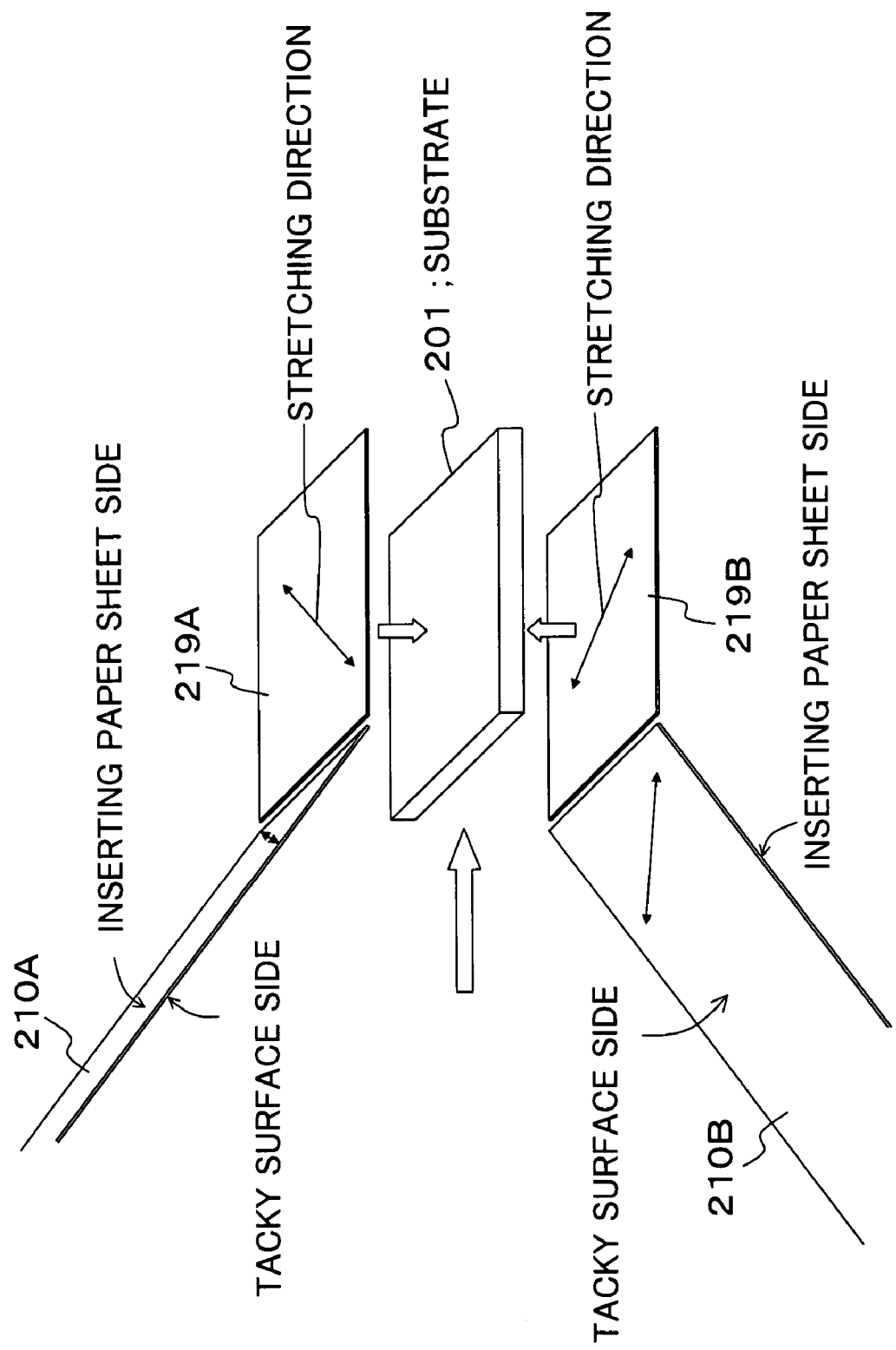
FIG. 17 is a developed perspective view schematically showing the relationship between the substrate and the stretching direction of the polarizing plate bonded to each substrate surface by the polarizing plate bonding apparatus according to the embodiment 1 of the present invention (second solution).

Referring to FIG. 16(B), the strip-shaped film (210A, 210B of FIG. 15), as applied in the present invention (second solution), is composed of a polarizing plate 216 and a release film 211 bonded to the polarizing plate with interposition of adhesive layers 214, 212 (phase difference film 213). In cases where it is used for an LCD for TN liquid crystal, the polarizing plate 216 has the direction of the axis of light transmission oriented obliquely with respect to the longitudinal direction of the film. The angle of inclination between the longitudinal direction of the film and the direction of the axis of the light transmission is preferably between 20° C. and 70° C. both inclusive and more preferably between 40° C. and 50° C. both inclusive and is ordinarily 45° (see FIG. 16(A)). As for the method for the preparation of this polarizing plate, JP Patent Kokai JP-A-2002-86554 should be referred. Preferably, protective films 215, 217 are bonded to both sides of the polarizing plate 216. The polarizing plate 216 used here has been stretched obliquely relative to the longitudinal direction of the film and hence termed an "obliquely stretched polarizing plate". With use of the obliquely stretched polarizing plate, it is possible to supply the film continuously. The first strip-shaped film 210A and the second strip-shaped film 210B may be used in such a combination that, when the first strip-shaped film 210A and the second strip-shaped film 210B are combined to each other with the release film 211A of the first strip-shaped film 210A and the release film 211B of the second strip-shaped film 210B abutting against each other, the direction of the axis of light transmission of the polarizing plate of the first strip-shaped film 210A is perpendicular to the direction of the axis of light transmission of the polarizing plate of the second strip-shaped film 210B. For example, in cases where the first strip-shaped film 210A is used in which the direction of the axis of light transmission of the polarizing plate is oriented 70° relative to the longitudinal direction, the second strip-shaped film 210B may be used in which the direction of the axis of light transmission of the polarizing plate is oriented 20° relative to the longitudinal direction. Preferably, the first strip-shaped film 210A and the second strip-shaped film 210B (first film piece 219A and the second film piece 219B) are used in which the directions of the oblique stretching (direction of the axis of transmission) when seen from the respective tacky surfaces are the same and equal to 45° (see FIG. 17). The reason is that, with use of the strip-shaped films or film pieces having the same direction of the axis of light transmission, it is possible that the directions of the axes of light transmission intersect each other when the polarizing plates are bonded to both surfaces of the substrate 201. Meanwhile, in cases where the polarizing plate 216 is used as LCD for a VA liquid crystal or as LCD for a liquid crystal of the IPS system, such a polarizing plate 216 may be used in which the direction of the axis of light transmission thereof is oriented parallel or perpendicular to the longitudinal direction of the film. For example, in cases where the first strip-shaped film 210A is used in which the direction of the axis of light transmission of the polarizing plate is oriented parallel to the longitudinal direction thereof, the second strip-shaped film 210B may be used the direction of the axis of light transmission of the polarizing plate is oriented at right angles to the longitudinal direction thereof.

In the case of a circular polarizing film composed of the obliquely stretched polarizing plate 216 (protective film 215) and a phase difference film 213 bonded thereto with interposition of an adhesive layer 214, such phase difference film 213 is preferably used which has an axis of orientation perpendicular or parallel to the longitudinal direction of the film. By so doing, the circular polarizing film can be supplied continuously. In the case of the circular polarizing film, if the axis of orientation of the phase difference film of the first strip-shaped film (210A of FIG. 15) is parallel to the longitudinal direction of the film, the axis of orientation of the phase difference film of the second strip-shaped film (210B of FIG. 15) is perpendicular to the longitudinal direction of the film.

There is no particular limitation to the thickness of the polarizing plate 216, which may, for example, be on the order of 5 through 100 μm. The width of the polarizing plate 216 may be suitably selected depending on the size of the substrate to be bonded. The first strip-shaped film (210A of FIG. 15) and the second strip-shaped film (210B of FIG. 15) may be of the same width. The adhesive layers 212, 214 may be of any common adhesives used for bonding a substrate and an optical film together, such as acrylic-, polyurethane-, epoxy- or rubber-based adhesive. The release film 211 is of a release material commonly used for an optical film, such as a polyethylene terephthalate film or a polyester film. A inserting paper sheet 218 for protecting the film surface against scratches etc. may be bonded to the surface of the polarizing plate opposite to the surface bonded to the release film 211. The strip-shaped films 210A, 210B may be supplied from the reel-out rolls 234A, 234B (see FIG. 15)

The substrate 201 is a flat-plate-shaped member, such as a glass substrate or a plastic substrate used in a display equipment such as an LCD, or a plasma display equipment. It may also be a substrate having component parts, such as a liquid crystal cell or an electrode, previously mounted thereon. The substrate 201 is preferably of a substantially quadrilateral shape, such as a square or a rectangle (see FIG. 15 and FIG. 16(A)).

A first cutting means 231A and a second cutting means 231B are a push-cut cutter or a dicing cutter etc. used for cutting an optical film having e.g., a cutter edge, a cylinder actuating the cutter edge and a lower dead point position adjustment member for adjusting the lower dead point position of the cutter edge. By adjusting the lower dead point position to not more than 0.5 times as thick as the release film 211, the other layers of the strip-shaped film 210 excluding the release film 211 (with a thickness of 10 through 50 μm), e.g., the polarizing plate or the adhesive layer, can be cut in a direction perpendicular to the longitudinal direction of the film (referred to below as half-cutting) (see FIG. 15).

A first release film separating means 232A and a second release film separating means 232B are means for separating the release films 211A and 211B from film pieces 219A and 219B, respectively (see FIG. 15) and may be exemplified by a roller or a wedge member.

The release films 211A and 211B, separated from the film pieces 219A and 219B may be taken up on takeup rolls 235A and 235B, respectively, for recovery (see FIG. 15).

A bonding means 233 is a means for bonding the tacky surfaces of two film pieces 219A, 219B, freed of the release films 211A, 211B, simultaneously to corresponding positions of the substrate 201 so that the end face toward the transport direction of the substrate, transported by transporting means 236, will be parallel to the severed end faces of the film pieces 219A, 219B (see FIG. 15). The bonding means 233 may, for example, be nip rolls (rubber or metal rolls) which thrust against both sides of the substrate. As for rolls, the combination of two rubber rolls with a hardness of 60 through 80° or the combination of one rubber roll with a hardness of 60 through 80° and a metal roll is preferred. The nip pressure of the rolls in bonding is preferably a linear pressure of 1 kg/cm or less.

The transporting means 236 is preferably a roller conveyor or a wheel conveyor horizontally transporting the substrate 201 on an array of rolls or wheels. More preferably, an outer roller tube or a wheel is mounted on a shaft rotating via a bearing. The outer roller tube or the wheel is preferably rotated with a surface speed coincident with the speed of the substrate being transported to prevent slip of the outer roller tube or the wheel which will damage the substrate.

Figure 18:
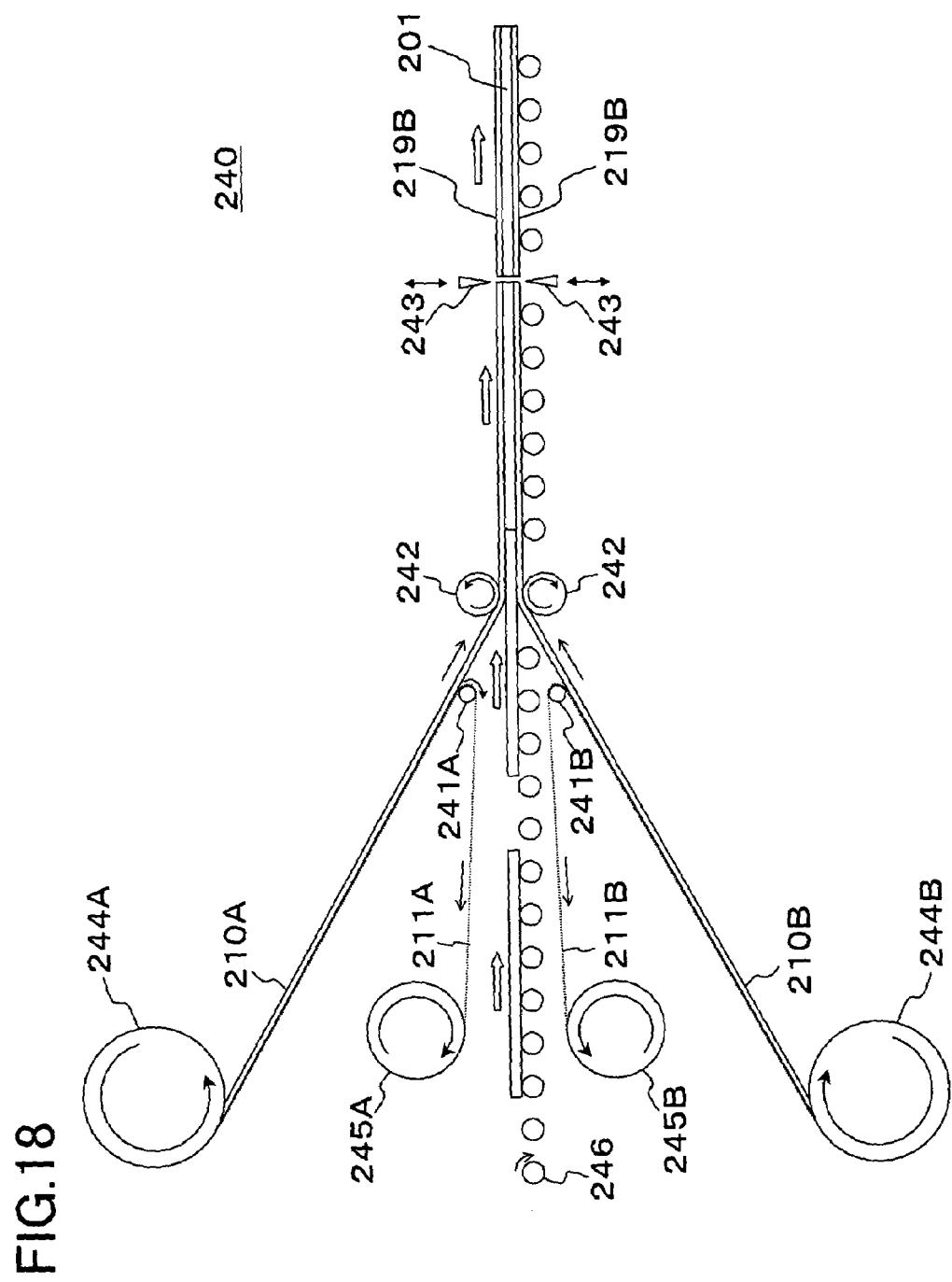
FIG. 18 is a side view schematically showing the structure of a polarizing plate bonding apparatus according to the embodiment 2 of the present invention (second solution).
Figure 19:
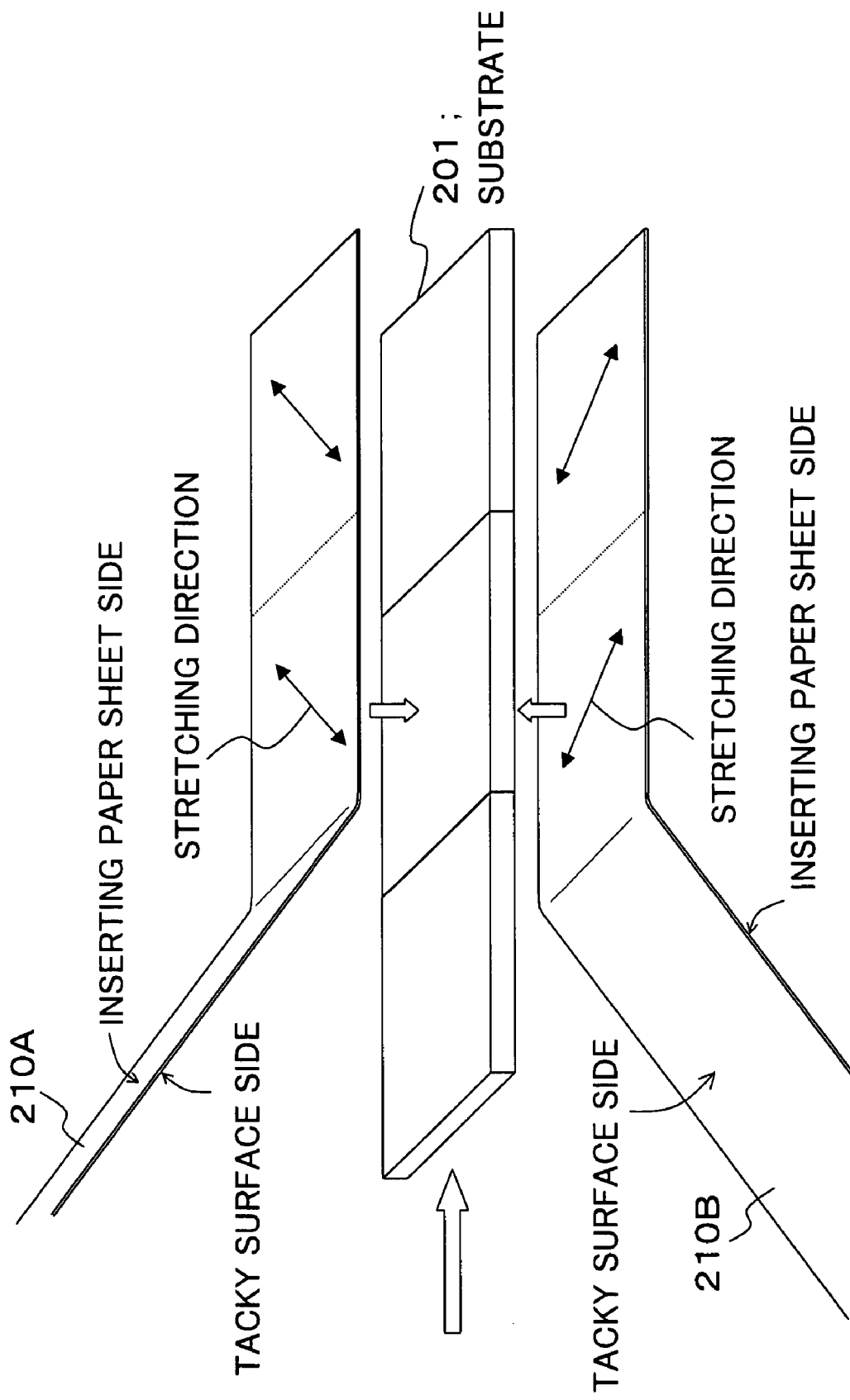
FIG. 19 is a developed perspective view schematically showing the relationship between the substrate and the stretching direction of the polarizing plate bonded to each substrate surface by the polarizing plate bonding apparatus according to the embodiment 1 of the present invention (second solution).

An embodiment 2 (second solution) is now explained with reference to the drawings. FIG. 18 is a side view schematically illustrating the structure of a polarizing plate bonding apparatus. FIG. 19 is a developed perspective view schematically illustrating the relationship between a substrate and stretching directions of polarizing plates bonded to both substrate surfaces by the polarizing plate bonding apparatus according to embodiment 1 of the present invention (second solution).

Referring to FIG. 18, a polarizing plate bonding apparatus 240 according to embodiment 2 of the second solution includes a first release film separating means 241A, a second release film separating means 241B, a bonding means 242 and a cutting means 243. The first release film separating means 241A separates a release film 211A from a first strip-shaped film 210A, which is composed of a polarizing plate and the release film 211A bonded thereto with interposition of an adhesive layer, and which is supplied from the front side plate surface of a substrate 201 to be transported. The second release film separating means 241B separates a release film 211B from a second strip-shaped film 210B, which is composed of a polarizing plate and the release film 211B bonded thereto with interposition of an adhesive layer and which is supplied from the reverse plate surface side of the substrate 201 to be transported. The direction of an axis of light transmission of the polarizing plate of the second strip-shaped film is at right angles to the direction of an axis of light transmission of the polarizing plate of the first strip-shaped film 210A when the release film 211B is combined to the release film 211A of the first strip-shaped film 210A. The bonding means 242 bonds the tacky surface of the first strip-shaped film 210A, separated from the release film 211A, to the corresponding front side plate surface of the substrate 201 so that the forward direction of the first strip-shaped film 211A coincides with the transporting direction of the substrate 201, while also bonding the tacky surface of the second strip-shaped film 210B, separated from the release film 211B, to the corresponding reverse side plate surface of the substrate 201 so that the proceeding direction of the second strip-shaped film 210B coincides with the transporting direction of the substrate 201. The cutting means 243 severs the first strip-shaped film 210A and the second strip-shaped film 210B, bonded by the bonding means 242 to both surfaces of the substrate 201, in a direction parallel to the forward side end face or the rear end face in the transporting direction of the substrate 201. In this manner, the polarizing plate may be bonded to each substrate surface simultaneously, continuously and automatically without stopping transportation of a substrate, while the yield of the polarizing plate may be raised to 100%. Moreover, employing two reel-out rolls of the same sort may bond the two polarizing plates to intersect the directions of the axes of light transmission of the polarizing plates bonded to the respective substrate surfaces with each other.

The release film separating means 241A, 241B, bonding means 242, reel-out rolls 244A, 244B, takeup rolls 245A, 245B and transporting means 246 of the polarizing plate bonding apparatus 240 of embodiment 2 of the second solution (see FIG. 18) are substantially the same as the release film separating means 232A, 232B, bonding means 233, reel-out rolls 234A, 234B, takeup rolls 235A, 235B and transporting means 236, respectively, of the polarizing plate bonding apparatus of embodiment 1 of the second solution (see FIG. 15) The substrate 201 and the strip-shaped film 210A, 210B used in the polarizing plate bonding apparatus 240 of embodiment 2 of the second solution are similar to those used in embodiment 1 of the second solution. The location of the cutting means 243 of the polarizing plate bonding apparatus 240 of embodiment 2 of the second solution differs from that of the cutting means of the polarizing plate bonding apparatus of embodiment 1 of the second solution. Meanwhile, the bonding means 242 of FIG. 18 differs in the fact that not the film piece but the unsevered strip-shaped films 210A, 210B are bonded to both sides of the substrate 201.

The transporting means 246 of FIG. 18 includes the cutting means 243 on a transport line in the downstream from the bonding means 242. On the transporting means 246, upstream from the bonding means 242, the end face toward the transport direction of the substrate 201 is desirably abutted and transported at least before the bonding occurs, because this improves the yield of the polarizing plate.

The cutting means 243 of FIG. 18 cuts the first strip-shaped film 210A and the second strip-shaped film 210B, bonded by the bonding means 242 to both surfaces of the substrate 201, in a direction parallel to the forward side end face or the rear end face along the transport direction of the substrate 201. Since the release films 211A and 211B are not bonded at this time to the first strip-shaped film 210A and the second strip-shaped film 210B, respectively, the first strip-shaped film 210A and the second strip-shaped film 210B are not half-cut, but are severed in their entirety substantially simultaneously.

The first strip-shaped film 210A and the second strip-shaped film 210B are preferably used which have the same oblique stretching direction (direction of the axis of light transmission) viewed from the respective tacky surfaces (see FIG. 19). The reason is that employing the strip-shaped films of the same oblique stretching direction can intersect, the directions of the axes of light transmission when the polarizing plate is bonded to each surface of the substrate 201.

Figure 20:
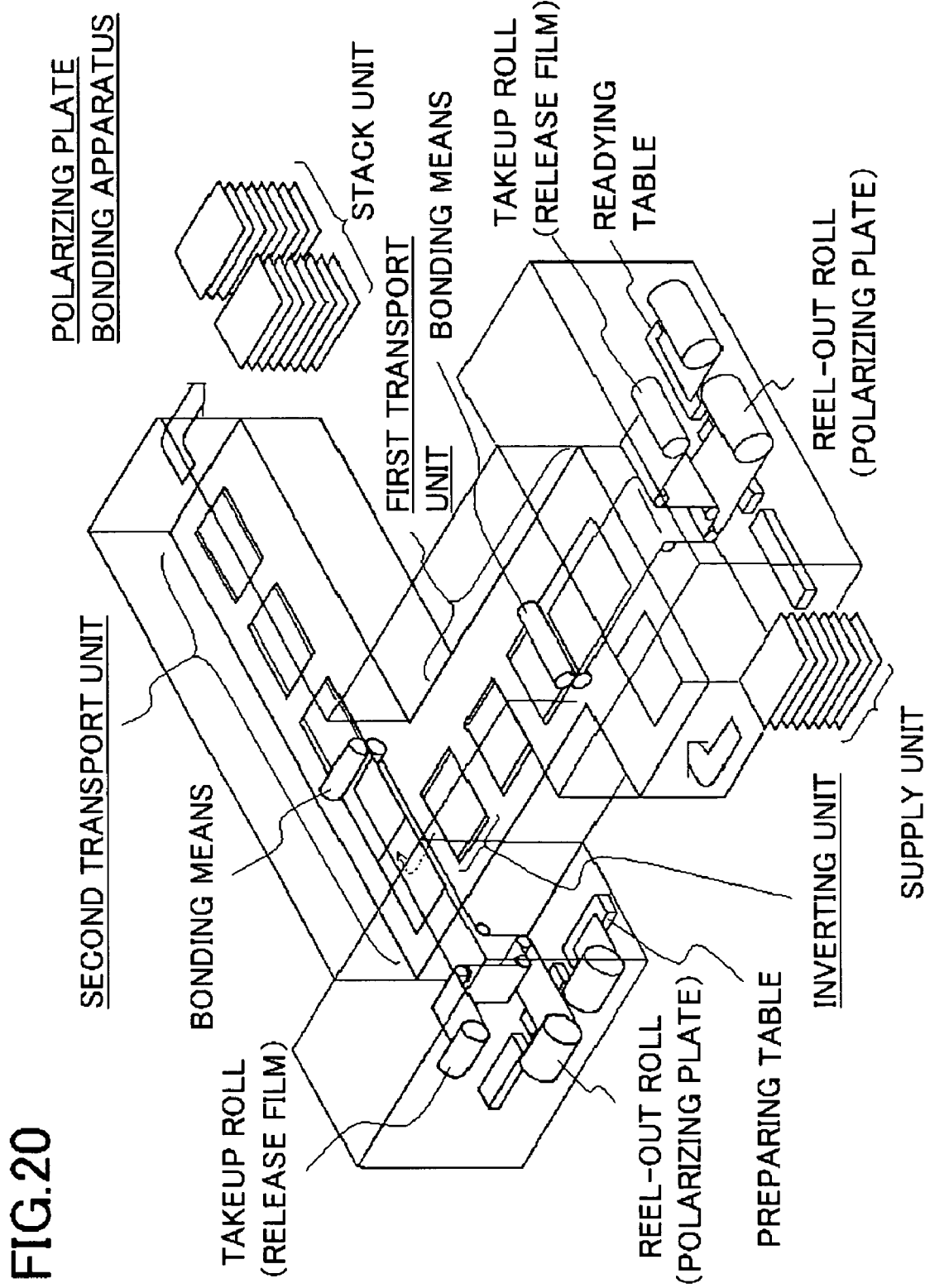
FIG. 20 is a perspective view schematically showing the structure of the polarizing plate bonding apparatus according to an embodiment 3 of the present invention (second solution).
Figure 21:
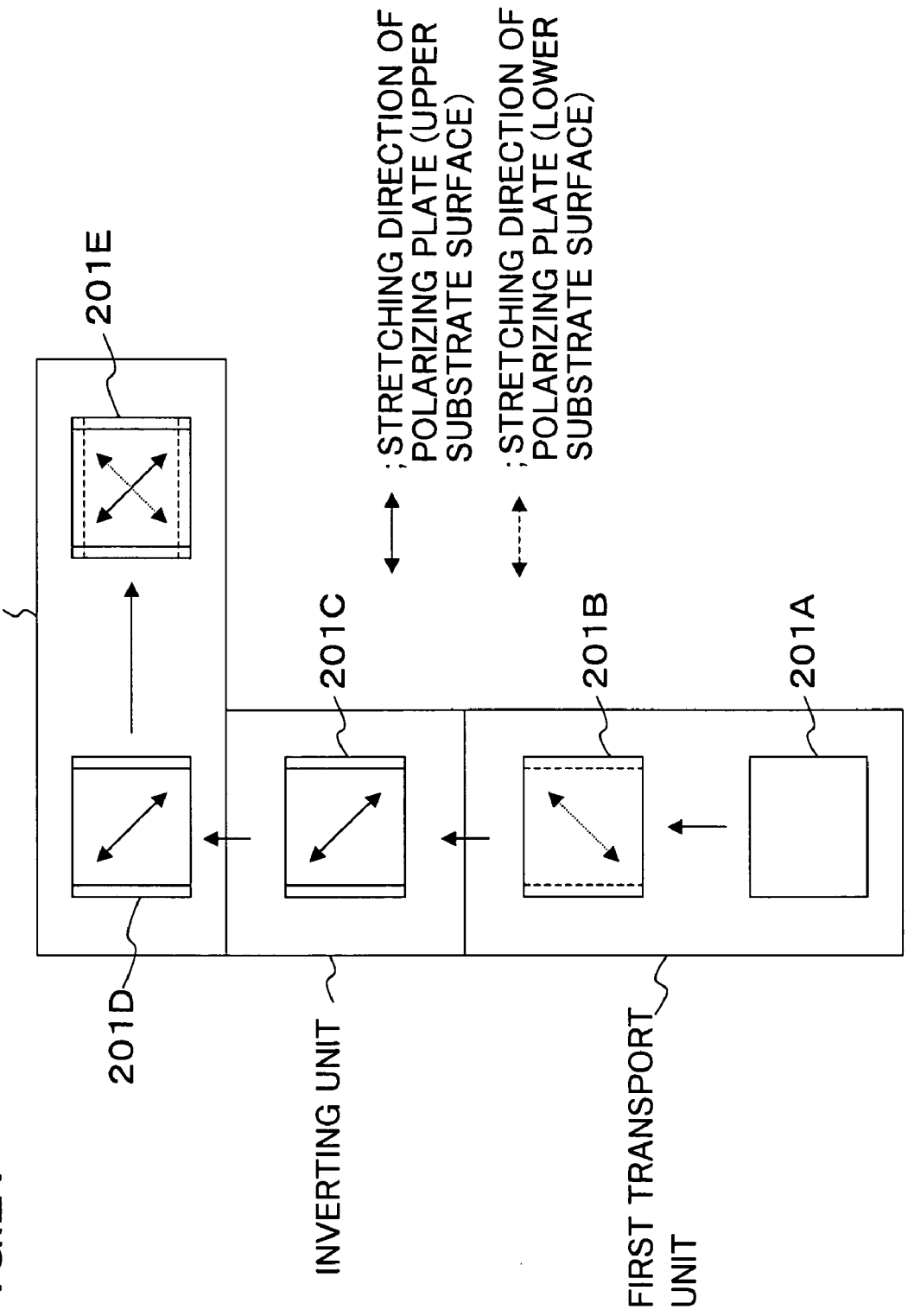
FIG. 21 is a plan view schematically showing the structure of the polarizing plate bonding apparatus according to the embodiment 3 of the present invention (second solution).
Figure 22:
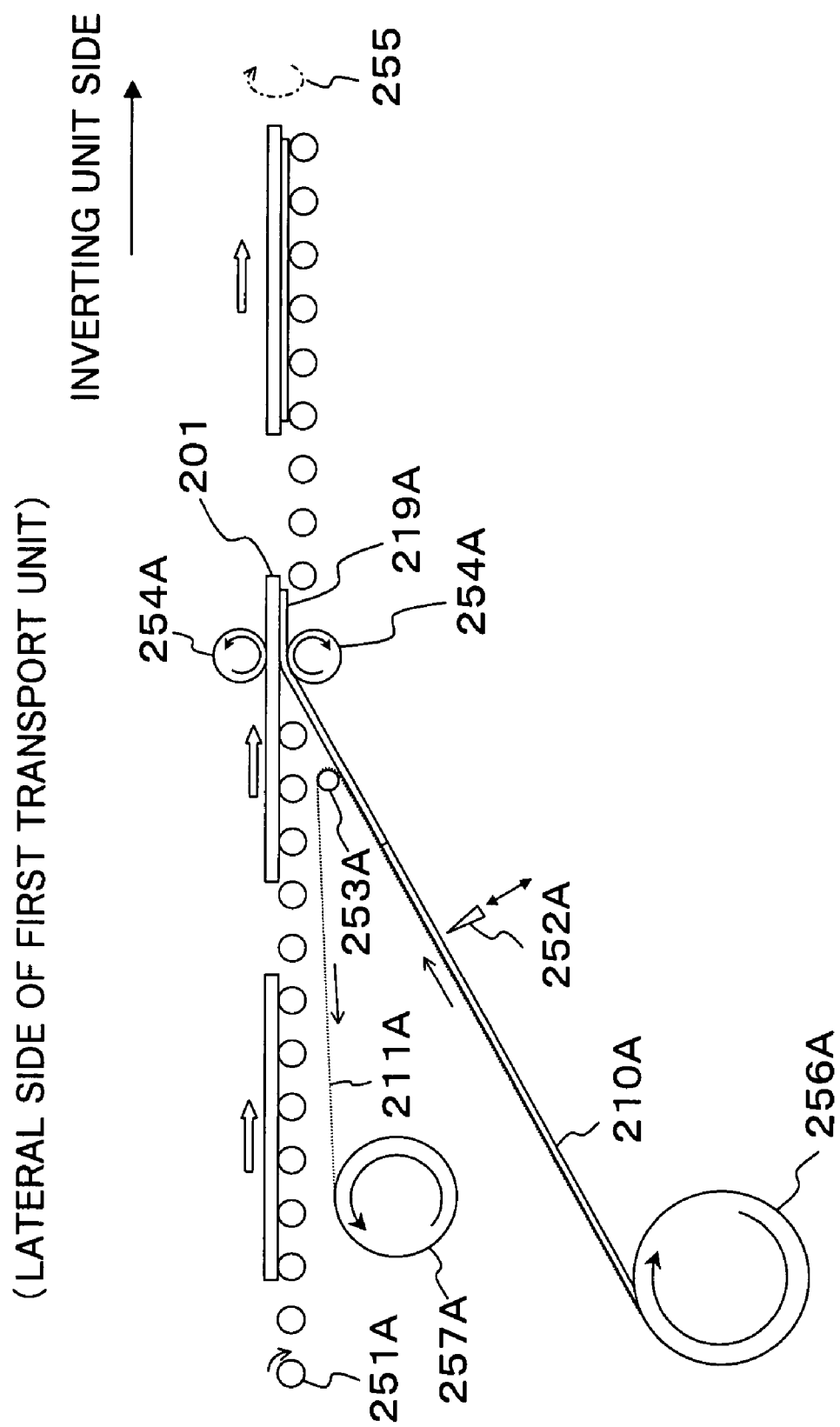
FIG. 22 is a side view schematically showing the structure of a first transport unit of the polarizing plate bonding apparatus according to an embodiment 3 of the present invention (second solution).
Figure 23:
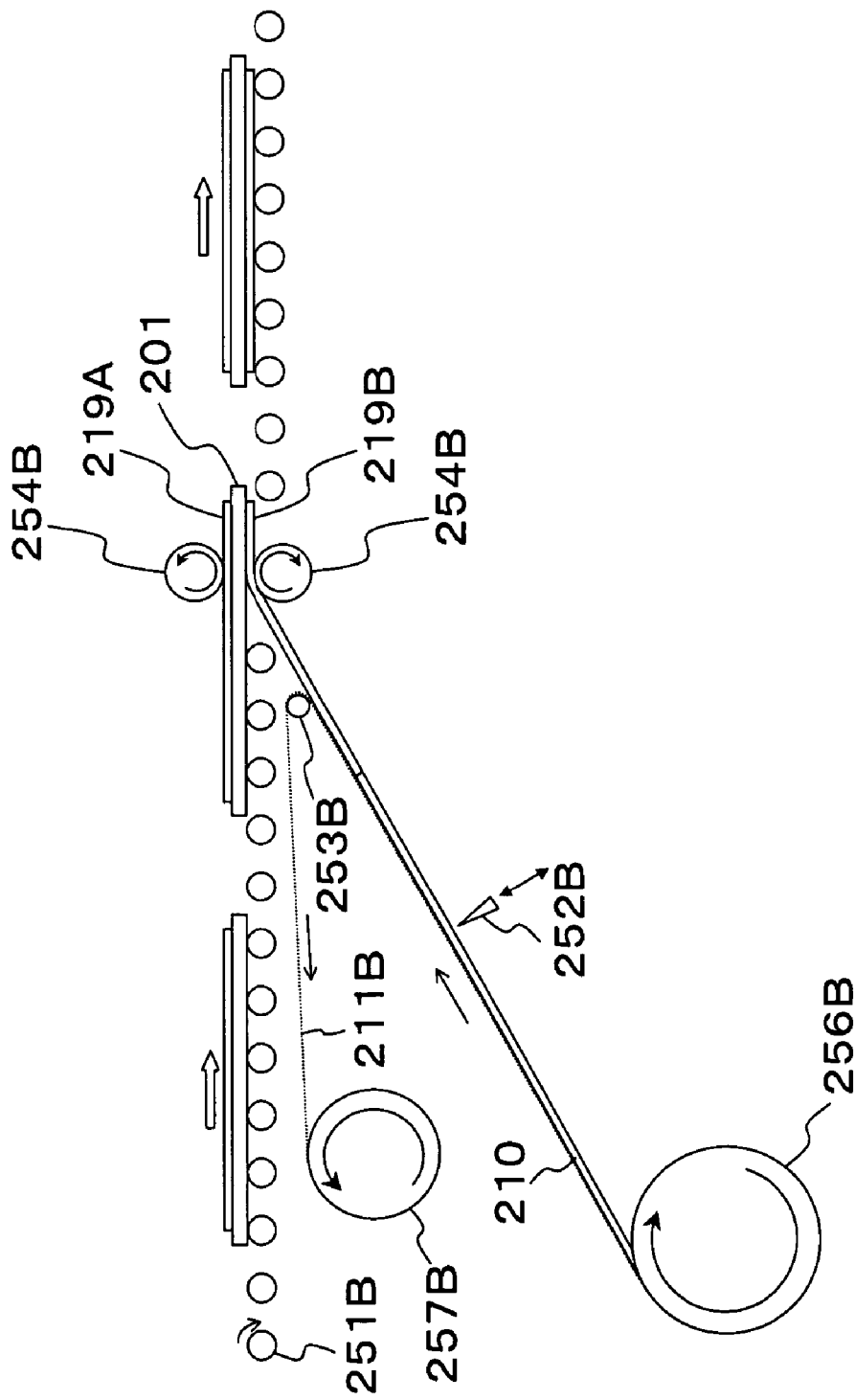
FIG. 23 is a side view schematically showing the structure of a second transport unit of the polarizing plate bonding apparatus according to the embodiment 3 of the present invention (second solution).

Embodiment 3 of the present invention (second solution) is now explained with reference to the drawings. FIG. 20 schematically shows the structure of a polarizing plate bonding apparatus according to embodiment 3 of the present invention (second solution). FIG. 21 is a plan view schematically showing the structure of a polarizing plate bonding apparatus according to embodiment 3 of the present invention (second solution). FIG. 22 is a side view schematically showing the structure of a first transport unit of the polarizing plate bonding apparatus according to embodiment 3 of the present invention (second solution). FIG. 23 is a side view schematically showing the structure of a second transport unit of the polarizing plate bonding apparatus according to embodiment 3 of the present invention (second solution).

Referring to FIG. 20, the polarizing plate bonding apparatus of embodiment 3 of the second solution is roughly divided into a first transport unit, an inverting unit and a second transport unit. In the first transport unit, a substrate (201A of FIG. 21), supplied from a supply unit, is transported, a polarizing plate reeled out from the reel-out roll is half-cut at a preset length, a release film is separated, and the polarizing plate thus cut is bonded to the lower side of a substrate (201B of FIG. 21). In the inverting unit, the substrate transported from the first transport unit (a substrate on lower surface of which is bonded a polarizing plate; 201B of FIG. 21) is inverted upside down so that the end face of the inverted substrate toward the forward direction of the inverted substrate is perpendicular to the proceeding direction. The inverted substrate (a substrate on the upper surface of which is bonded a polarizing plate; 201C of FIG. 21) is sent to the second transport unit. In the second transport unit, the substrate sent from the inverting unit (a substrate on the upper surface of which is bonded a polarizing plate; 201D of FIG. 21) is transported in a direction perpendicular to the direction of transport of the substrate by the first transport unit. A polarizing plate reeled out from the reel-out roll is half-cut and freed of the release film. The so cut polarizing plate is bonded to the lower surface of the substrate to give a substrate (a substrate on both surfaces of which the polarizing plates are bonded; 201E of FIG. 21).

Referring to FIG. 22 and to FIG. 23, the structure of the polarizing plate bonding apparatus according to embodiment 3 of the second solution is now explained in detail. A polarizing plate bonding apparatus 250 includes a first transport means 251A for transporting a substrate 201 as one end surface thereof is perpendicular to the direction of travel, and a first cutting means 252A which, when a severed end face toward the direction of travel perpendicular to the longitudinal direction of a first strip-shaped film 210A, comprised of a release film 211A bonded to a polarizing plate with interposition of an adhesive layer, has traveled a length corresponding to the length of the substrate 201, cuts at least the polarizing plate and the adhesive layer in a direction perpendicular to the longitudinal direction so as to leave the release film 211A uncut. The polarizing plate bonding apparatus also includes a first release film separating means 253A for separating the release film 211A from the first film piece 219A severed by the cutting by the first cutting means 252A, and a first bonding means 254A for bonding the tacky surface of the first film piece 219A, freed of the release film 211A, to a corresponding plate surface piece of the substrate 201, so that the severed surface of the first film piece 219A will be parallel to the forward end face toward the direction of travel of the substrate 201 transported by the first transport means 251A. The polarizing plate bonding apparatus also includes an inverting means 255 for inverting upside-down, the substrate 201 which is transported by the first transport means 251A and the first film piece 219A is affixed to, so that the end face toward the direction of travel of the inverted substrate 201 is perpendicular to the proceeding direction, and a second transporting means 251B for transporting the substrate 201, so far transported by the first transport means 251A, in a direction perpendicular to the transporting direction of the first transport means 251A. The polarizing plate bonding apparatus also includes a second cutting means 252B for cutting at least a polarizing plate and an adhesive layer of the second strip-shaped film 210B in a direction perpendicular to the longitudinal direction thereof so as to leave a release film 211B uncut, when a severed surface toward the direction of travel perpendicular to the longitudinal direction of the second strip-shaped film 210B has traveled a length corresponding to the substrate 201 transported by the second transport means 251B. The second strip-shaped film 210B is supplied from the plate surface side of the substrate 201 opposite to the surface to which has been bonded the first film piece 219A. The second strip-shaped film 210B includes the polarizing plate and the release film 211B bonded thereto with interposition of the adhesive layer. The direction of the axis of light transmission of the polarizing plate of the film 210B is perpendicular to the direction of the axis of light transmission of the polarizing plate of the first strip-shaped film 210A when the second strip-shaped film 210B is combined to the release film 211A of the first strip-shaped film 210A. The polarizing plate bonding apparatus also includes a second release film separating means 253B for separating the release film 211B from the second film piece 219B severed by the cutting with the second cutting means 252B, and a second bonding means 254B for bonding the tacky surface of the second film piece 219B, freed of the release film 211B, to the corresponding plate surface of the substrate 201 opposite to the plate surface thereof bonded with the first film piece 219A, so that the end face toward the direction of travel of the substrate 201 transported by the second transport means 251B is parallel to the severed surface of the second film piece 219B.

In the polarizing plate bonding apparatus 250 according to embodiment 3 of the second solution, the film piece 219A is bonded from the underside of the substrate 201, the substrate is inverted upside down and the inverted film piece 219A is bonded from the underside of the substrate 201 in FIG. 20 to FIG. 23. Alternatively, the film piece 219A may be bonded from the upper side of the substrate 201, the substrate is inverted upside-down and the inverted film piece 219A is then bonded from the upper side of the substrate 201. Still alternatively, the film piece 219A may be bonded from the lower side of the substrate 201 and the film piece 219A may be bonded from the upper side without inverting the substrate 201. Still alternatively, film piece 219A may be bonded from the upper side of the substrate 201, and the film piece 219A may be bonded from the underside of the substrate 201 without inverting the substrate 201. With the polarizing plate bonding apparatus 250 of the type in which the film piece 219A is bonded from the underside of the substrate 201, the substrate 201 is inverted upside down and the film piece 219A is bonded from the underside of the substrate 201, cutting (half-cut) is from the underside of the strip-shaped film, so that contaminants may be prohibited from intrusion The substrate 201 and the strip-shaped films 210A, 210B, used in the polarizing plate bonding apparatus 250 pertaining to embodiment 3 of the second solution, are the same as those used in embodiment 2 of the second solution. However, in cases where the longitudinal and transverse lengths of the substrate 201 are of different magnitudes, the film widths of the first strip-shaped film 210A and the second strip-shaped film 210B may be of different magnitudes, in keeping with the corresponding size of the substrate 201. In this case, the reel-out rolls, about which are wound the strip-shaped films, may be demarcated from each other depending on the size (width) with advantage in the case of roll exchanging operations. In the case of a circular polarization film used, the axis of orientation of the phase difference film of the first strip-shaped film 210A is equated to the axis of orientation of the phase difference film of the second strip-shaped film 210B. In this manner, the axes of orientation of the phase difference films in cases where film pieces are bonded to both substrate surfaces may be at right angles to each other, while the strip-shaped films can be supplied continuously.

The transport means 251A, 251B, cutting means 252A, 252B, release film separating means 253A, 253B, bonding means 254A, 254B, reel-out rolls 256A, 256B and the takeup rolls 257A, 257B (see FIG. 22 and FIG. 23) in embodiment 3 of the second solution are substantially analogous with the transport means 236, cutting means 231B, release film separating means 232B, bonding means 233, reel-out roll 234B and the takeup roll 235B of embodiment 1 of the second solution, respectively (see FIG. 15)

In the bonding means 254A of embodiment 3 of the second solution, the film piece 219A is bonded to only one side of the substrate 201. In the bonding means 254B, the film pieces 219A, 219B are apparently bonded to both surfaces of the substrate 201. In actuality, however, the film piece 219B is bonded to only one side of the substrate 201.

The inverting means 255 is required when the directions of supplying film pieces 219A, 219B in the first bonding means 254A, 254B are the same, for example the film piece 219A is supplied from the underside of the substrate in the first bonding means 254A and the film piece 219B is supplied from the underside of the substrate in the second bonding means 254B. Meanwhile, in cases where the directions of supplying the film pieces 219A, 219B are opposite to each other in the bonding means 254A, 254B, for example, the film piece 219A is bonded in the first bonding means 254A from the lower substrate surface and the film piece 219B is bonded in the second bonding means 254B from the upper side of the substrate, the inverting means 255 is not needed.

Figure 24:
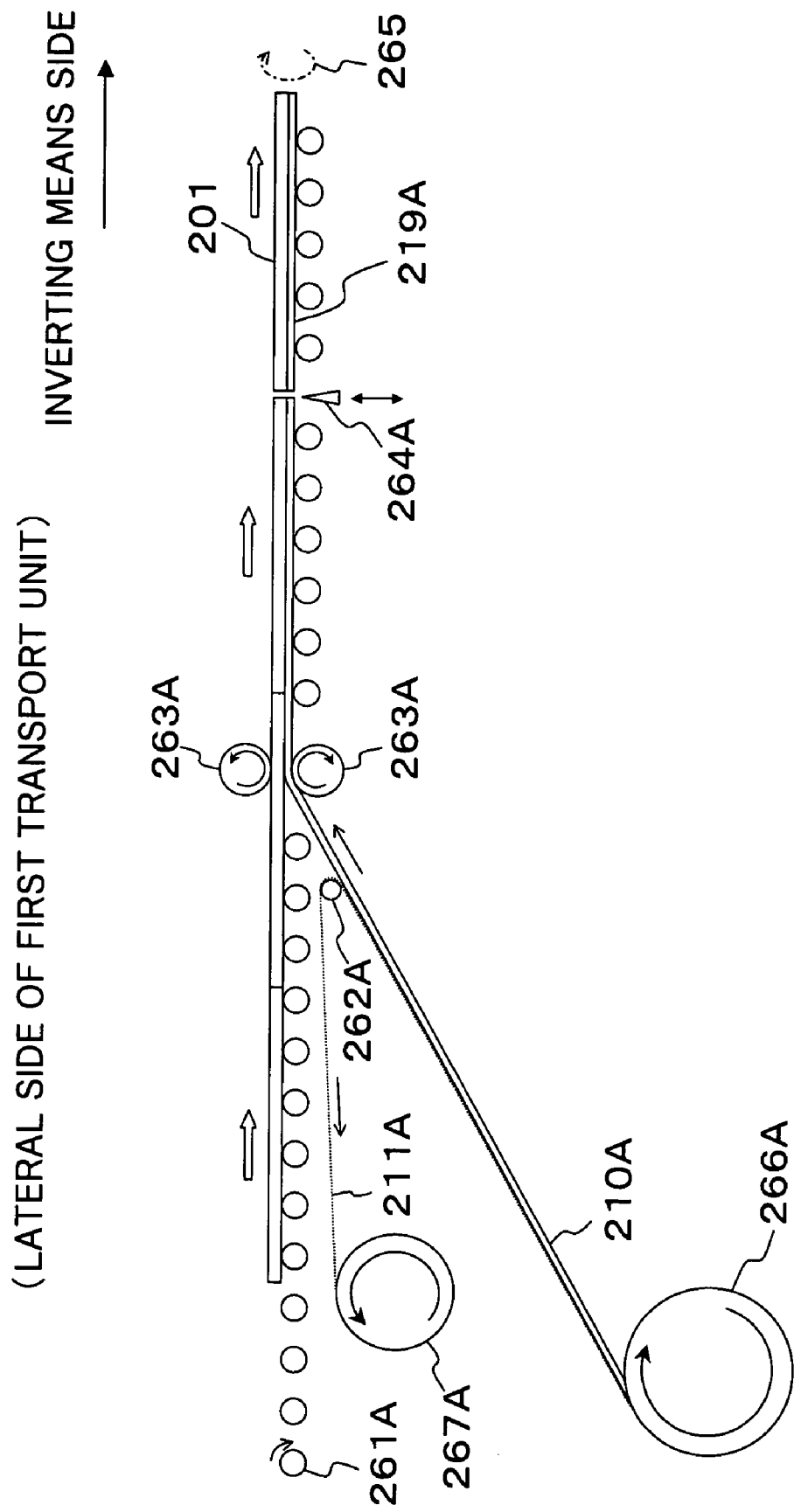
FIG. 24 is a side view schematically showing the structure of a first transport unit of the polarizing plate bonding apparatus according to an embodiment 4 of the present invention (second solution).

Embodiment 4 of the present invention (second solution) is now explained with reference to the drawings. FIG. 24 is a side view schematically showing the structure of a first transport unit of a polarizing plate bonding apparatus according to embodiment 4 of the present invention (second solution). FIG. 25 is a side view schematically showing the structure of a second transport unit of the polarizing plate bonding apparatus according to embodiment 4 of the present invention (second solution).

Similarly to the polarizing plate bonding apparatus according to embodiment 3 of the second solution, shown in FIG. 20, the polarizing plate bonding apparatus of embodiment 4 of the second solution is roughly divided into a first transport unit, an inverting unit and a second transport unit. In the first transport unit, a substrate (201A of FIG. 21), supplied from a supply unit, is transported, a polarizing plate reeled out from a reel-out roll is separated from a release film, and the polarizing plate is bonded to the lower side of a substrate (201B of FIG. 21) and severed at a preset position. In the inverting unit, the substrate transported from the first transport unit (a substrate on the lower one surface of which has been bonded the polarizing plate; FIG. 21) is inverted upside-down so that the end face toward the direction of travel of the as-inverted substrate is perpendicular to the direction of travel. The so inverted substrate (a substrate on the upper one surface of which has been bonded the polarizing plate; 201C of FIG. 21) is sent to the second transport unit. In the second transport unit, the substrate sent from the inverting unit (a substrate on the upper surface of which has been bonded the polarizing plate; 201D of FIG. 21) is transported in a direction perpendicular to the direction of transport of the substrate by the first transport unit. The polarizing plate reeled out from the reel-out roll is freed of the release film. The polarizing plate is bonded to the lower surface of the substrate (a substrate on both surfaces of which the polarizing plates have been bonded; 201E of FIG. 21) and severed at a preset position.

Referring to FIG. 24 and to FIG. 25, the structure of the polarizing plate bonding apparatus according to embodiment 4 of the second solution is now explained in detail. A polarizing plate bonding apparatus 260 includes a first transport means 261A for transporting a substrate 201 as one end surface of the substrate 201 is perpendicular to the direction of travel, a first release film separating means 262A for separating a release film 211A from a first strip-shaped film 210A, composed of a polarizing plate and the release film 211A bonded thereto with interposition of an adhesive layer, and a first bonding means 263A for bonding the tacky surface of the first strip-shaped film 210A, freed of the release film 211A, to the corresponding plate surface piece of the substrate 201, so that the direction of travel of the first film piece 210A, coincides with the transport direction of the substrate 201 transported by the first transport means 261A. The polarizing plate bonding apparatus 260 also includes a first cutting means 264A for cutting the first strip-shaped film 210A, bonded by the first bonding means 263A to the substrate 201, in a direction parallel to the forward or rear end face toward or opposite the transport direction of the substrate 201, transported by the first transport means 261A, and an inverting means 265 for inverting upside-down, the substrate 201 which is transported by the first transport means 261A and the first strip-shaped film 219A is affixed to, so that the end face toward the direction of travel of the as-inverted substrate 201 will be perpendicular to the direction of travel, and a second transporting means 261B for transporting the substrate 201, transported by the first transport means 261A, in a direction perpendicular to the transporting direction of the first transport means 261A. The polarizing plate bonding apparatus also includes a second release film separating means 262B for separating a release film 211B from a second strip-shaped film 210B supplied from the plate surface side of the substrate 201 opposite to the surface thereof bonded to the first film piece 219A. The substrate 201 is transported by the second transporting means 261B. The second strip-shaped film 210B is composed of a polarizing plate and the release film 211B bonded to the polarizing plate with interposition of an adhesive layer. An axis of light transmission of the polarizing plate of the second strip-shaped film 210B is perpendicular to an axis of light transmission of the polarizing plate of the first strip-shaped film 210A when the release film 211B is combined to the release film 211A of the first strip-shaped film 210A. The polarizing plate bonding apparatus also includes a second bonding means 263B for bonding a tacky surface of the second strip-shaped film 210B, freed of the release film 211B, to a plate surface opposite to the surface of the substrate 201 bonded to the film piece 219A of the first strip-shaped film 210A, so that the direction of travel of the second strip-shaped film 210B will correspond to the transport direction of the substrate 201 transported by the second transport means 261B, and a second cutting means 264B for cutting the second strip-shaped film 210B, bonded by the second bonding means 263B to the substrate 201, in a direction parallel to the forward or rear end face toward or opposite the transport direction of the substrate 201 transported by the second transport means 261B.

In the polarizing plate bonding apparatus 260 according to embodiment 4 of the second solution, the film piece 219A is bonded from the underside of the substrate 201, the substrate is inverted upside down and the film piece 219A is bonded from the underside of the substrate 201 in FIG. 24 and FIG. 25. Alternatively, the film piece 219A may be bonded from the upper side of the substrate 201, the substrate is inverted upside-down and the film piece 219A is then bonded from the upper side of the substrate 201, or the film piece 219A may be bonded from the underside of the substrate 201, while the film piece 219A is bonded from the upper side of the substrate 201 without inverting the substrate 201. Still alternatively, the film piece 219A may be bonded from the upper side of the substrate 201, while the film piece 219A is bonded from the underside of the substrate 201 without inverting the substrate 201. With the polarizing plate bonding apparatus 250 of the type in which the film piece 219A is bonded from the underside of the substrate 201, the substrate is inverted upside-down and the film piece 219A is bonded from the underside of the substrate 201, half-cut is conducted from the underside of the strip-shaped film, so that intrusion of contaminants may be prohibited meritoriously.

The substrate 201 and the strip-shaped films 210A, 210B, used in the polarizing plate bonding apparatus 250, pertaining to embodiment 4 of the second solution, are similar to those used in embodiment 3 of the second solution.

The release film separating means 262A, 262B, bonding means 263A, 263B, reel-out rolls 266A, 266B and takeup rolls 267A, 267B in the embodiment 4 of the second solution (see FIG. 24 and FIG. 25) are substantially similar to the release film separating means 253A, 253B, bonding means 254A, 254B, reel-out rolls 256A, 256B and takeup rolls 257A, 257B, respectively, of the polarizing plate bonding apparatus in embodiment 3 of the second solution, respectively (see FIG. 22 and FIG. 23). The transport means 261A, 261B pertaining to embodiment 4 of the second solution (see FIG. 24 and FIG. 25) is similar to the transport means 246 in embodiment 2 of the second solution (see FIG. 18). In a manner different from the cutting means in embodiment 3 of the second solution, the cutting means 264A, 264B in embodiment 4 of the second solution are provided on a line in the downstream from the bonding means 263A, 263B of the transport means 261A, 261B, and sever the strip-shaped films 210A, 210B only on one side (underside) of the substrate. Meanwhile, the point of difference of the bonding means 254 is that not the film piece but the non-cut strip-shaped films 210A, 210B are bonded to both surfaces of the substrate 201.

Embodiment of the Third Solution

Figure 27A:
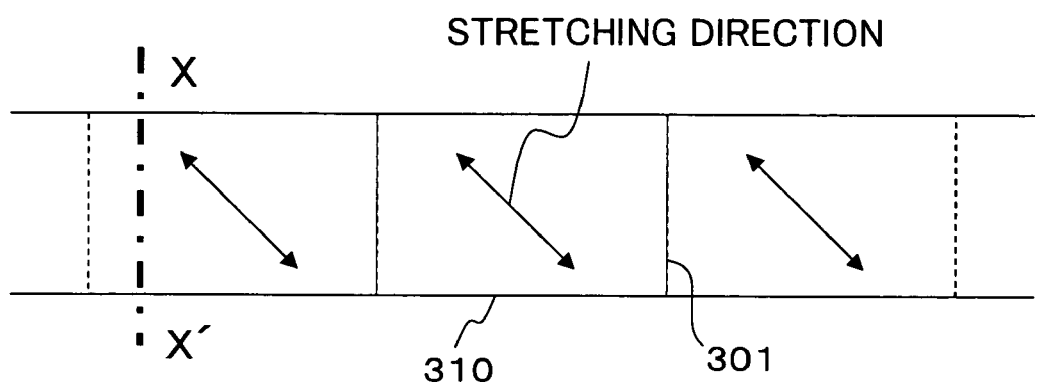
FIG. 27 is a plan view and a cross-sectional view showing the structure of a strip-shaped film used in the polarizing plate bonding apparatus according to the embodiment 1 of the present invention (third solution).

Referring to the drawings, embodiment 1 of the present invention (third solution) is now explained. FIG. 26 is a side view and a plan view schematically showing the structure of a polarizing plate bonding apparatus according to embodiment 1 of the present invention (third solution). FIG. 27 is a plan view and a cross-sectional view showing the structure of a strip-shaped film of the polarizing plate bonding apparatus according to the embodiment 1 of the present invention (third solution) FIG. 28 is a side view schematically showing the operation of a cutting means of the polarizing plate bonding apparatus according to embodiment 1 of the present invention (third solution).

Referring to FIG. 26, a polarizing plate bonding apparatus 320 for bonding a polarizing plate (film piece 319) to a substrate 301 includes a release film separating means 321 for separating a release film 311 from a strip-shaped film 310, which is composed of a polarizing plate and the release film 311 bonded to the polarizing plate with interposition of an adhesive layer and which is supplied from one surface of the substrate 301 to be transported, a bonding means 322 for bonding the tacky surface of the strip-shaped film 310 freed of the release film 311 to the corresponding plate surface of the substrate 301 so that the direction of travel of the strip-shaped film 310 coincides with the transport direction of the substrate 301, and a cutting means 323 for severing the strip-shaped film 310, bonded by the bonding means 322 to one surface of the substrate 301, in a direction parallel to a forward end face or a rear end face of the substrate toward or opposite the transport direction thereof, whereby polarizing plate film pieces may be bonded continuously and automatically such as to diminish the amount of waste materials.

Figure 27B:
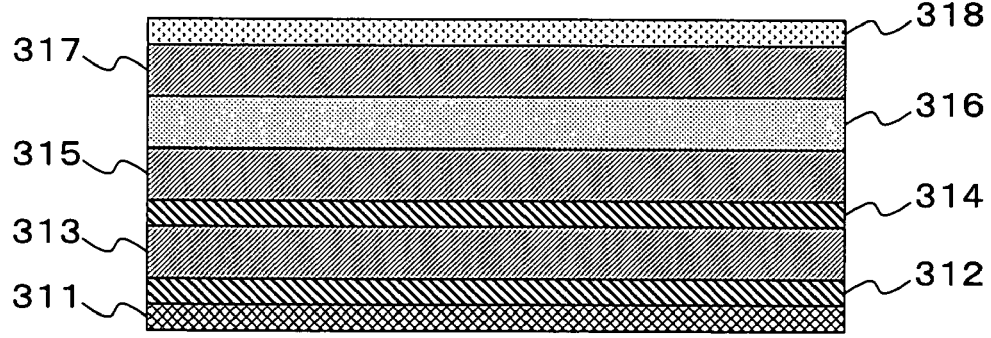
Figure 28:
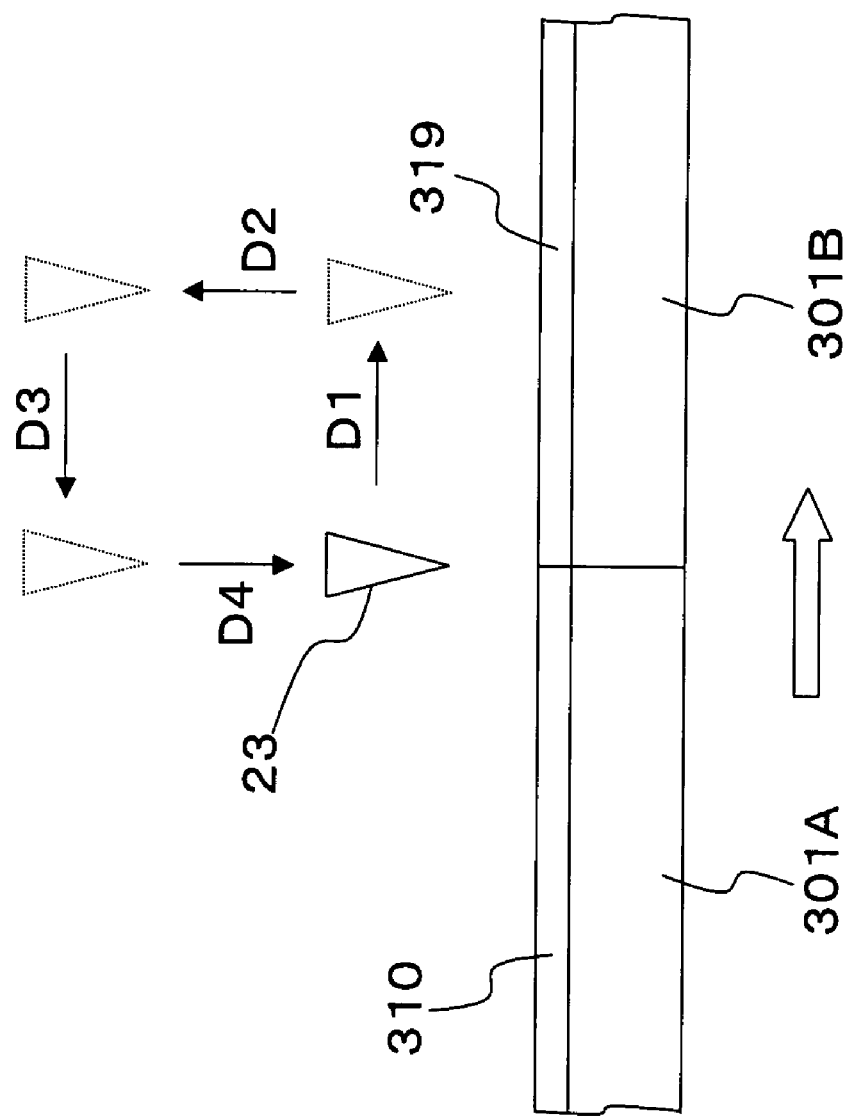
FIG. 28 is a side view schematically showing the operation of cutting means of the polarizing plate bonding apparatus according to the embodiment 1 of the present invention (third solution).

The strip-shaped film 310, used in the present invention (third solution), is composed of a polarizing plate and the release film 311 bonded thereto with interposition of an adhesive layer, and may, for example, be a circular polarizing film, composed of a polarizing plate 316 and a phase difference film 313 bonded thereto, as shown in FIG. 27(B). In cases where it is used for an LCD for a TN liquid crystal, the polarizing plate 316 has an axis of light transmission inclined by an angle preferably not less than 20° and not more than 70°, more preferably not less than 40° and not more than 50°, and usually 45° relative to the longitudinal direction of the film (see FIG. 27(A)). As for the method for the preparation of this polarizing plate, reference is had to the JP patent Kokai JP-A-2002-86554. Preferably, protective films 315, 317 are bonded to both surfaces of the polarizing plate 316. This polarizing plate 316 is such a one stretched obliquely with respect to the longitudinal direction of the film, and hence is termed an "obliquely stretched polarizing plate". With use of the obliquely stretched polarizing plate 316, continuous film supply becomes feasible. In the case of a film for circular polarization, composed of the obliquely stretched polarizing plate 316 (a protective film 315) and a phase difference film 313 bonded thereto by an adhesive layer 314, the phase difference film 313 is preferably such a one as having an axis of orientation perpendicular or parallel to the longitudinal direction of the film. In this case, the film for circular polarization can be supplied continuously. The thickness of the polarizing plate 316 is e.g., on the order of 5 through 100 μm. The width of the polarizing plate 316 is suitably selected depending on the size of the substrate to be bonded. It is sufficient that the adhesives 312, 314 are ordinary adhesives used for bonding the substrate and the optical film to each other, for example, acrylic adhesive, polyurethane adhesive, epoxy adhesive or rubber-based adhesive. The release film 311 is a release material and specifically an ordinary release material used for an optical film, such as a polyethylene terephthalate film or a polyester film. A inserting paper sheet 318 for preventing the film surface from grazing may be bonded to the surface of the polarizing plate 316 opposite to the surface bonded to the release film 311. The strip-shaped film 310 is preferably supplied from a real out roll 324. (see FIG. 26). Meanwhile, in cases where the polarizing plate 316 is used for an LCD for VA liquid crystal or a liquid crystal for an IPS system, the polarizing plate 316 may be used, the direction of an axis of light transmission of which is oriented parallel or at right angles to the longitudinal direction of the film, may be used.

The substrate 301 is a flat plate-shaped member, such as a glass substrate or a plastic substrate, used for a display apparatus, such as a liquid crystal device or a plasma display apparatus, and may be a substrate, on which component parts, such as liquid crystal cell or electrode, are mounted from the outset. The substrate 301 is preferably of a substantially quadrilateral shape, such as a square or a rectangle (FIG. 26 and FIG. 27(A)).

The release film separating means 321 is a means for separating the release film 311 from the strip-shaped film 310, and may be exemplified by a roll or a wedge member. The release film 311, separated by the release film separating means 321 from the strip-shaped film 310, may be taken up on a takeup roll 325 for recovery (FIG. 26).

The bonding means 322 is a means for bonding the tacky surface of the strip-shaped film 310, freed of the release film 311, to a corresponding position on the substrate 301, so that the direction of travel of the strip-shaped film 310 coincides with the transport direction of the substrate 301 (see FIG. 26). The bonding means may, for example, be a nip roll thrusting each substrate surface from outside.

The cutting means 323 may be enumerated by a push-cut cutter or a dicing cutter used for cutting an optical film, and is composed of e.g., a cutter edge, a cylinder actuating the cutter edge and a lower dead point position adjustment member for adjusting the lower dead point position of the cutter blade (see FIG. 26). By adjusting the lower dead point position to not more than 0.5 times as thick as the release film 311, it is possible to cut only the strip-shaped film 310 in a direction perpendicular to the longitudinal direction of the film (see FIG. 26). In FIG. 26, the strip-shaped film 310 is severed once from above at an abutting portion between of the substrate 301 and a neighboring substrate 301. In cases where the film piece 319 is bonded at a preset spacing from the end(s) of the substrate 301 (so called bonding with a margin), cutting may be made twice in the vicinity of the abutting portion, that is, a first cutting and a second cutting may be made on one substrate 301 and on the neighboring substrate 301, respectively. In the case of the bonding with a margin, unneeded chips (strip-like pieces) are produced. In cases where the strip-shaped film 310 is bonded continuously to the substrate without halting the substrate transport, it is sufficient that the cutting means 323 is operated in a certain domain in association with the velocity and direction of transport of the substrate on the transport means (see FIG. 28). The movement of the cutting means 323 in this case may be enumerated by the movement of D1 to D4 of FIG. 28 seen from the lateral side. At least the movement speed of D1 and the transport speed of the substrates 301A, 301B are equal to each other, the cutting means 323 is lowered towards the substrate during movement of D1 and the strip-shaped film 310 is severed from above at the abutting area between the substrates 301A and 301B. The movement of the cutting means 323 may be a rotational movement seen from the lateral side.

The transport means 326 is a means for transporting the substrate 301 towards the bonding means 322 or its extension while placing one end face of the substrate 301 at right angles to the proceeding direction, and is preferably a roller conveyor or a wheel conveyor which transports the substrate 301 horizontally on an array of rolls or wheels. More preferably, the outer roller cylinder or wheel is mounted on a shaft rotated via a bearing so that the outer roller cylinder or wheel is rotated at a surface velocity coincident with the velocity of the substrate being transported to prevent the substrate from being damaged by the relative slip between the outer roller cylinder or wheel and the substrate. The transport means 326 is preferably so arranged that plural substrates 301 of a substantially quadrilateral shape and a fixed size are transported arrayed in series to the direction of travel and that, when the strip-shaped film 310 is bonded by the bonding means 322 to the substrate 301, in the course of the transport, the forward and rear end faces toward and opposite, respectively, the transport direction of the substrate 301 are abutted against the forward or rear end faces of the neighboring substrates 301.

Figure 30:
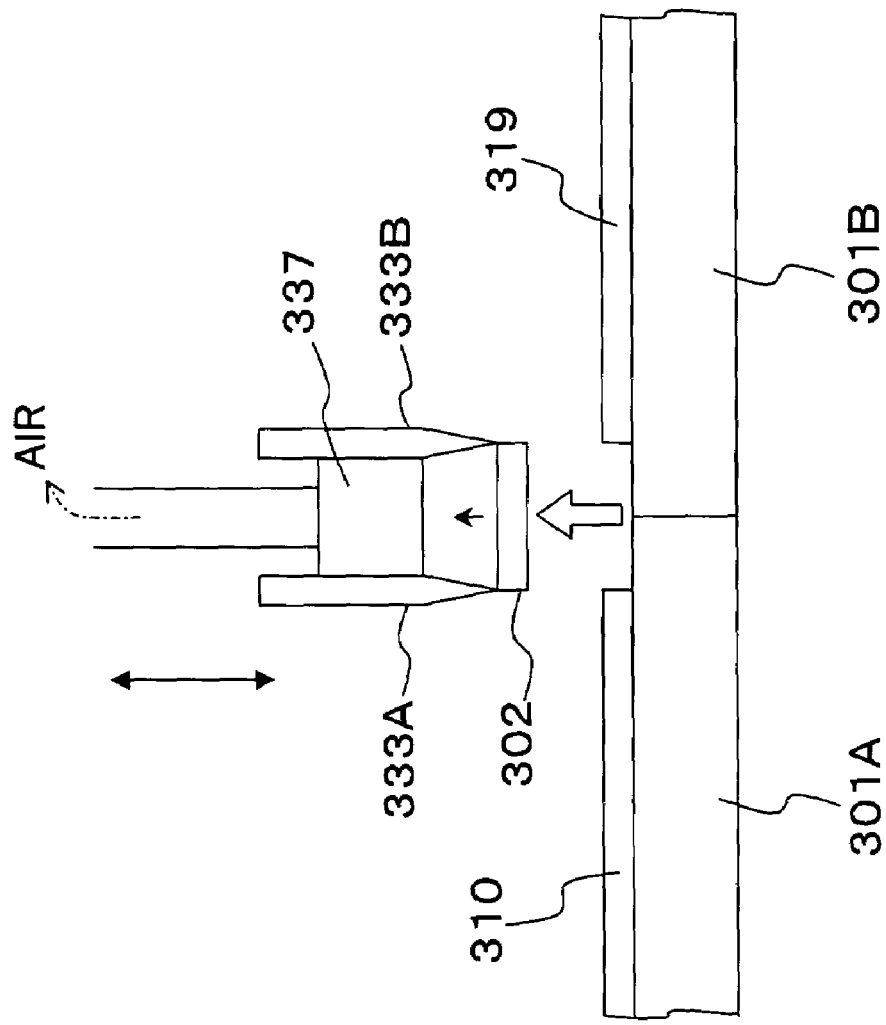
FIG. 30 is a side view schematically showing the operation of cutting means of the polarizing plate bonding apparatus according to the embodiment 2 of the present invention (third solution).

Referring to the drawings, embodiment 2 of the present invention (third solution) is now explained. FIG. 29 is a side view and a plan view schematically showing the structure of a polarizing plate bonding apparatus according to embodiment 2 of the present invention (third solution). FIG. 30 is a side view showing the operation of cutting means of the polarizing plate bonding apparatus according to embodiment 2 of the present invention (third solution).

A polarizing plate bonding apparatus 330 according to embodiment 2 of the third solution is substantially similar in structure to the polarizing plate bonding apparatus according to embodiment 1 of the third solution.

It is noted that cutting means 333A, 333B are means for cutting the strip-shaped film 310, bonded to one surface of the substrate 301 by a bonding means 332, in a direction parallel to the forward or rear end face toward or opposite the transport direction of the substrate 301. In the case of bonding with a margin, by which the film piece 319 is bonded to the substrate 301 with a certain margin from the end of the substrate 301, the cutting means preferably includes two blades 333A, 333B for simultaneously cutting into the surface of the strip-shaped film 310, bonded to the substrate 301, from the vertical direction, and for severing in a direction perpendicular to the transport direction of the substrate 301, with the two blades 333A, 333B being spaced apart at a present distance from each other (FIG. 30). The two blades 333A, 333B sever the strip-shaped film 310 on the plate surfaces of the respective separate substrates 301A, 301B (see FIG. 30). It is preferred in this case to provide a suction means 337 between the blades 333A. 333B for sucking unneeded cutting chips (strips) 302 of the severed strip-shaped film 310. The suction means 337 operates along with the two blades 333A, 333B. Even in this case, the two blades 333A, 333B may be operated in keeping with the velocity and the direction of transport of the substrate 301 on transport means 336 in a certain domain. In such cutting, the forward and rear end faces of the substrate 301B along the transport direction thereof are preferably abutted against the forward or rear end faces of the neighboring substrate 301B along the transport direction thereof, as shown in FIG. 30. The reason is that, by bonding the strip-shaped film 310 as the two substrates 301 abut against each other, the cut chips 302 may be decreased in size to raise the yield of the polarizing plates.

Figure 31:
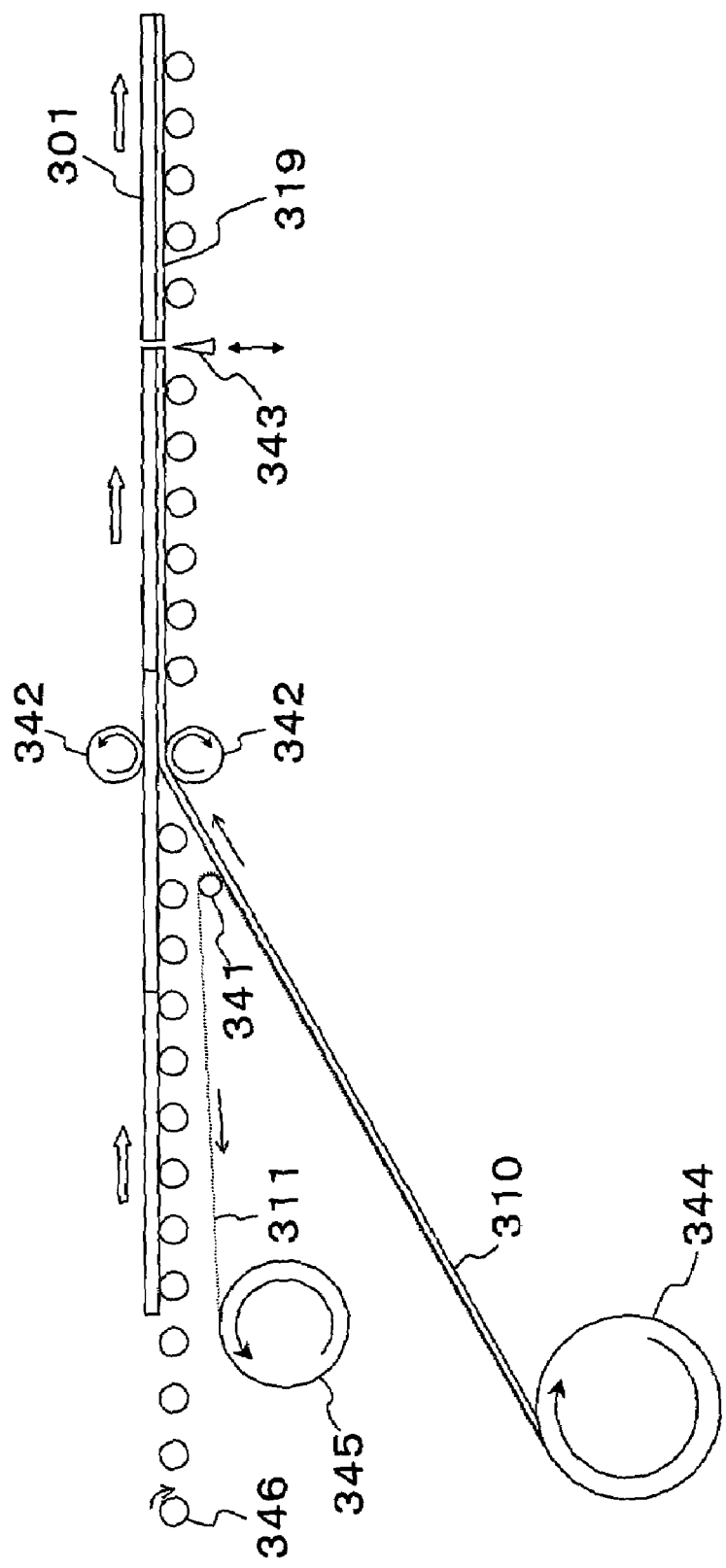
FIG. 31 is a side view schematically showing the structure of a polarizing plate bonding apparatus according to the embodiment 3 of the present invention (third solution).

Embodiment 3 of the present invention (third solution) is explained with reference to the drawings. FIG. 31 is a side view schematically showing the structure of a polarizing plate bonding apparatus according to embodiment 3 of the present invention (third solution).

A polarizing plate bonding apparatus 340 according to embodiment 3 of the third solution is substantially similar in structure to the polarizing plate bonding apparatus according to embodiment 1 of the third solution except the mounting positions of a release film separating means 341, reel-out roll 344 and takeup roll 345. This polarizing plate bonding apparatus 340 includes, below the substrate 301 transported on transporting means 346, the release film separating means 341, reel-out roll 344 and takeup roll 345. By supplying the strip-shaped film 310 from the lower side of the plate surface of the substrate 301 to be transported, and by having the strip-shaped film 310 bonded in position, it is possible to prevent intrusion of contaminants as well as to assure easy exchange of rolls of the strip-shaped films.

Embodiments of the Fourth Solution

Figure 32:
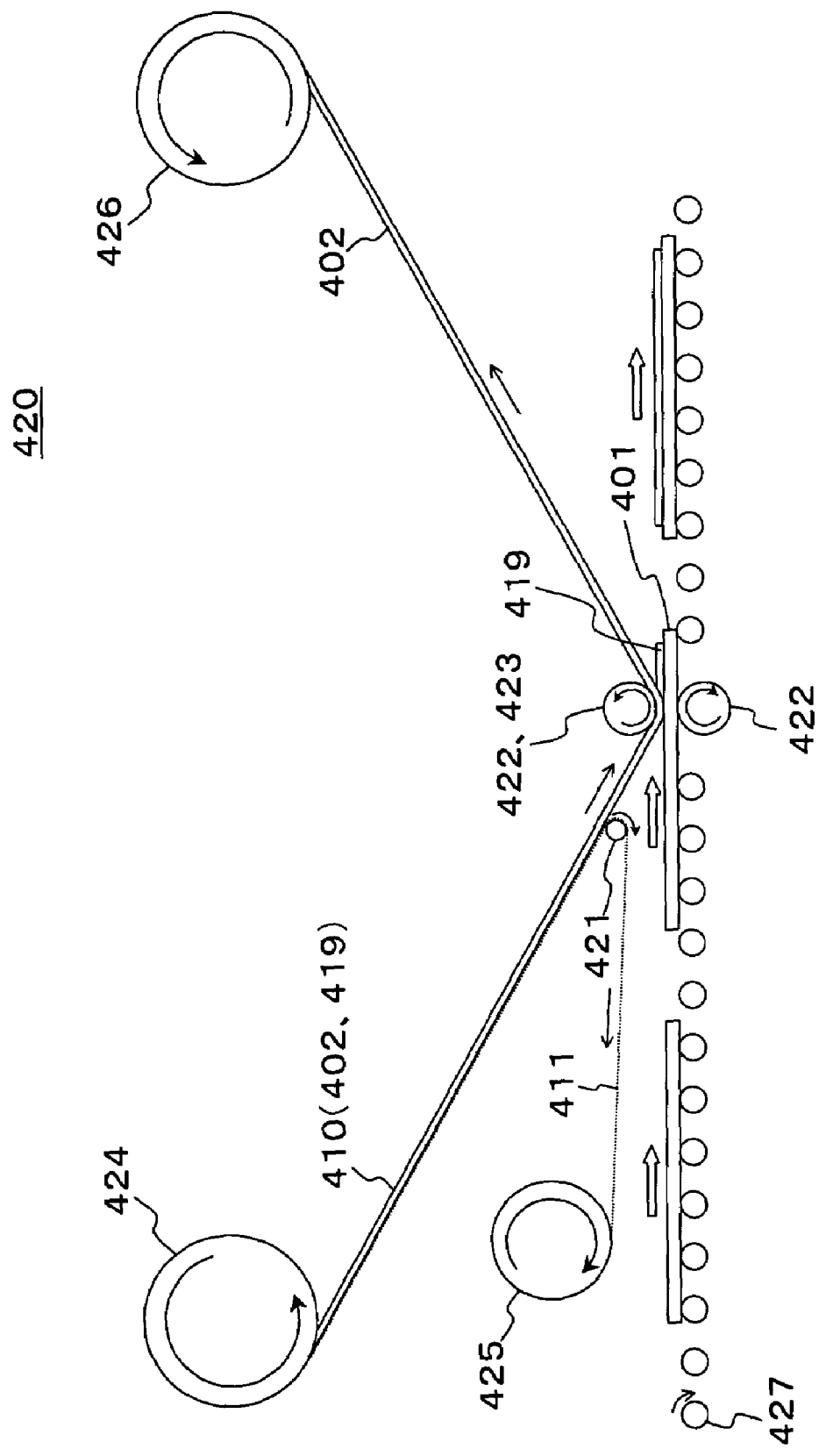
FIG. 32 is a side view schematically showing the structure of a polarizing plate bonding apparatus according to the embodiment 1 of the present invention (fourth solution).
Figure 33A:
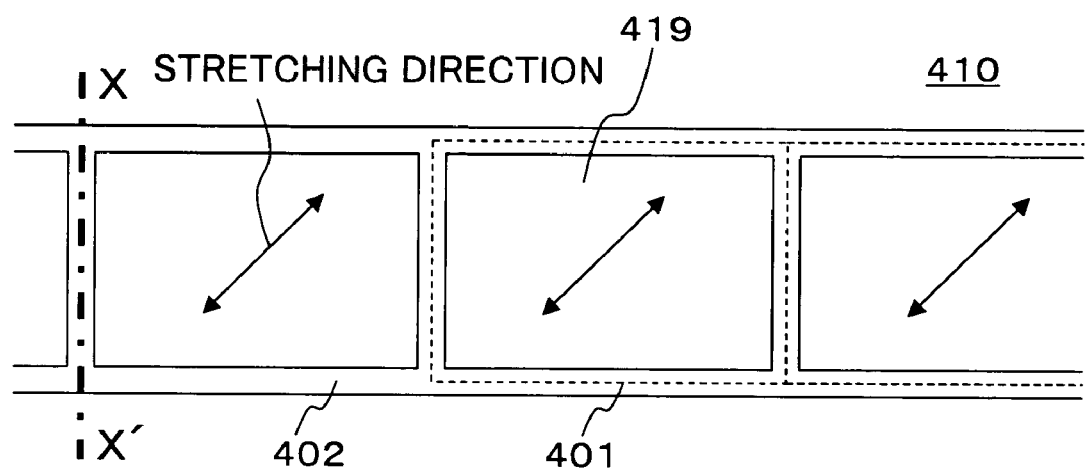
FIG. 33 is a plan view and a cross-sectional view showing the structure of a polarizing plate used in the polarizing plate bonding apparatus according to the embodiment 1 of the present invention (fourth solution).

Referring to the drawings, Embodiment 1 of the present invention (fourth solution) is now explained. FIG. 32 is a side view schematically showing the structure of a polarizing plate bonding apparatus according to embodiment 1 of the present invention (fourth solution). FIG. 33 is a plan view and a cross-sectional view showing the structure of a strip-shaped film used in the polarizing plate bonding apparatus according to embodiment 1 of the present invention (fourth solution). FIG. 34 is a perspective view schematically showing the operation of bonding and the state of selvedge separation by the polarizing plate bonding apparatus according to embodiment 1 of the present invention (fourth solution).

Referring to FIG. 32, a polarizing plate bonding apparatus 420 for bonding a polarizing plate (film piece 419) to a substrate 401 includes a release film separating means 421, a bonding means 422 and a selvedge separating means 423, for automatically bonding the film piece of a polarizing plate without halting the apparatus. The release film separating means 421 separates a release film 411 from a strip-shaped film 410 which is composed of a polarizing plate and the release film 411 bonded thereto with interposition of an adhesive layer and is supplied from one plate surface of the substrate 410, wherein at least the polarizing plate and the adhesive layer of the strip-shaped film 410 are cut while keeping the release film 411 uncut in such a manner that a plurality of rectangular profiles are made in advance each of which corresponds to the substrate 401 in the film surface, at least one of the sides of each rectangular profiles being perpendicular to the longitudinal direction of the film. The bonding means 422 bonds at least the tacky surface of the rectangular inner portion (film piece 419) of the strip-shaped film 410 freed of the release layer 411 to the corresponding plate surface of the substrate 401 so that the direction of travel the strip-shaped film 410 coincides with the transport direction of the substrate 401. The selvedge separating means 423 separates a selvedge 402 of the strip-shaped film 410 other than the rectangular inner portion (film piece 419) from the substrate 401.

Figure 33B:
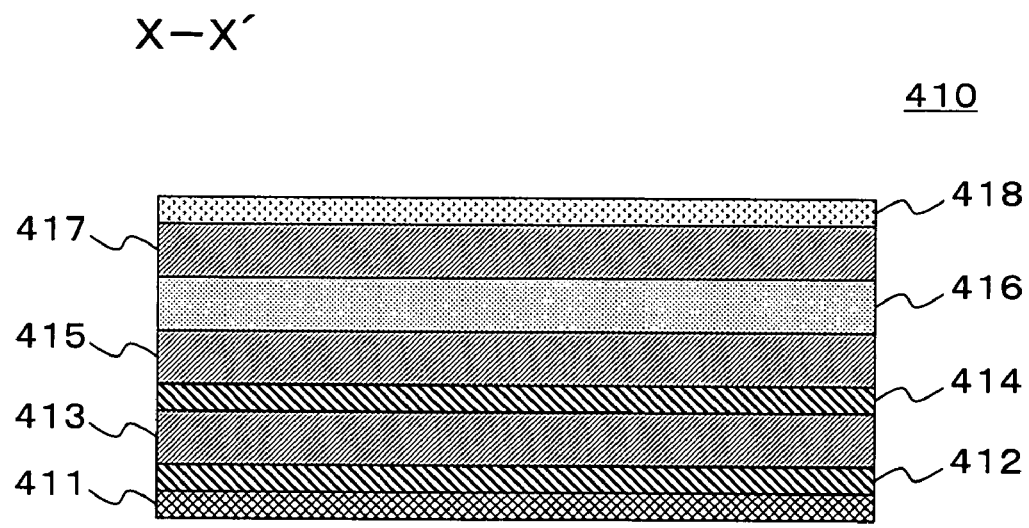
Figure 34:
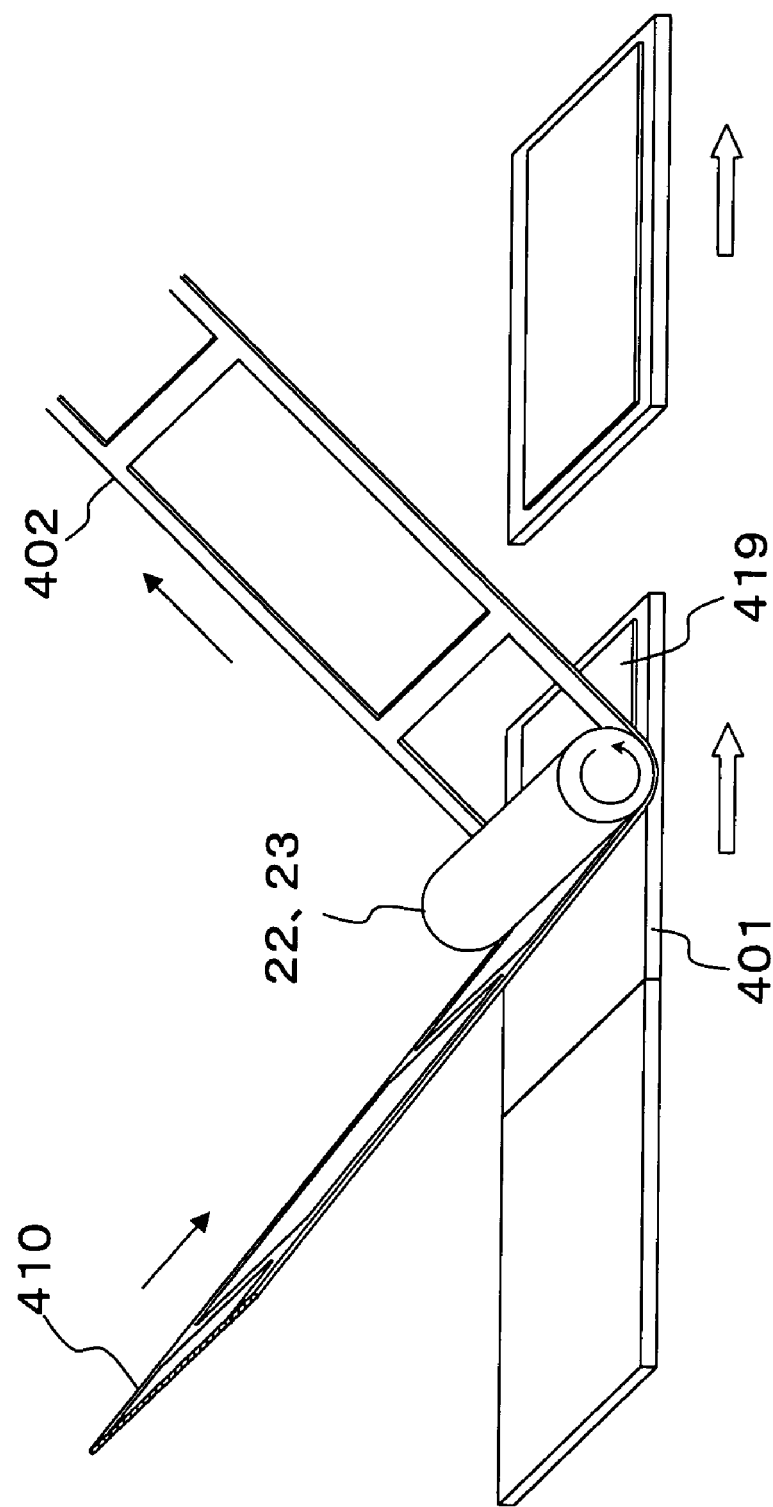
FIG. 34 is a perspective view schematically showing the state of bonding and selvedge separation in the polarizing plate bonding apparatus according to the embodiment 1 of the present invention (fourth solution).

The strip-shaped film 410 used in the present invention (fourth solution) is composed of a polarizing plate and the release film 411 bonded thereto with interposition of an adhesive layer, and may, for example, be a film of circular polarization composed of a polarizing plate 416 and a phase difference film 413 bonded together, as shown in FIG. 33(B). In cases where it is used for an LCD for TN liquid crystal, the polarizing plate 416 has the direction of an axis of light transmission oriented obliquely with respect to the longitudinal direction of the film. The angle of inclination between the longitudinal direction of the film and the axis of the light transmission is preferably between 20° C. and 70° C. both inclusive, more preferably between 40° C. and 50° C. both inclusive, and is ordinarily 45° (see FIG. 33(A)). As for the method for the preparation of this polarizing plate, reference is had to JP Patent Kokai JP-A-2002-86554. Preferably, protective films 415, 417 are bonded to both sides of the polarizing plate 416. The polarizing plate 416 used here has been stretched in an oblique direction relative to the longitudinal direction of the film and hence termed an "obliquely stretched polarizing plate". With use of the obliquely stretched polarizing plate 416, it is possible to supply the film continuously. In the case of a film for circular polarization, composed of the obliquely stretched polarizing plate 416 and the phase difference film 413 bonded together with interposition of an adhesive layer 414, the phase difference film 413 having an axis of orientation perpendicular or parallel to the longitudinal direction of the film is desirably used. By so doing, the film for circular polarization can be supplied continuously. The thickness of the polarizing plate 416 is e.g., 5 through 100 μm. The width of the polarizing plate 416 is suitably selected depending on the size of the substrate bonded. In view of ease with which the selvedge 402 may be peeled off from the substrate 401 continuously, the width of the polarizing plate 416 is preferably larger than the width of the substrate 401. The adhesive layers 412, 414 may be of any common adhesives used for bonding a substrate and an optical film together, such as acrylic-, polyurethane-, epoxy- or rubber-based adhesive. The release film 411 is of a release material commonly used for an optical film, such as a polyethylene terephthalate film or a polyester film. A inserting paper sheet 418 for protecting the film surface against scratches may be bonded to the surface of the polarizing plate 416 opposite to the surface bonded to the release film 411. The strip-shaped film 410 is preferably supplied from the reel-out rolls 424 (see FIG. 32). Meanwhile, in cases where the polarizing plate is used as LCD for a VA liquid crystal or as LCD for a liquid crystal of the IPS system, such a polarizing plate 416 may be used, in which the direction of an axis of light transmission of the polarizing plate is oriented parallel or perpendicular to the longitudinal direction of the film.

The strip-shaped film 410 used in the embodiment 1 of the fourth solution has a plurality of rectangular profiles which correspond to the shape of the substrate 401 within the film surface, at least one side of the rectangle being perpendicular to the longitudinal direction of the film, by cutting at least the polarizing plate and the adhesive layer, with keeping the release film 411 uncut. The inner area of the produced rectangle becomes a film piece 419 actually bonded to the substrate 401. The outer area outside the rectangle becomes a selvedge 402 not used for bonding the strip-shaped film to the substrate 401. The selvedge 402 is adapted to be continuously taken up by a selvedge takeup roll 426. To this end, both lateral sides of the strip-shaped film 410 are left in an uncut continuous state, while the width-wise portions defined between adjacent film pieces 419 connect to the lateral sides of the strip shaped film 410, such that, the selvedge 402,: without the film piece 419, presents a ladder shape (FIG. 34)

The substrate 401 is a flat-plate-shaped member, such as a glass substrate or a plastic substrate, used for a display device, such as a liquid crystal display device or a plasma display device. It may also be a substrate having component parts, such as a liquid crystal cell or an electrode, pre-mounted thereon. The substrate 401 is preferably of a substantially quadrilateral shape, such as a square or a rectangle (see FIG. 32 and FIG. 33(A)).

The release film separating means 421 is a means for separating the release film 411 from the strip-shaped film 410 (film piece 419 and selvedge 402) and may be exemplified by a roll or a wedge member. The release film 411 separated from the strip-shaped film 410 (film piece 419 and selvedge 402) by the release film separating means 421 may be taken up on a release film takeup roll 425 and recovered (see FIG. 32).

The bonding means 422 is a means for bonding a tacky surface of the film piece 419 of the strip-shaped film 410, freed of the release film 411, to a corresponding position of the substrate 401 so that the severed end face toward the direction of travel the strip-shaped film 410 is parallel to the end face toward the direction of travel the substrate (see FIG. 32) and may, for example, be a nip roll thrusting both substrate sides from outside.

The selvedge separating means 423 is a means for peeling the selvedge 402 of the strip-shaped film 410 except the film piece 419 from the substrate 401 and may, for example, be a roll (FIG. 32 and FIG. 34). The selvedge separating means 423 of embodiment 1 of the fourth solution has a roll(s) in common with the bonding means 422 and folds the selvedge 402 in a direction away from the substrate 401, with the roll as a point of fulcrum, to peel off only the selvedge 402. The selvedge 402, peeled from the selvedge separating means 423, is taken up by a selvedge takeup roll 426.

A transporting means 427 is a means for transporting the substrate 401 in a direction towards the bonding means 422 or its extension, with an end face of the substrate 401 at right angles to the direction of travel, and is preferably a roller conveyor or a wheel conveyor for horizontally transporting the substrate 401 on an array of rollers or wheels. More preferably, the outer roller cylinder or wheel is mounted on a shaft rotated via a bearing so that the outer roller cylinder or wheel is rotated at a surface velocity coincident with the velocity of the substrate being transported to prevent the substrate from being damaged by the relative slip between the outer roller cylinder or wheel and the substrate. The transport means 427 is preferably so arranged that plural substrates 401 of a substantially quadrilateral shape and a fixed size are transported arrayed in series to the direction of travel and that, when the strip-shaped film 410 (film piece 419) is bonded by the bonding means 422 to the substrate 401, in the course of the transport, the forward and rear end faces along the transport direction of the substrate 401 are abutted against the forward or rear end faces of the neighboring substrates 401.

Meanwhile, in cases where fine positioning adjustment between the tacky surface of the film piece 419 and the corresponding portion of the substrate 401 is required, it is possible to use positioning means for adjusting the positions of the two by detecting the positions of the film pieces 419 of the strip-shaped film 410 supplied and the position of the substrate 401 transported, using position detection means, such as image inspection device.

Figure 35:
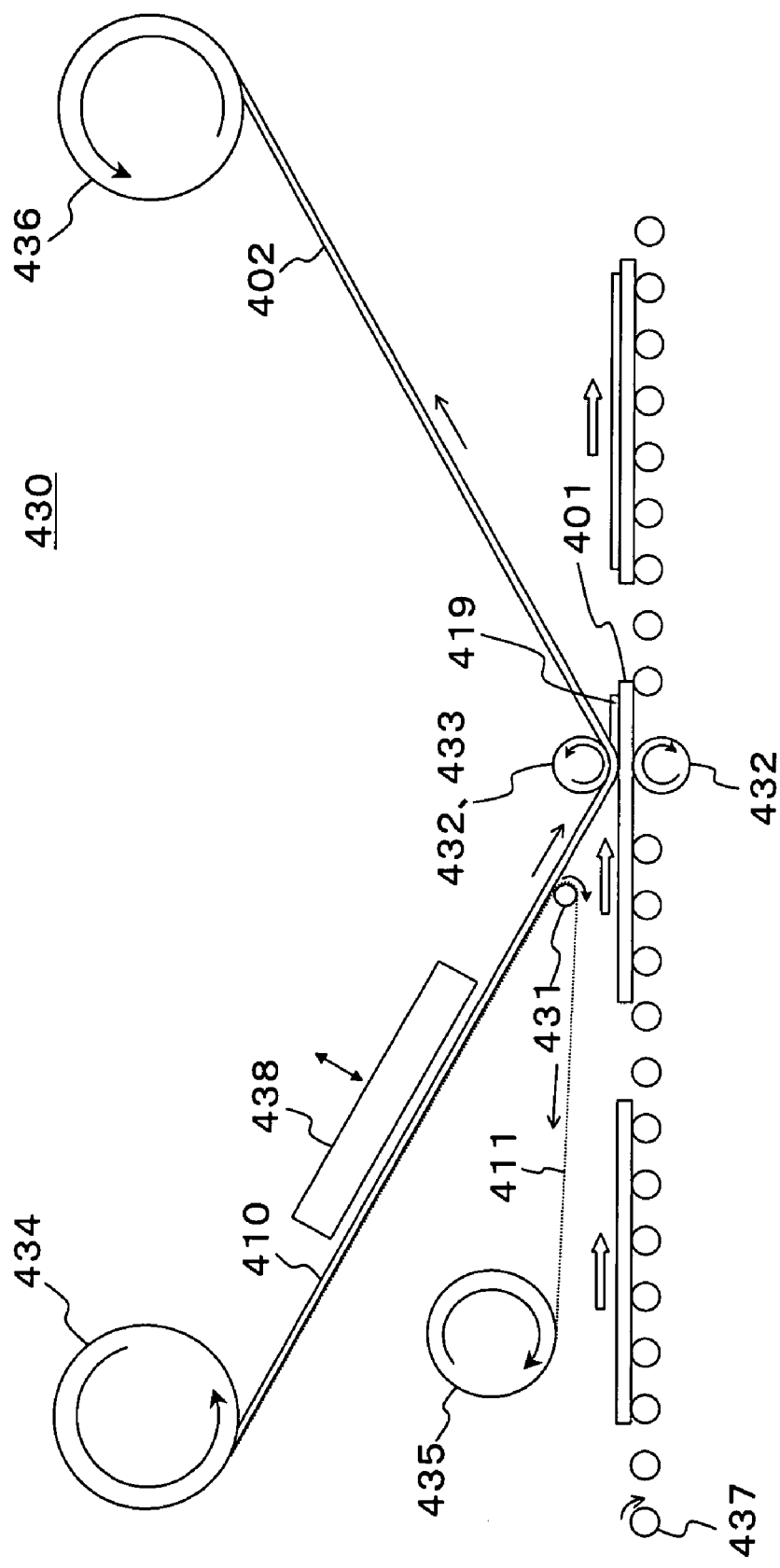
FIG. 35 is a side view schematically showing the structure of a polarizing plate bonding apparatus according to the embodiment 2 of the present invention (fourth solution).

Embodiment 2 of the present invention (fourth solution) is now explained with reference to the drawings. FIG. 35 is a side view schematically showing the structure of a polarizing plate according to the embodiment 2 of the present invention (fourth solution).

Referring to FIG. 35, a polarizing plate bonding apparatus 430 according to Embodiment 2 of the fourth solution is similar in structure to the polarizing plate bonding apparatus according to Embodiment 1 of the fourth solution, except a cutting means 438 and a reel-out roll 434, and the operation as from the separation of the release film 411 until peel-off of the selvedge 402 is similar to the operation of Embodiment 1 of the fourth solution.

With the reel-out roll 434, the strip-shaped film 410 is not cut into a rectangular shape in advance. The structure of the reel-out roll 434 (material, shape etc) except not being cut is similar to that of the reel-out roll used in embodiment 1 of the fourth solution.

The cutting means 438 is a means for cutting at least the polarizing plate and the adhesive layer, so as to leave the release film 411 uncut, in the strip-shaped film 410, which is composed of the polarizing plate and the release film 411 bonded thereto with interposition of the adhesive layer, and which is supplied from one plate surface of the substrate 401 to be transported, so that at least one side of the rectangular shape of the strip-shaped film 410 is perpendicular to the longitudinal direction of the film, the rectangular profile corresponding to the shape of the substrate 401 in the film region. The cutting means 438, used for cutting an optical film, is provided over the strip-shaped film 410 extending from a reel-out roll 434 up to the release film separating means 431. The cutting means may be composed of e.g., a cutter blade having a Thomson blade cutting to a rectangular shape, a cylinder driving a cutter blade and a lower dead point adjustment member for adjusting the lower dead point position of the cutter blade. By adjusting the lower dead point position to not more than 0.5 times as thick as the release film 411, solely the strip-shaped film 410 can be cut in a direction perpendicular to the longitudinal direction of the film.

Figure 36:
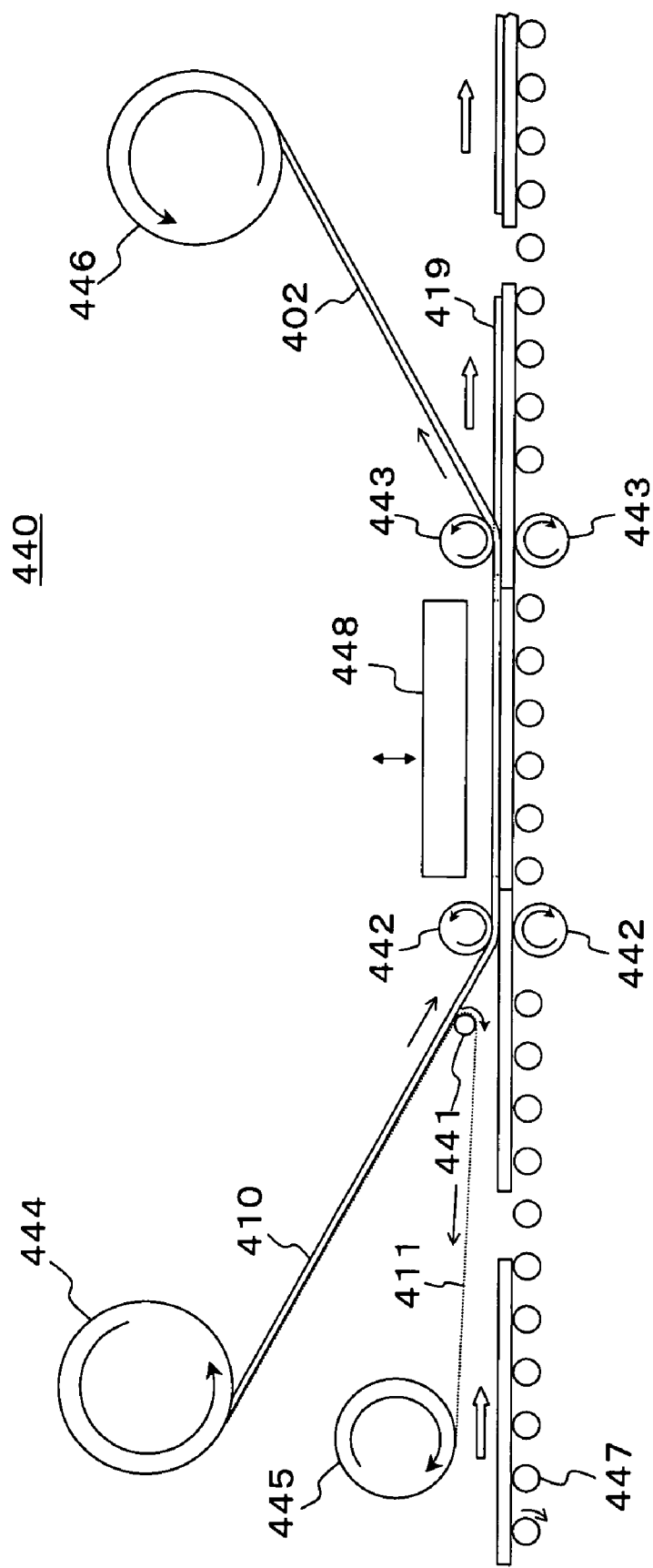
FIG. 36 is a side view schematically showing the structure of a polarizing plate bonding apparatus according to the embodiment 3 of the present invention (fourth solution).
Figure 37:
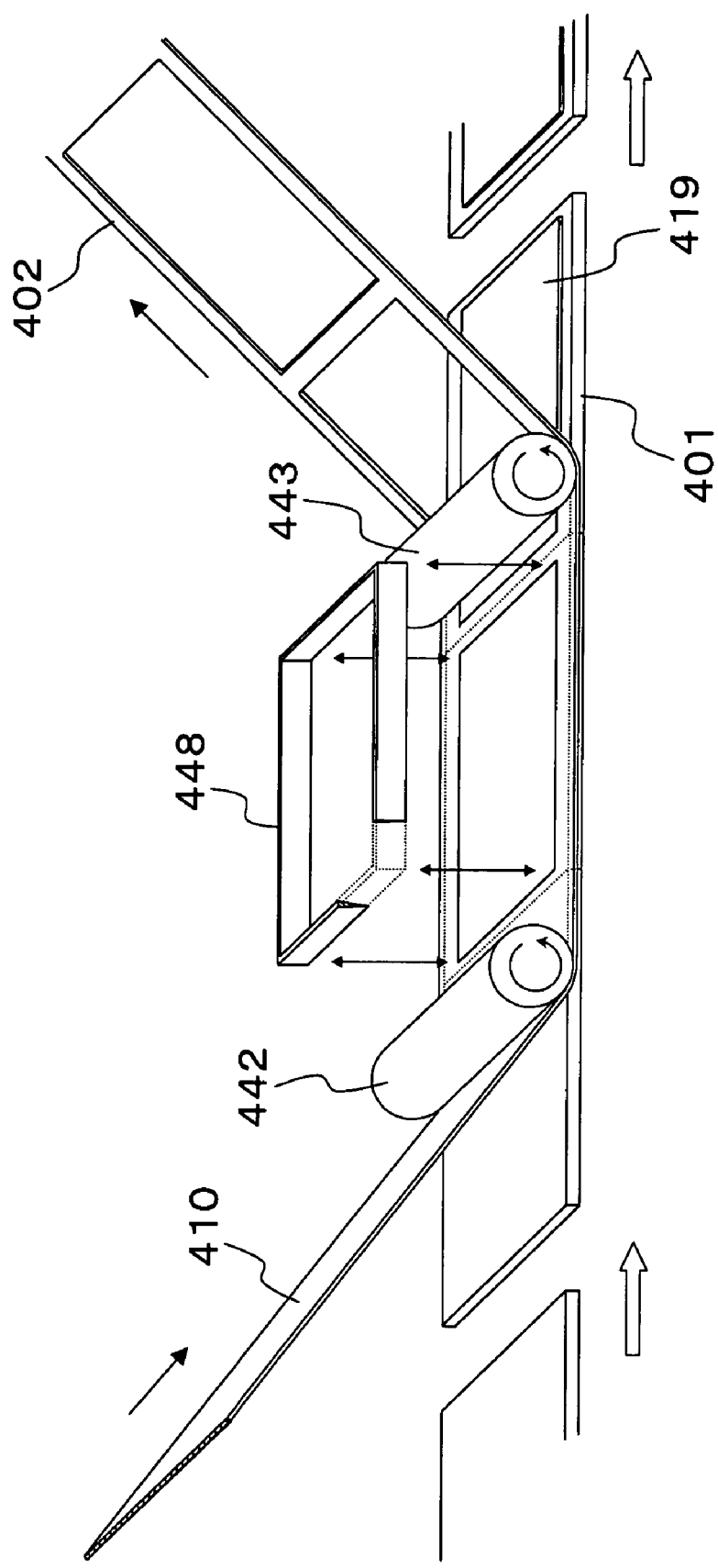
FIG. 37 is a perspective view schematically showing the state of bonding and selvedge separation in the polarizing plate bonding apparatus according to the embodiment 3 of the present invention (fourth solution).

Referring to the drawings, Embodiment 3 of the present invention (fourth solution) is now explained. FIG. 36 is a side view schematically showing the structure of a polarizing plate bonding apparatus according to embodiment 3 of the present invention (fourth solution). FIG. 37 is a perspective view schematically showing the operation of bonding by the polarizing plate bonding apparatus and the state of selvedge separation according to embodiment 3 of the present invention (fourth solution).

Referring to FIG. 36, a polarizing plate bonding apparatus 440 according to embodiment 3 of the fourth solution includes a release film separating means 441 for separating a release film 411 from the strip-shaped film 410, composed of a polarizing plate, which has an axis of light transmission oriented obliquely relative to the longitudinal direction of the film, and the release film 441 bonded thereto with interposition of an adhesive layer, with the strip-shaped film 410 being supplied from one plate surface side of the transported substrate 401. The polarizing plate bonding apparatus also includes a bonding means 442 for bonding at least the tacky surface of the strip-shaped film 410, freed of the release film 411, to a corresponding plate surface of the substrate 401, so that the direction of travel of the strip-shaped film 410 coincides with the transport direction of the substrate 401. The polarizing plate bonding apparatus also includes a cutting means 448 for cutting the strip-shaped film 410 in an area in which the strip-shaped film 410 has been bonded to the substrate 401, so that at least one side of a rectangular shape of the film in register with the substrate 401 is perpendicular to the longitudinal direction of the film, and a selvedge separating means 443 for separating the selvedge 402 of the strip-shaped film 410 except the inner area within the rectangular shape (film piece 419) from the substrate 401.

In a polarizing plate bonding apparatus 440 of embodiment 3 of the fourth solution, the strip-shaped film 410 not cut to a rectangular shape in advance, is used. After bonding the strip-shaped film 410 to the substrate 401, the strip-shaped film 410 is cut on the substrate 401 to a necessary size. After cutting the strip-shaped film 410, only the unneeded selvedge 402 of the strip-shaped film 410 is peeled off.

The strip-shaped film 410 is not cut to a rectangular shape in advance and, except this point, the configuration of the reel-out roll 444, such as shape or component material thereof, is the same as that of the reel-out roll used in Embodiment 1 of the fourth solution.

The release film separating means 441 is similar to the release film separating means of embodiment 1 of the fourth solution. In distinction from embodiment 1 of the fourth solution, the bonding means 442 is separated from the selvedge separating means 443. The location of bonding of the strip-shaped film 410 is spaced from the location of peeling off the selvedge 402 a distance equal to or longer than the film piece length. A cutting means 448, similar to the cutting means of embodiment 2 of the fourth solution, is arranged between the location of bonding the strip-shaped film 410 and the location of peeling off the selvedge 402. The cutting means 448 cuts only the strip-shaped film 410, bonded to the substrate 401, to a rectangular shape on the substrate (see FIG. 37). After this cutting, the selvedge separating means 443 continuously peels off the unneeded selvedge 402 of the strip-shaped film, as the needed film piece 419 is left bonded to the substrate 401.

Figure 38:
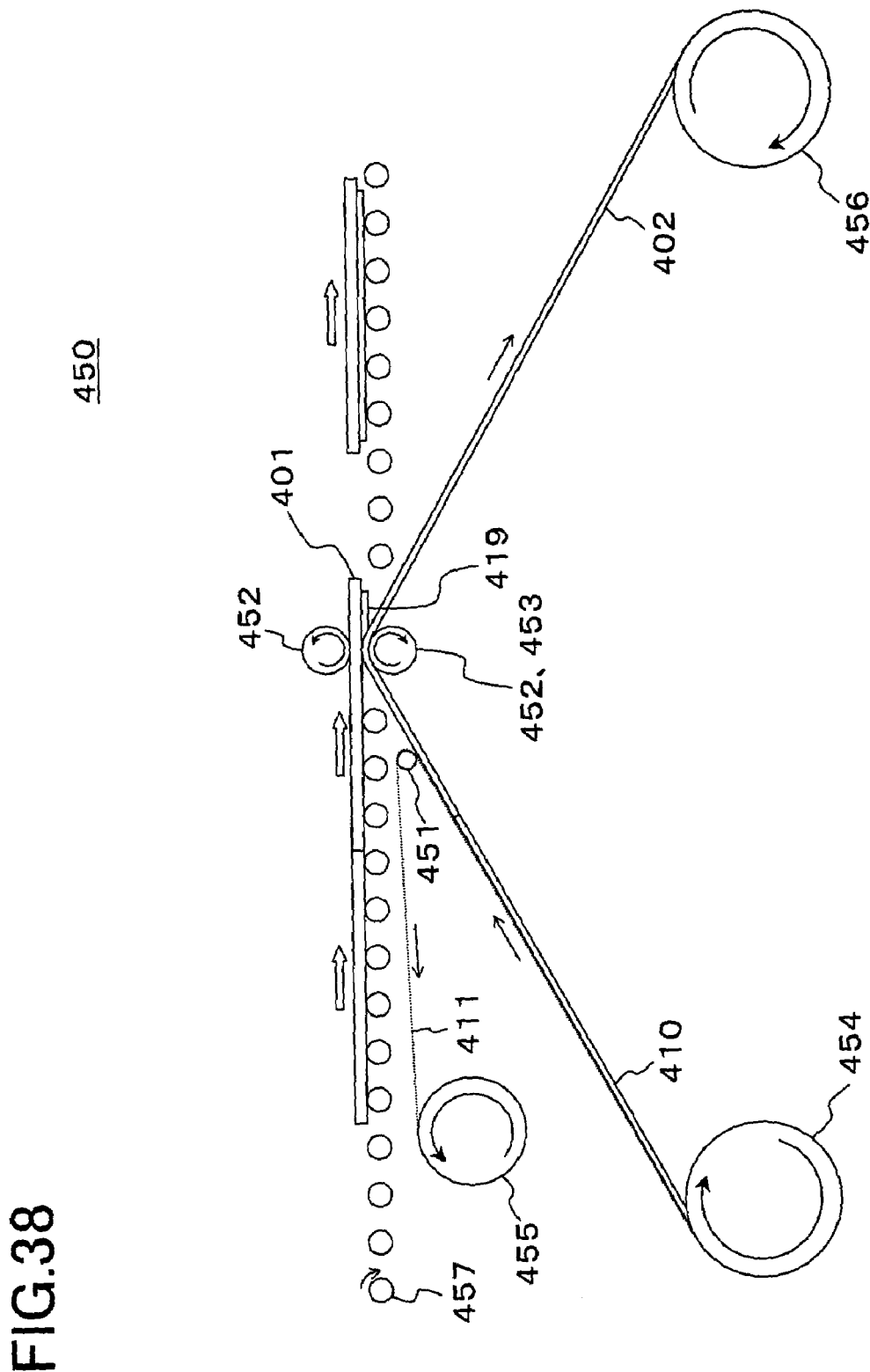
FIG. 38 is a side view schematically showing the structure of a polarizing plate bonding apparatus according to the embodiment 4 of the present invention (fourth solution).

Referring to the drawings, embodiment 4 of the present invention (fourth solution) is now explained. FIG. 38 is a side view schematically showing the structure of a polarizing plate bonding apparatus according to embodiment 4 of the present invention (fourth solution).

A polarizing plate bonding apparatus 450 according to the embodiment 4 of the fourth solution bonds a polarizing plate film to the lower side (underside) of the substrate 401, transported substantially horizontally, from the lower side of the substrate 401, and includes a release film separating means 451, a reel-out roll 454, a release film takeup roll 455 and a selvedge takeup roll 456, below the level of a transport means 457. The means of embodiment 4 of the fourth solution are similar in operation to the corresponding means of the polarizing plate bonding apparatus according to embodiment 1 of the fourth solution. The polarizing plate bonding apparatus 450 according to embodiment 4 of the fourth solution substantially corresponds to 180° inversion of the polarizing plate bonding apparatus 450 according to embodiment 1 of the fourth solution (see FIG. 32 and FIG. 38). Alternatively, the polarizing plate bonding apparatus 450 according to Embodiment 4 of the fourth solution may be 180° inversion of the polarizing plate bonding apparatus according to embodiment 2 or 3 of the fourth solution.

Figure 39:
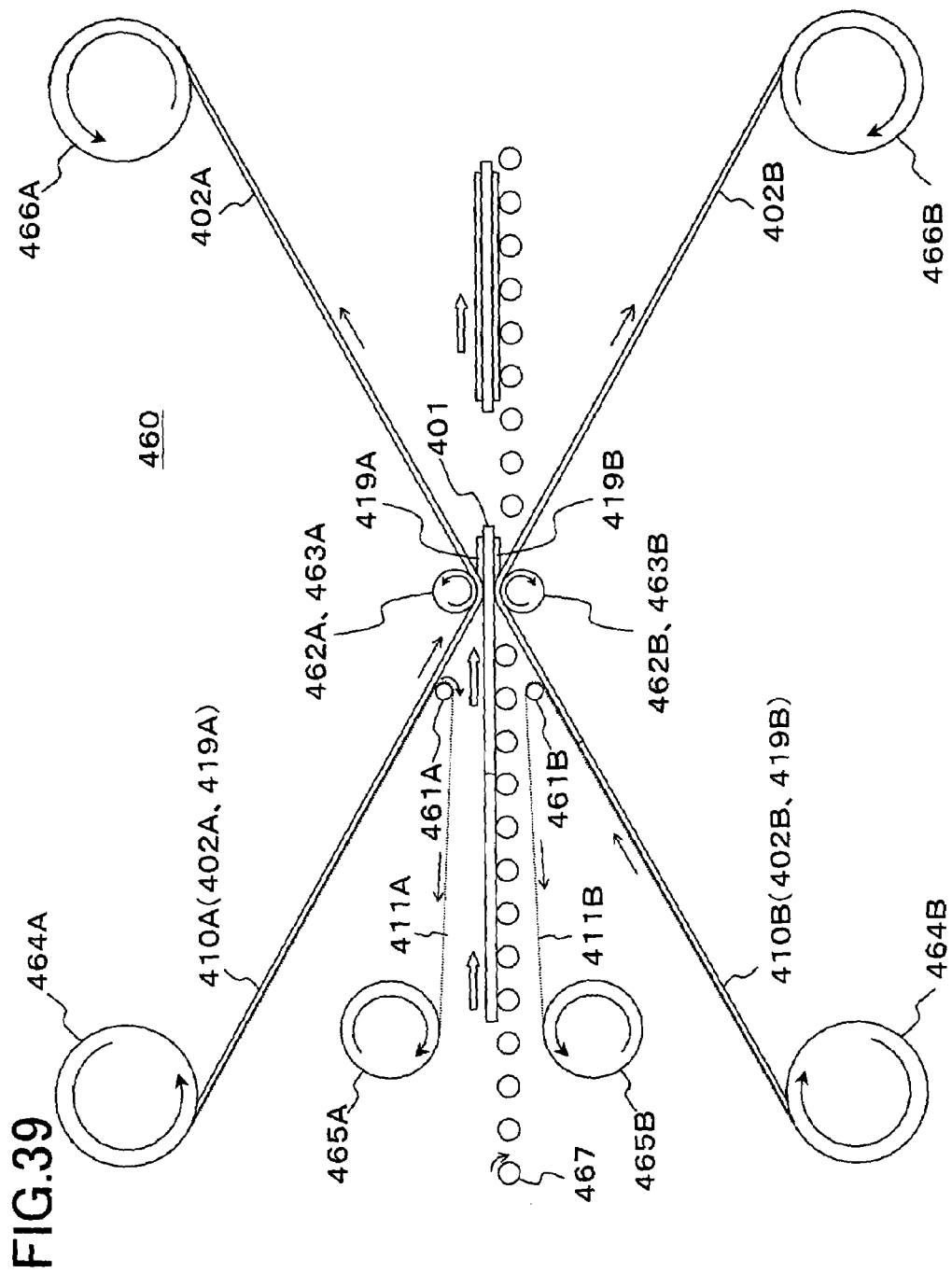
FIG. 39 is a side view schematically showing the structure of a polarizing plate bonding apparatus according to an embodiment 5 of the present invention (fourth solution).

Embodiment 5 of the present (fourth solution) is now explained with reference to the drawings. FIG. 39 is a side view schematically showing the structure of a polarizing plate bonding apparatus according to Embodiment 5 of the present invention (fourth solution).

A polarizing plate bonding apparatus 460 according to Embodiment 5 of the fourth solution bonds a polarizing plate film to the substrate 401 simultaneously from upper and lower surfaces thereof as the substrate 401 is transported substantially horizontally. Specifically, release film separating means 461A, 461B, reel-out rolls 464A, 464B, release film takeup rolls 465A, 465B and selvedge takeup rolls 466A, 466B are arranged above and below the level of a transport means 467. The means of Embodiment 4 of the fourth solution are similar in operation to the corresponding means of Embodiment 1 of the fourth solution. The means of Embodiment 5 of the fourth solution are similar in operation to the corresponding means of Embodiment 1 of the fourth solution. The polarizing plate bonding apparatus 460 according to Embodiment 5 of the fourth solution is analogous to the combination of the items of the polarizing plate bonding apparatus of Embodiment 1 of the fourth solution which except the transport means are inverted. However, the same may be applied to the case of the polarizing plate bonding apparatus of Embodiment 2 or 3 of the fourth solution. It is noted that the first strip-shaped film 410A and the second strip-shaped film 410B are used in such a combination in which, when the release film 411A of the first strip-shaped film 410A is combined to the release film 411B of the second strip-shaped film 410B, the direction of an axis of light transmission of the first strip-shaped film 410A is perpendicular to the direction of an axis of light transmission of the second strip-shaped film 410B. For example, in cases where the first strip-shaped film 410A is used in which the direction of the axis of light transmission of the polarizing plate is oriented 70° relatve to the longitudinal direction, it is possible to use the second strip-shaped film 410B in which the direction of the axis of light transmission of the polarizing plate is oriented 20° relatve to the longitudinal direction. In cases where it is used for the LCD for a VA liquid crystal or the LCD for an ISP liquid crystal, the polarizing plate 416 may be used in which the direction of the axis of light transmission of the polarizing plate is oriented parallel or perpendicular relative to the longitudinal direction of the film. For example, in cases where the first strip-shaped film 410A is used in which the direction of the axis of light transmission of the polarizing plate is oriented parallel to the longitudinal direction, it is possible to use the second strip-shaped film 410B in which the direction of the axis of light transmission of the polarizing plate is oriented perpendicular to the longitudinal direction.

[Examples]

Figure 13:
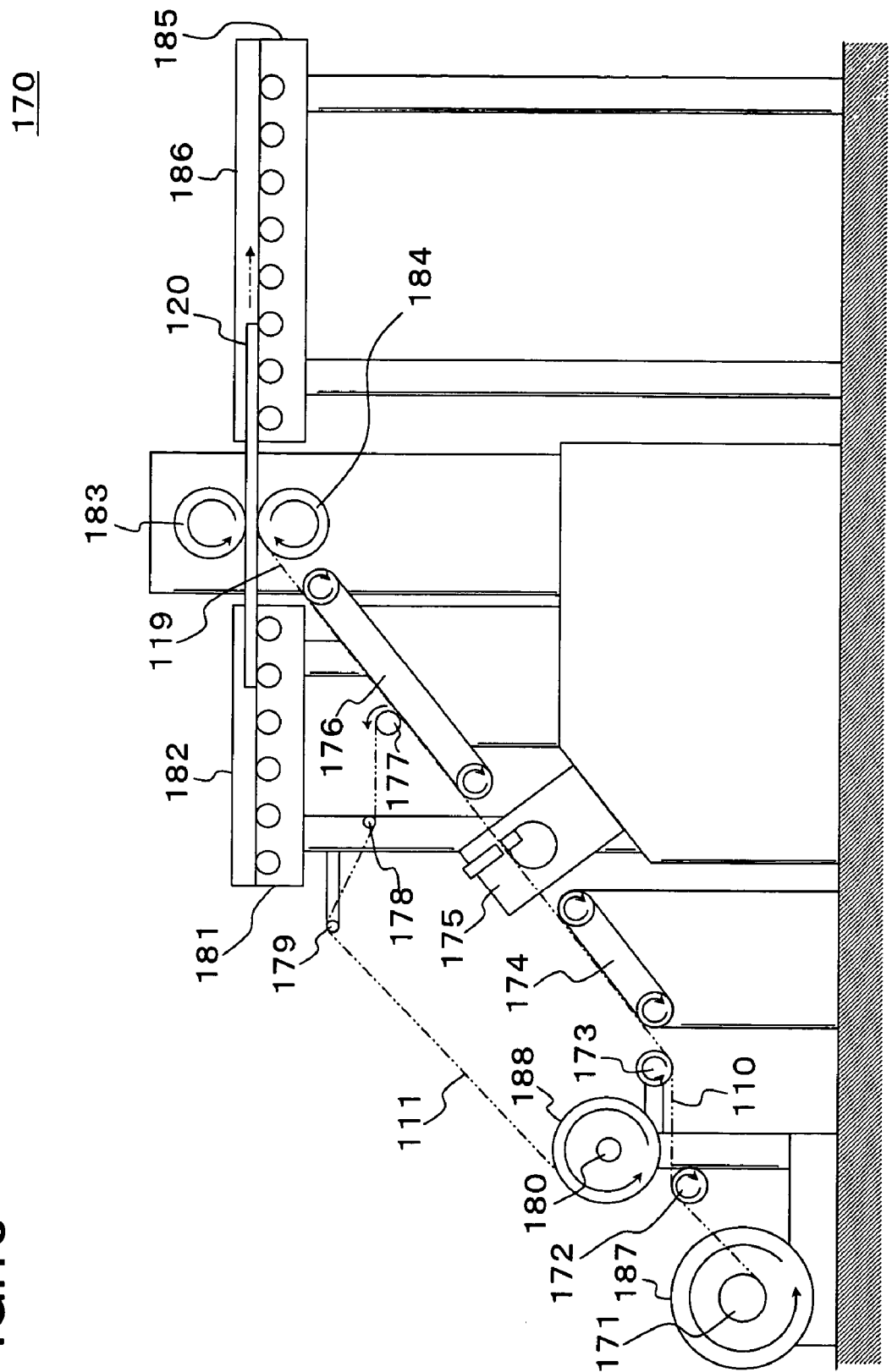
FIG. 13 is a schematic side view showing the structure of a strip-shaped film used in a modified embodiment of a polarizing plate bonding apparatus of the present invention (first solution).
Figure 14A:
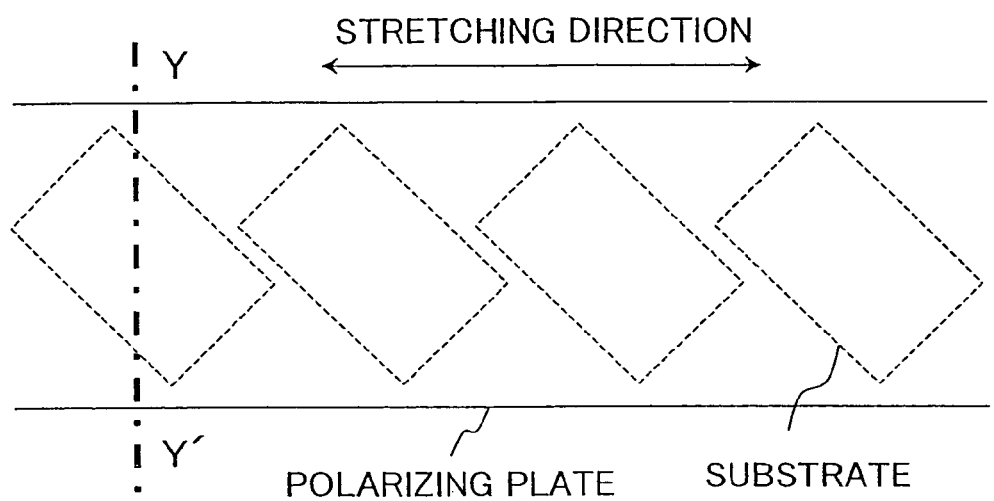
FIGS. 14(A) and (B) are a plan view and a cross-sectional view, respectively, showing the structure of a strip-shaped film used in a conventional polarizing plate bonding apparatus.
Figure 14B:
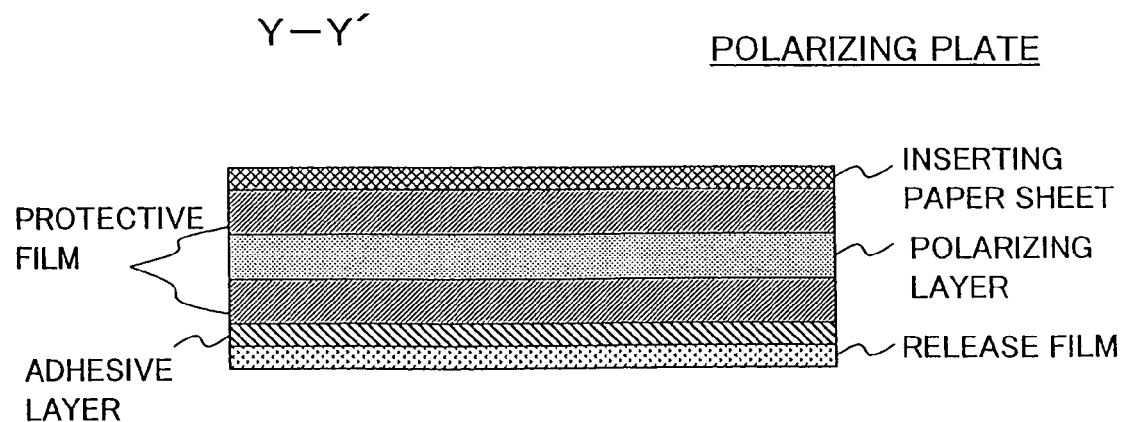

Referring to the drawings, an example of the present invention (first solution) is explained. FIG. 13 is a side view schematically showing the structure of a polarizing plate bonding apparatus according to an example of the present invention (first solution). This polarizing plate bonding apparatus 170 includes a reel-out means 171, a first payout roll 172, a second payout roll 173, a film transporting conveyor 174, a cutting means 175, a film piece transporting conveyor 176, a separating roll 177, a third payout roll 178, a fourth payout roll 179, a takeup means 180, a first substrate transporting conveyor 181, a first position guide means 182, a receiving roll 183, a pressure bonding roll 184, a second substrate transporting conveyor 185, a second position guide means 186, an encoder, a film piece position sensor, a substrate positioning member and a control means.

The substrate (120 of FIG. 13), used here, is a flat-plate-shaped rectangular liquid crystal display substrate for TN type liquid crystal. The reel-out roll (187 of FIG. 13) is a roll formed by taking up a strip-shaped film 110, obtained on layering a release film 111, an adhesive layer 112, a phase difference film 113, an adhesive layer 114, a protective film 115, an oblique stretched polarizing plate 116, a protective film 117 and an inserting paper sheet 118, in this order from below upward, so that the inserting paper sheet 118 is on the front surface, as shown in FIG. 2(B). Referring to FIG. 2(A), the oblique stretched polarizing plate 116 is a polarizing plate having an axis of light transmission approximately 45° relative to the longitudinal direction of the film. The phase difference film 113 has an axis of orientation which is the same as the longitudinal direction of the film. The takeup roll (188 of FIG. 13) is a roll for taking up the release film 111 separated from the strip-shaped film 110 (film piece 119).

The reel-out means 171 is a means for supporting the reel-out roll 187 in a horizontal state and for reeling out the strip-shaped film 110 from the reel-out roll 187, and includes a shaft (not shown) for rotationally supporting the reel-out roll 187, and a brake (not shown) for braking the rotation of this shaft (see FIG. 13). By this brake, excess reel-out of the reel-out roll 187 is prohibited. A band brake comprising a band for tightening the outer rim of the disc mounted on the shaft is used, also it is possible to use any other suitable brake.

The first payout roll 172 and the second payout roll 173 are rolls, not driven, for paying out the reeled-out strip-shaped film 110 to the film transporting conveyor 174 at a required angle (see FIG. 13).

The film transporting conveyor 174 is a means for transporting the reeled out strip-shaped film 110 towards the cutting means 175, and is herein a suction conveyor (belt conveyor) for transporting the film 110 at a preset angle while sucking it (see FIG. 13). The belt is stretched in a direction perpendicular to the direction of travel to prevent the width-wise center thereof from sagging. The film transporting conveyor 174 is driven in a controlled fashion depending on the positions of the film piece 119 and the substrate 120.

The cutting means 175 is a means for cutting (half-cutting) the portion of the strip-shaped film 110 other than the release film 111 in a direction perpendicular to the longitudinal direction, and includes a cutter and a driving means for driving the cutter (see FIG. 13). The cutting means 175 is also controlled to cut the strip-shaped film when the strip-shaped film travels a preset length (the size necessary for bonding the film to the substrate 120), depending on the positions of the film piece and the substrate. With half-cutting, the cutting is conducted from the lower side surface (the surface towards the inserting paper sheet) of the strip-shaped film 110, so that cutting chips hardly reach the release film 111 (the side of the tacky surface).

The film piece transporting conveyor 176 is a means for transporting the film piece 119, severed by the cutting means 175, towards the pressure bonding roll 184, and is a suction conveyor (belt conveyor) for transporting the film piece 119 towards the pressure bonding roll as the inserting paper sheet surface of the film piece 119 is sucked on the belt (see FIG. 13). The transport surface of the film piece transporting conveyor 176 is on the extension of the transport surface of the film transporting conveyor 174. The belt is tensioned in a direction perpendicular to the direction of travel and is thereby prohibited from sagging at its transverse mid position. The film piece transporting conveyor 176 is also driving-controlled, depending on the positions of the film piece 119 and the substrate 120, and is synchronized with the operation of the film transporting conveyor 174.

The separating roll 177 is arranged at about the mid portion on the belt feed side of the film piece transporting conveyor 176 and has its roll axis perpendicular to the direction of travel of the film piece. It is a non-driven roll for separating only the release film 111 from the film piece 119.

The third payout roll 178 and the fourth payout roll 179 are non-driven rolls for paying out the release film 111, separated by the separating roll 177, towards the take-up roll 188 (see FIG. 13).

The takeup means 180 is a means for rotationally driving a takeup roll 188 to take up the release film 111. The takeup means 180 is driving-controlled depending on the positions of the film piece 119 and the substrate 120 (see FIG. 13)

The first substrate transporting conveyor 181 is a roller conveyor (wheel conveyor) composed of an array of rolls for transporting the substrate 120, to which the film piece 119 has not been bonded, in a horizontal and predetermined direction as shown in FIG. 13 (FIG. 13A). The first substrate transporting conveyor 181 is driving-controlled, depending on the positions of the film piece 119 and the substrate 120.

The first position guide means 182 is a guide member regulating the substrate position from both sides (of the substrate 120) in a direction perpendicular to the direction of travel of the substrate 120 on the first substrate transporting conveyor 181 for guiding the direction of travel (see FIG. 13). The first position guide means 182 thrusts the substrate 120 by the spring pressure of a guide member on one side towards a stationary guide member on the opposite side for guiding the substrate 120 in a predetermined direction.

The receiving roll 183 is a roll for transporting the substrate 120, transported by the first substrate transporting conveyor 181, towards the second substrate transporting conveyor 185, and for sustaining the thrusting pressure of the pressure bonding roll 184 from the lower side (see FIG. 13). The receiving roll 183 is also driving-controlled, depending on the positions of the film piece 119 and the substrate 120.

The pressure bonding roll 184 is a nip roll for thrusting the lower surface of the substrate 120 towards the receiving roll 183 to entangle the film piece 119 for pressure bonding the film piece to the lower plate surface of the substrate 120 (see FIG. 13). The pressure bonding roll 184 is mounted to a lift mechanism, not shown. This lift mechanism is controlled, depending on the positions of the film piece 119 and the substrate 120, in such a manner that it is lifted up for applying the thrusting pressure to the receiving roll 183, for bonding the film piece 119 to the substrate 120, and is lowered between the end of the bonding of one substrate 120 and the completion of preparation for bonding the next substrate 120.

The second substrate transporting conveyor 185 is a roller conveyor (wheel conveyor) composed of an array of rolls for transporting the substrate 120, emerging through the spacing between the pressure bonding roll 184 and the receiving roll 183 in a state bonded to the film piece 119, in a horizontal and predetermined direction (see FIG. 13). The second substrate transporting conveyor 185 is also driving-controlled, depending on the positions of the film piece 119 and the substrate 120, and is synchronized with the operation of the first substrate transporting conveyor 181.

The second position guide means 186 is a guide member for regulating the substrate position, in a direction perpendicular to the direction of travel on the second substrate transporting conveyor 185, from both sides, for guiding the direction of travel of the substrate (see FIG. 13) The substrate 120 is thrust by a spring pressure on one side guide member against the opposite side stationary guide member for guiding the substrate 120 in a predetermined direction.

The encoder, not shown, is a device for measuring the supplied quantity of the strip-shaped film 110. In the present example, the number of rotations of the pulley of the film piece transporting conveyor 176 is measured for measuring the supplied quantity of the strip-shaped film 110.

The film piece position sensor, not shown, is a photosensor for detecting the position of (the forward end of) the film piece 119, sent to the pressure bonding roll 184 of the film piece transporting conveyor 176.

The substrate positioning member, not shown, is arranged in the vicinity of a bonding unit having the receiving roll 183 and the pressure bonding roll 184, and operates as a stopper for obstructing the movement of the substrate 120. After the bonding of one substrate 120 is completed and the substrate is sent to the downstream side, the stopper emerges on the transport line, and collides with the end face of the next substrate 120, transported by the first substrate transporting conveyor 181. At the same time as the substrate transport is obstructed by the stopper, a detection device of the substrate positioning member indicates the fact of the substrate arrival to stop the driving of the first substrate transporting conveyor 181. The film piece 119 is fed out from the standby position, as measured by the encoder, until the front end of the film piece 119 reaches the bond position for the substrate 120. After the pressure bonding roll 184 bonds the front end of the film piece 119 to the substrate 120 between the roll 184 and the receiving roll 183, the stopper is receded and disengaged from the substrate. The rotation of the receiving roll 183, transport of the substrate 120 and the supply of the film piece 119 are then carried out in a synchronized manner so that the substrate 120 and the film piece 119 are bonded together by the receiving roll 183 and the pressure bonding roll 184.

The control means, not shown, is a computer for controlling the driving of the film transporting conveyor 174, cutting means 175, film piece transporting conveyor 176, takeup means 180, first substrate transporting conveyor 181, receiving roll 183, pressure bonding roll 184, substrate positioning member and the second substrate transporting conveyor 185, depending on signals from detecting devices of the encoder, the film piece position sensor, and substrate positioning member.

The operation of the polarizing plate bonding apparatus according to an example of the present invention (first solution) is now explained.

Referring to FIG. 13, the strip-shaped film 110, reeled out from the reel-out roll 187, is paid out by the first payout roll 172 and the second payout roll 173 at an angle consistent with the transport surface of the film transporting conveyor 174.

The so paid out strip-shaped film 110 is transported by the film transporting conveyor 174 towards the cutting means 175 and, when the severed end face of the foremost part of the strip-shaped film 110 has traveled a preset length (a length corresponding to the substrate length or a length slightly shorter than it), further travel of the strip-shaped film 110 is halted and the strip-shaped film 110 is half-cut (cut other layers or portions of the film except the release film) in a direction perpendicular to its longitudinal direction. This half-cutting is performed every time the severed forward side end face of the strip-shaped film 110, extending at right angles to the longitudinal direction in the strip-shaped film 110, has traveled a length corresponding to the length of the substrate 120.

The film piece 119, cut out by the half-cutting, is transported by the film piece transporting conveyor 176 to the pressure bonding roll 184, so that only the release film 111 is separated from the film piece 119, which passes through the gap between the film piece transporting conveyor 176 and the separating roll 177, by the separating roll 177 on the transport surface of the film piece transporting conveyor 176. The so separated release film 111 is paid out by the third payout roll 178 and the fourth payout roll 179 so as to be taken up on the takeup roll 188.

The film piece 119, freed of the release film 111, is supplied to a spacing between the pressure bonding roll 184 and the lower surface of the substrate 120 traveling through the space between the receiving roll 183 and the pressure bonding roll 184, to fit with the bonding position of the substrate 120 transported by the first substrate transporting conveyor 181 (the position on the substrate at which the severed end face of the film piece 119 is parallel to the forward side end face of the substrate 120), with the tacky surface thereof directed to the substrate 120, and then is transported to the second substrate transporting conveyor 185, as the film piece is bonded to the substrate under the pressure exerted by the pressure bonding roll 184. The substrate 120, passed through the spacing between the receiving roll 183 and the pressure bonding roll 184, has the film piece 119 bonded to its lower surface, and is transported in this state by the second substrate transporting conveyor 185.

[Meritorious Effect of the Invention]

(Meritorious Effect of the First Solution)

According to the present invention (first solution) the polarizing plate can be bonded automatically and continuously.

Moreover, according to the present invention (first solution), in which a film piece is supplied from the lower side of a substrate to be transported, and a strip-shaped film is half-cut from its lower surface, it is possible to prevent mixing of dust and dirt.

According to the present invention (first solution), it is unnecessary to re-load a film piece, and a release film is not cut, so that fast bonding is possible.

According to the present invention (first solution), in which a film piece is transported, as it is sucked, to near the site of bonding to a substrate, it is possible to prevent the workability from being lowered due to the tendency of a film piece to roll on itself.

According to the present invention (first solution) in which no wasteful cutting chips of polarizing plates are produced, it is possible to increase the yield of the polarizing plate to 100%.

According to the present invention (first solution) in which a circular polarized plate film, composed of a phase difference film and a polarizing plate, bonded to each other, can be continuously bonded to a substrate, and no wasteful cutting chips of a circular polarized polarizing plate films are produced, it is possible to increase the yield of a circular polarizing plate film to 100%.

In addition, according to the present invention (first solution), in which a film piece is supplied from the lower side of a substrate to be transported, a roll of a strip-shaped film can be exchanged easily.

Meritorious Effect of the Second Solution

According to the present invention (second solution) a polarizing plate may be bonded to each substrate surface continuously and automatically.

According to the present invention (second solution) the operational speed may be increased because there is no necessity for re-loading film pieces, while a release film is not segmented.

According to the present invention (second solution) the yield of 100% is achieved, because no unneeded chips of polarizing plates are produced. The result is that the cost of a display device may be lowered.

According to the present invention (second solution) control may be exercised more easily over the direction of an axis of light transmission of a polarizing plate in bonding a polarizing plate on each surface of a substrate for a TN substrate.

According to the present invention (second solution) a film for circular polarization, composed of a phase difference film and a polarizing plate, bonded together, may be continuously bonded to a substrate. Since no unneeded chips of a film for circular polarization is produced, a 100% yield of a film for circular polarization may be achieved.

According to the present invention (second solution) the overall apparatus may be reduced in size in the case of bonding a polarizing plate simultaneously to each substrate surface.

According to the present invention (second solution) a film piece is supplied from the underside of a substrate to be transported. In cases where a strip-shaped film is half-cut from its underside, it is possible to prevent intrusion of contaminants. Since a strip-shaped film is supplied from the underside of a substrate to be transported, rolls of a strip-shaped film may be exchanged easily.

(Meritorious Effect of the Third Solution)

According to the present invention (third solution), bonding can be made without halting film supply, thereby improving the productivity.

According to the present invention (third solution) there is no necessity of re-loading film pieces, while a release film is not cut, so that high-speed bonding may be achieved.

According to the present invention (third solution) it is possible to prevent unneeded chips of polarizing plates from being produced, so that, unless bonding with margin, a 100% yield may be achieved.

According to the present invention (third solution) a film for circular polarization, obtained on bonding a phase difference film and a polarizing plate, can be continuously bonded to a substrate, such that unneeded chips of circular polarizing plate film may be prohibited from being produced, so that, unless bonding with margin, a 100% yield may be achieved.

According to the present invention (third solution) in cases where a film piece is supplied from the underside of a substrate to be transported, it is possible to prevent mixing of dust and dirt affixed to a polarizing plate.

According to the present invention (third solution) in cases where a strip-shaped film is supplied from the underside of a substrate to be transported, rolls of the strip-shaped film may be exchanged easily.

(Meritorious Effect of the Fourth Solution)

According to the present invention (fourth solution) bonding can be made without halting transportation of a substrate and film supply, thereby improving the productivity.

According to the present invention (fourth solution) there is no necessity of re-loading film pieces, while a release film is not cut, so that high-speed bonding may be achieved.

According to the present invention (fourth solution) since a strip-shaped film is not bonded with a substrate arranged obliquely relative to the strip-shaped film, it is possible to prevent unneeded selvedges of a polarizing plate from being produced.

According to the present invention (fourth solution) a film for circular polarization, composed of a phase difference film and a polarizing plate, bonded together, can be continuously bonded to a substrate, so that selvedges of a film for circular polarization can be prevented from being produced.

According to the present invention (fourth solution) in cases where a film piece is supplied from the underside of a substrate to be transported, it is possible to prevent mixing and falling of dust and dirt affixed to a polarizing plate.

According to the present invention (fourth solution) in cases where a strip-shaped film is supplied from the underside of a substrate to be transported, rolls of a strip-shaped film may be exchanged easily.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A polarizing plate bonding method, comprising:
    a step of cutting at least a polarizing plate and an adhesive layer of a strip-shaped film, composed of said polarizing plate, a direction of an axis of light transmission of which is oriented obliquely relative to a longitudinal direction of said strip-shaped film, and a release film bonded to said polarizing plate, with interposition of said adhesive layer, when a forward end side severed end face of said strip-shaped film perpendicular to the longitudinal direction of said strip-shaped film has traveled a length corresponding to a length of a substrate, to form a film piece so as to leave the release film uncut,
    a step of separating said release film from the film piece severed by said cutting, and
    a step of bonding a tacky surface of said film piece freed of said release film to a mating position of said substrate so that a forward end side end face of the transported substrate is parallel to the pre-severed end face of said film piece while said film piece and said substrate are moved to the same direction so that the supply of said film piece is synchronized with the transport of said substrate.

2. The polarizing plate bonding method as defined in claim 1 wherein
    before said step of cutting, a strip-shaped film is reeled out from a roll of said strip-shaped film of a preset width, composed of a polarizing plate, a direction of an axis of light transmission of which is oriented obliquely relative to a longitudinal direction of said strip-shaped film, and a release film bonded to said polarizing plate, with interposition of said adhesive layer, and said strip-shaped film is sending along the longitudinal direction thereof.

3. The polarizing plate bonding method as defined in claim 1 wherein
    before said step of bonding, said film piece is supplied, freed of said release film, in meeting with the position of said substrate transported.

4. The polarizing plate bonding method as defined in claim 1 wherein
    said film piece is supplied from a lower side of said substrate, transported with a substantially planar plate surface, so that said film piece is bonded to a lower surface of said substrate.

5. A method for bonding a polarizing plate, comprising:
    a step of cutting a first strip-shaped film including a polarizing plate and a release film bonded thereto with interposition of an adhesive layer, and a second strip-shaped film including a polarizing plate and a release film bonded thereto with interposition of an adhesive layer, when pre-severed end faces of said first and second strip-shaped films along a proceeding direction thereof perpendicular to a longitudinal direction have traveled a distance corresponding to a length of a substrate, so that at least said polarizing plates and the adhesive layers of said first and second strip-shaped films are severed along a direction perpendicular to a longitudinal direction, with the exception of said release layer which remains uncut; said first strip-shaped film being supplied from a front plate surface side of substrate being transported, said second strip-shaped film being supplied from a reverse plate surface side of a substrate being transported; a direction of an axis of light transmission of said polarizing plate of said second strip-shaped film being perpendicular to a direction of an axis of light transmission of said polarizing plate of said first strip-shaped film when the release film of said second strip-shaped film is bonded to the release film of said first strip-shaped film;
    a step of separating said release films of said first and second strip-shaped films, severed by said cutting of said first and second strip-shaped films; and
    a step of bonding a tacky surface of said first film piece, freed of said release film, to a mating front side surface of said first strip-shaped film, so that the severed end face of said first film piece is parallel to the forward end face along the transport direction of said substrate, and bonding a tacky surface of said second film piece, freed of said release film, to a mating reverse side surface of said second strip-shaped film, so that the severed end face of said second film piece is parallel to the forward end face along the transport direction of said substrate.

6. A method for bonding a polarizing plate, comprising:
    a step of separating a release film from each of a first strip-shaped film and a second strip-shaped film, said first strip-shaped film including a polarizing plate and the release film bonded thereto with interposition of an adhesive layer, said first strip-shaped film being supplied from a front plate surface side of a substrate being transported; said second strip-shaped film including a polarizing plate and a release film bonded thereto with interposition of an adhesive layer, said second strip-shaped film being supplied from a reverse plate surface side of a substrate being transported; a direction of an axis of light transmission of said polarizing plate of said second strip-shaped film being perpendicular to the direction of the axis of light transmission of said polarizing plate of said first strip-shaped film when the release film of said second strip-shaped film is bonded to the release film of said first strip-shaped film;
    a bonding step of bonding a tacky surface of said first strip-shaped film, freed of said release film, to a mating front plate surface of said substrate so that the proceeding direction of said first strip-shaped film coincides with the transport direction of said substrate, and bonding a tacky surface of said second strip-shaped film, freed of said release film, to a mating reverse plate surface of said substrate so that a proceeding direction of said second strip-shaped film coincides with a transport direction of said substrate; and
    a cutting step of severing said first strip-shaped film and the second strip-shaped film, bonded to both surfaces of said substrate by said bonding means, along a direction parallel to forward or rear end face along the transport direction of said substrate.

7. A method for bonding a polarizing plate, comprising:
a step of transporting a substrate with one end face of said substrate perpendicular to a proceeding direction;
a step of bonding a tacky surface of a first film piece, having a polarizing plate, to a mating plate surface piece of said substrate so that a severed end face of said first film piece is parallel to a forward side end face along a transport direction of said substrate;
a step of changing the direction of transport of the transported substrate and transporting the substrate along the so changed direction; and
a step of bonding a tacky surface of said second film piece to a plate surface of said substrate opposite to a substrate surface to which said first film piece has been bonded, so that a severed end face of said second film piece is parallel to a forward end face along the transport direction of said substrate; said second film piece including a polarizing plate and being supplied from the plate surface of said substrate opposite to the substrate surface to which said first film piece has been bonded; a direction of an axis of light transmission of said polarizing plate of said second strip-shaped film being perpendicular to a direction of an axis of light transmission of said polarizing plate of said first strip-shaped film when the tacky surface of said polarizing plate is bonded to the tacky surface of said first strip-shaped film.

8. A method for bonding a polarizing plate, comprising:
a step of transporting a substrate with one end face of said substrate perpendicular to a proceeding direction;
a step of cutting along a direction parallel to a forward or rear side end face along the transport direction of said substrate, so that a tacky surface of a first strip-shaped film, having a polarizing plate, bonded to one mating plate surface of said substrate, so that a proceeding direction of the first strip-shaped film is parallel to a forward side end face along the transport direction of said substrate;
a second transport step of changing the direction of transport of the transported substrate and transporting the substrate along the so changed direction; and
a step of cutting along a direction parallel to a forward or rear end face along the transport direction of said substrate, to a plate surface of which opposite to a plate surface carrying the film piece of the first strip-shaped film has been bonded a tacky surface of said second strip-shaped film, so that the severed end face of the second strip-shaped film is parallel to an end face along the proceeding direction of the substrate; said second strip-shaped film having a polarizing plate; said second strip-shaped film being supplied from a plate surface side of said substrate transported by said second transport means which is opposite to a substrate surface bonded to said first film piece; an axis of light transmission of said polarizing plate of said second strip-shaped film being perpendicular to an axis of light transmission of said polarizing plate of said first strip-shaped film when the release film side of said second strip-shaped film is bonded to the release film side of said first strip-shaped film.

9. A method for bonding a polarizing plate, comprising:
a step of separating a release film from a strip-shaped film comprised of a polarizing plate and the release film bonded thereto with interposition of an adhesive layer, said strip-shaped film being supplied from one plate surface of a substrate being transported;
a step of bonding a tacky surface of said strip-shaped film, freed of said release film, to a mating plate surface of said substrate, so that a proceeding direction of said strip-shaped film coincides with the transport direction of said substrate; and
a step of severing said strip-shaped film, bonded to one surface of said substrate by said bonding, along a direction parallel to a forward or rear end face along the transport direction of said substrate.

10. A method for bonding a polarizing plate, comprising:
a step of separating a release film from a strip-shaped film comprised of a polarizing plate and the release film bonded thereto with interposition of an adhesive layer and supplied from one plate surface of a substrate being transported, in a state in which at least the polarizing plate and the adhesive layer are pre-severed, with the release film remaining uncut, so that at least one side of a rectangle corresponding in profile to said substrate in an area of a film surface is perpendicular to a longitudinal direction of the film so as to provide a selvedge of said strip-shaped film other than an inner portion of said rectangle;
a step of bonding a tacky surface of said inner portion of said rectangle of said strip-shaped film, freed of said release film, to a mating plate surface of said substrate, so that the proceeding direction of said strip-shaped film coincides with the transport direction of said substrate; and
a step of separating said selvedge of said strip-shaped film from said substrate.

11. The method for bonding a polarizing plate as defined in claim 10, wherein
a step of cutting at least a polarizing plate and an adhesive layer from a strip-shaped film, comprised of a polarizing plate and the release film bonded thereto with interposition of said adhesive layer, and supplied from one plate surface of a substrate being transported, with the release film remaining uncut, so that at least one side of a rectangle corresponding in profile to said substrate in an area of a film surface is perpendicular to a longitudinal direction of the film, and
said release film is separated from the strip-shaped film severed in said step of cutting.

12. The method for bonding a polarizing plate as defined in claim 10 wherein bonding of said inner portion of said rectangle and the separation of said selvedge are carried out simultaneously.

13. A method for bonding a polarizing plate, comprising:
a step of separating a release film from a strip-shaped film comprised of a polarizing plate and the release film bonded thereto with interposition of an adhesive film, said strip-shaped film being supplied from one plate surface of a substrate transported;
a step of bonding at least a tacky surface of said strip-shaped film, freed of said release film, to a mating plate surface of said substrate, so that a proceeding direction of said strip-shaped film coincides with a transport direction of said substrate;
a step of cutting said strip-shaped film within an area in which the strip-shaped film is bonded to said substrate, within a rectangle mating in profile to said substrate, so that at least one side of the rectangle is perpendicular to a longitudinal direction of the film so as to provide a selvedge of said strip-shaped film other than an inner portion of said rectangle; and
a step of separating said selvedge of said strip-shaped film from said substrate.

* * * * *